United States Patent [19]

Kaburagi et al.

[11] Patent Number: 5,805,738
[45] Date of Patent: Sep. 8, 1998

[54] IMAGE PROCESSING APPARATUS AND METHOD

[75] Inventors: Hiroshi Kaburagi; Shigeo Yamagata, both of Yokohama; Hiroyuki Ichikawa, Kawasaki, all of Japan

[73] Assignee: Canon Kabushiki Kaisha, Tokyo, Japan

[21] Appl. No.: 770,801

[22] Filed: Dec. 20, 1996

[30] Foreign Application Priority Data

Dec. 21, 1995 [JP] Japan ................................. 7-333630
Mar. 29, 1996 [JP] Japan ................................. 8-076850
Jul. 19, 1996 [JP] Japan ................................. 8-190803
Jul. 19, 1996 [JP] Japan ................................. 8-190805

[51] Int. Cl.⁶ ........................... G06K 9/36; G06K 9/38
[52] U.S. Cl. ................... 382/251; 382/252; 358/454; 358/456; 358/458; 358/532; 358/533
[58] Field of Search ........................ 382/251, 252, 382/268, 269, 266; 358/429, 454, 456, 457, 458

[56] References Cited

U.S. PATENT DOCUMENTS 5,459,817 10/1995 Shima ................................. 395/23
5,557,429 9/1996 Hirose ............................... 358/532

Primary Examiner—Leo H. Boudreau
Assistant Examiner—Dmitry A. Novik
Attorney, Agent, or Firm—Fitzpatrick, Cella, Harper & Scinto

[57] ABSTRACT

Upon gradation converting input m-bit image information into n-bit image information (m and n are integers; m>n), random numbers, the maximum values of which are changed in accordance with the input values of the m-bit image information, are generated at periods of two or more pixels, and the random numbers are selectively output while switching their signs to positive/negative within the period of two or more pixels. The output signal values and the input values of the m-bit image information are added to each other, and the sum signal values are converted into n-values by a density preservation type quantization method. With this control, the problems of sweeping, texture, and the like of the conventional density preservation type quantization method can be solved without emphasizing the granularity of an image.

45 Claims, 45 Drawing Sheets

ENLARGED VIEW OF LOW-DENSITY PORTION

ENLARGED VIEW OF HIGH-DENSITY PORTION (10a)

(10b)

(10c)

(10d)

ENLARGED VIEW OF HIGH-DENSITY PORTION

IMAGE PROCESSING APPARATUS AND METHOD

BACKGROUND OF THE INVENTION

The present invention relates to an image processing method and apparatus, which process image data to allow a FAX apparatus, a digital copying machine, a printer, and the like to form a high-quality image.

More specifically, the present invention relates an image processing apparatus and method which perform gradation conversion processing on a multi-value image which is expressed by m bits (m is an integer equal to or larger than 2) per pixel, so as to obtain an image which is expressed by the number of bits smaller than m bits per pixel.

Conventionally, in a digital copying machine, an original is illuminated with light emitted by, e.g., a halogen lamp, light reflected by the original is photoelectrically converted into an electrical signal using a charge coupled device such as a CCD, the electrical signal is subjected to predetermined processing, and thereafter, an image is formed using a printing apparatus such as a laser printer, a liquid crystal printer, or the like.

As an image forming method, in recent years, a method of expressing multi-gray levels of high-resolution pixels is adopted. For example, pulse-width modulation, luminance modulation, and the like are known. Along with the improvement of performance of devices that constitute such printing apparatus, more developments are being made to attain higher resolution.

In an electrophotography type digital copying machine using a laser beam, as the resolution increases, the exposure time on the surface of a photosensitive body becomes very short, and a sufficient potential cannot be obtained on the surface of the photosensitive body after exposure, as shown in FIG. 45. As a consequence, attachment of toner on the surface of the photosensitive body becomes very unstable with respect to a highlight portion (a portion to which a exposure time is short) upon development.

For this reason, the amount of toner attached to the photosensitive body varies depending on the positions of pixels to be exposed, resulting in density unevenness.

As apparatuses have been digitalized and systemized, the number of models adopting a binary output method as an image forming method which is stable in terms of data handling and the circuit scale, is increasing, and hence, some techniques such as the dither method, the error diffusion method, and the like have been proposed.

As for the dither method, the period of itself interferes with that of image data, thus causing image quality deterioration such as moire, and its periodicity causes reproduction errors of thin lines, characters, and the like.

As an image binarization method that can assure higher image quality, an error diffusion method (to be simply referred to as an ED method hereinafter), a mean density preservation method (to be referred to as an MD method hereinafter), and the like, which binarize an image while preserving the density, are known. These methods express halftones macroscopically by attaining area gradation expression using a smaller number of gray levels. That is, these methods are pseudo halftone expression methods. Since these methods allow image formation with a smaller number of gray levels, the load on hardware that processes image data can be reduced.

However, when the number of gray levels (m bits) of an image is decreased in consideration of a simple hardware arrangement and a system configured via a network, problems such as sweeping, texture, and the like are posed upon forming, especially, a 1-bit image. These problems are unique to the ED and MD methods. More specifically, no dots are formed on a low-density portion following a black character, or a pattern like a bug creep mark is formed. FIGS. 46 and 47 are enlarged views of these states.

FIG. 46 is an enlarged view of a low-density portion. When a high-density line or character is present in an even low-density portion, no dots are formed after the line or character (the above-mentioned sweeping) (the arrow indicates the point of interest). FIG. 47 is an enlarged view of a high-density portion. When an even middle-density portion is subjected to ED processing, a unique texture is generated (the arrow indicates the point of interest). These problems stand out in the low- and middle-density portions.

There is also a problem not only in forming a 1-bit image, but also in forming a 2-bit image, that a pseudo edge not shown, called switching noise is generated.

In the hardware arrangement, a FIFO memory for several bits (in depth direction)×several lines is required to hold errors caused by n-value conversion of the ED method, resulting in high cost.

SUMMARY OF THE INVENTION

The present invention has been made in consideration of the above-mentioned problems, and has as its object to provide an image processing apparatus and method which are free from any problems such as sweeping, texture, and the like even when the number of gray levels of an image is decreased.

It is another object of the present invention to provide an image processing apparatus and method, which can remove sweeping and texture as problems unique to the ED method or screen method without emphasizing granularity, solve the problem of a pseudo edge, and suppress moire.

It is still another object of the present invention to provide an image processing apparatus and method which can solve problems of sweeping and texture while suppressing granular noise by generating random numbers whose maximum value is controlled at intervals of several pixels with respect to the value of an input video signal, and adding random pairs of positive and negative or negative and positive random numbers having equal absolute values to the value of a video signal at intervals of several pixels.

It is still another object of the present invention to provide an image processing apparatus and method which can solve the problems such as sweeping, texture, and the like without emphasizing granularity, while holding edge information by adding, to input image information, a random number generated based on edge information detected from the input image information.

It is still another object of the present invention to provide an image processing apparatus and method, which can remove sweeping and texture as problems unique to the ED method without emphasizing granularity, solve the problem of a pseudo edge, and suppress moiré.

It is still another object of the present invention to provide an image processing apparatus and method, which can decrease the number of bits required for a memory that holds errors and can also reduce cost by executing the following processings. That is, after pseudo halftone processing of L level is performed, by setting the quotient and remainder, which are obtained by dividing an input video signal by an arbitrary constant, respectively to be upper- and lower-bit signals. binarization is performed by comparing it with a random number or a dither signal, and errors generated as a result of error diffusion processing of the pseudo halftone signal of the L level are corrected as accumulated errors of neighboring pixels with respect to the input video signal.

It is still another object of the present invention to provide an image processing apparatus and method which can remove texture unique to the density preservation method by adding a pseudo random number to image data, and reproduce a stable halftone for a halftone image such as a photograp by varying the period of the random number, thus obtaining a sharp image for an edge portion.

The above and other objects of the present invention will become apparent from the following detailed description taken in conjunction with the accompanying drawings.

DETAILED DESCRIPTION OF THE PREFERRED EMBODIMENTS

The preferred embodiments of the present invention will be described in detail hereinafter with reference to the accompanying drawings.

[First Embodiment]

Figure 1:
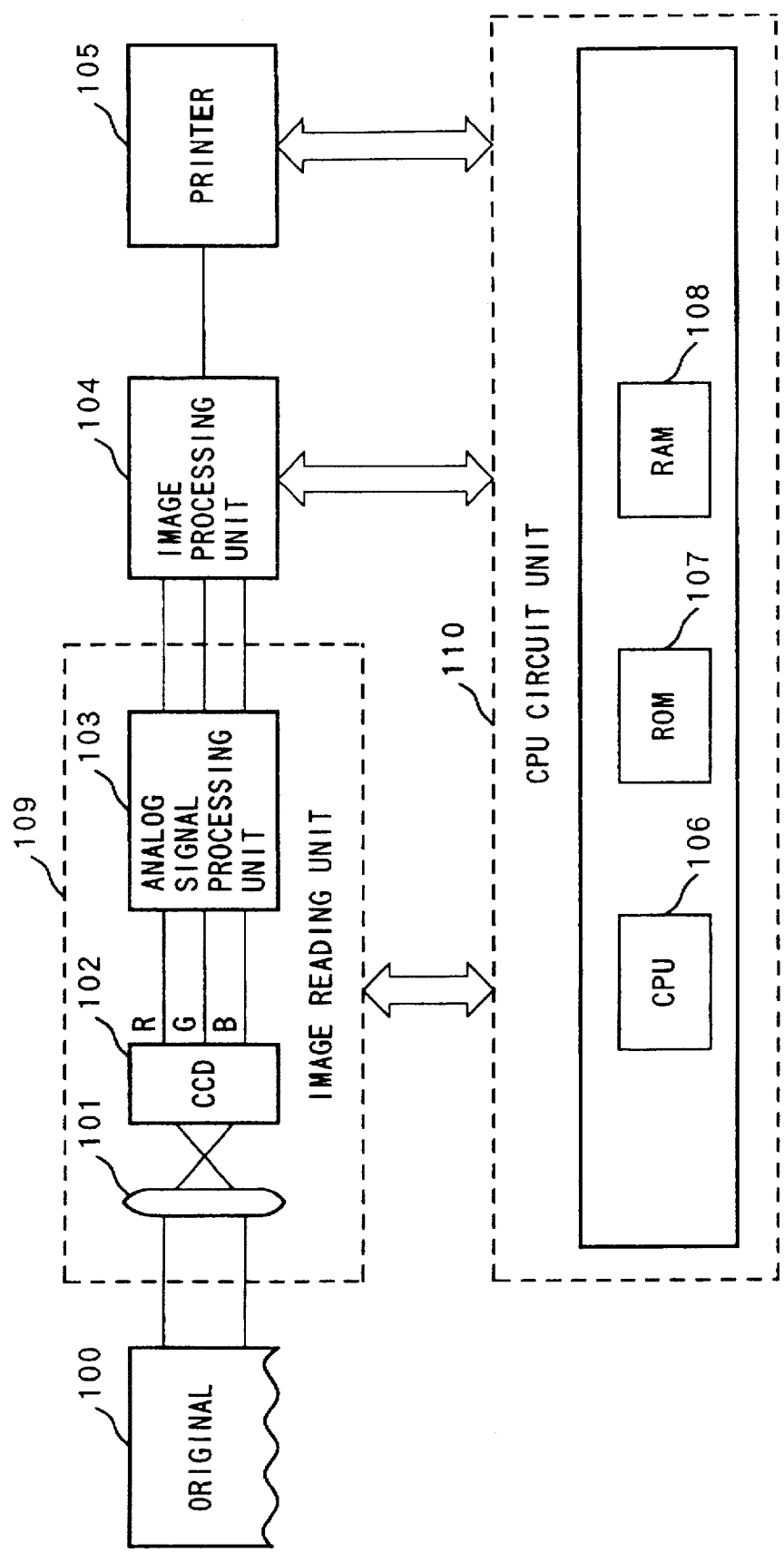
FIG. 1 is a block diagram showing the arrangement of an image forming apparatus according to an embodiment of the present invention.

FIG. 1 is a block diagram showing the arrangement of an image forming apparatus according to the first embodiment of the present invention. Referring to FIG. 1, an image reading unit 109 is constituted by a CCD sensor 102, an analog signal processing unit 103, and the like, and an original image formed on the CCD sensor 102 via a lens 101 is converted into R (Red), G (Green), and B (Blue) analog electrical signals by the CCD sensor 102. The converted image signals are input to the analog signal processing unit 103, and are subjected to sample & hold processing, dark level correction, and the like in units of R, G, and B colors. Thereafter, the analog signals are analog-to-digital (A/D) converted into digital signals.

The full-color signals thus digitized are input to an image processing unit 104. The image processing unit 104 performs correction processing required for the reading system such as shading correction, color correction, γ correction, and the like, and other processing operations such as smoothing processing, edge emphasis, and the like, and outputs the processing result to a printer unit 105.

The printer unit 105 is constituted by, e.g., an exposure control unit including a laser unit (not shown) and the like, an image forming unit, a feed control unit for a transfer paper sheet, and the like, and records an input image signal on a transfer paper sheet as an image.

A CPU circuit unit 110 shown in FIG. 1 is constituted by a CPU 106, a ROM 107, a RAM 108, and the like, and systematically controls the sequence of the apparatus of this embodiment by controlling the image reading unit 109, the image processing unit 104, the printer unit 105, and the like.

The image processing unit 104 shown in FIG. 1 will be described below.

Figure 2:
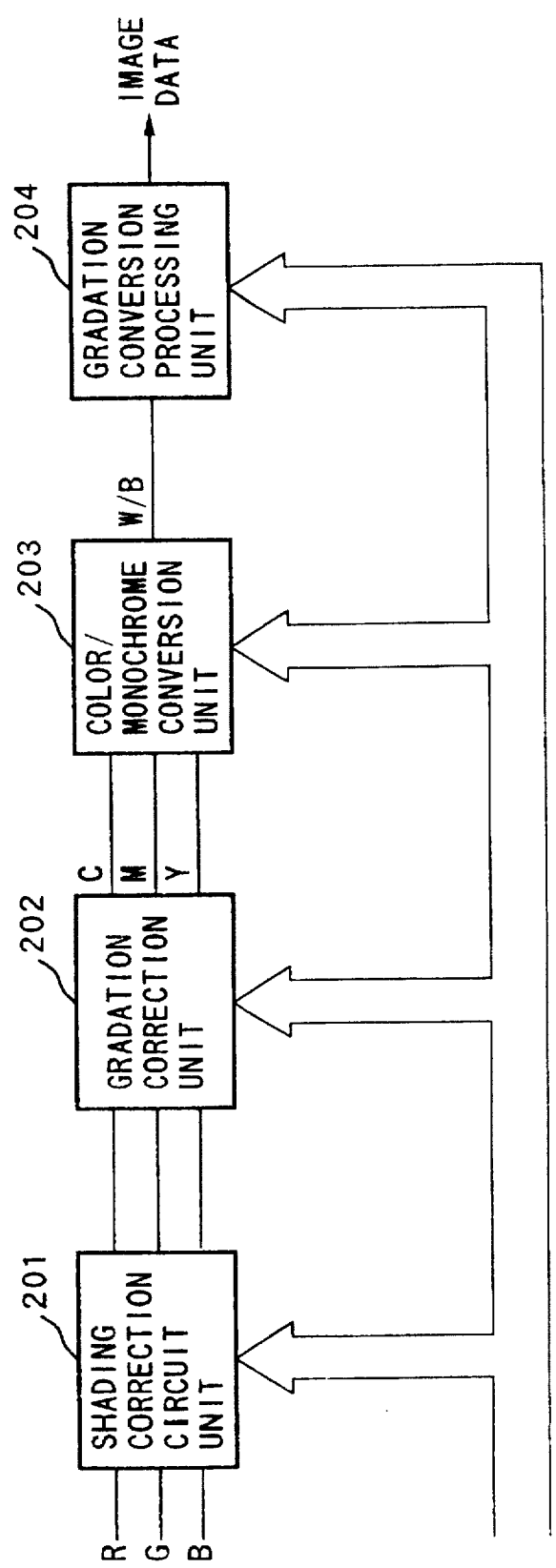
FIG. 2 is a block diagram showing the arrangement of an image processing unit 104.

FIG. 2 is a block diagram showing the arrangement of the image processing unit 104. In the image processing unit shown in FIG. 2, digital image signals output from the analog signal processing unit 103 shown in FIG. 1 are input to a shading correction circuit unit 201. The shading correction circuit unit 201 corrects variations of sensors that read an original image, and the light distribution characteristics of a lamp for illuminating an original. The corrected image signals are input to a gradation correction unit 202 to be converted from luminance signals into density data, thus generating density image data.

The image signals converted into density data are input to a color/monochrome conversion unit 203 which outputs monochrome data. The monochrome data output from the color/monochrome conversion unit 203 are input to a gradation conversion processing unit 204, and are subjected to error diffusion processing (density preservation type quantization processing) to attain pseudo halftone expression. When color image signals are to be output, Y, M, and C data output from the gradation correction unit 202 are respectively subjected to the conversion processing in the gradation conversion processing unit 204.

The gradation conversion processing unit will be described in detail below.

Figure 3:
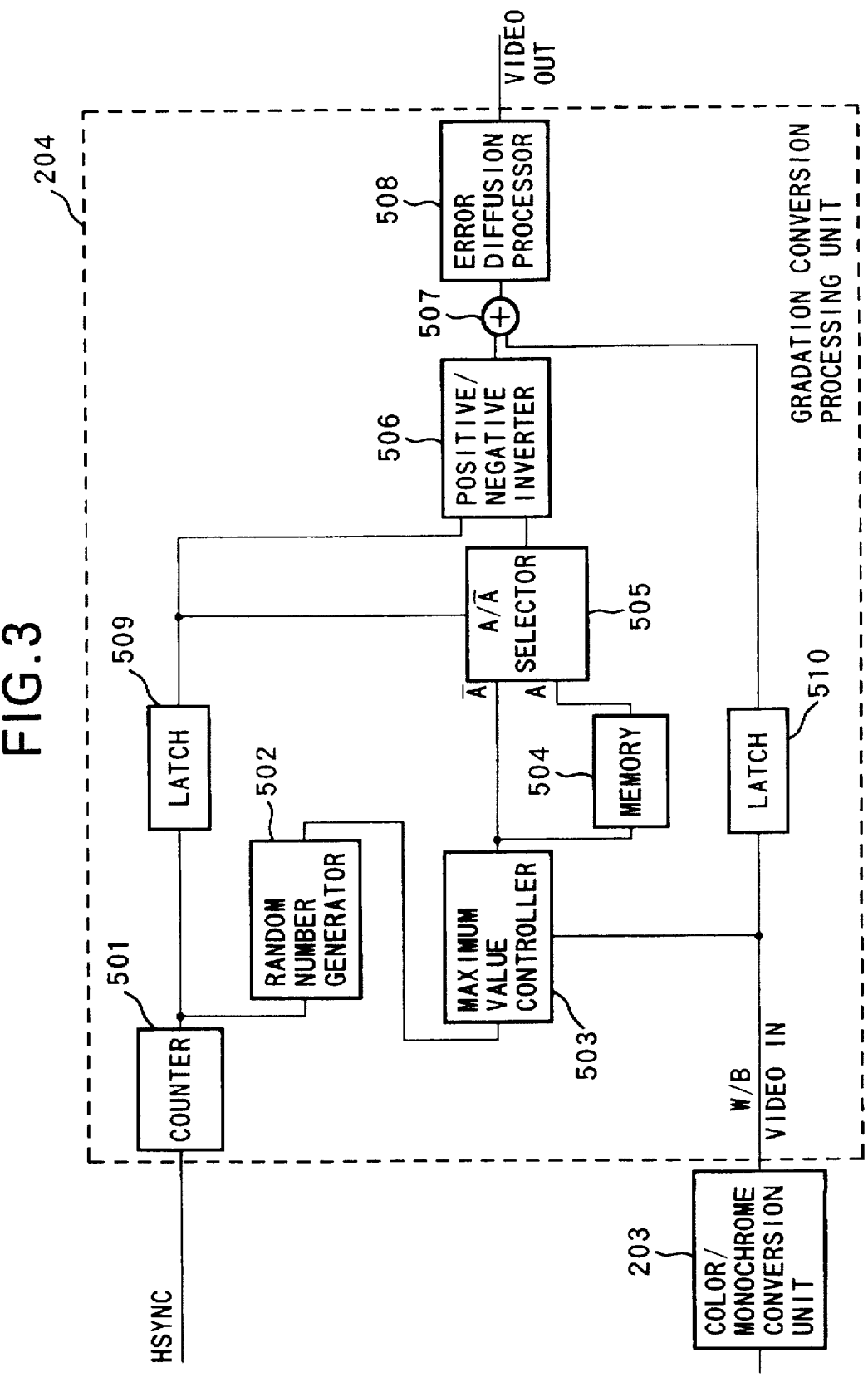
FIG. 3 is a block diagram showing in detail the arrangement of a gradation conversion processing unit 204 in the first embodiment.

FIG. 3 is a block diagram showing in detail the arrangement of the gradation conversion processing unit 204 according to the first embodiment. In the gradation conversion processing unit shown in FIG. 3, a counter 501 alternately generates timing signals of 0 and 1 at a 2-pixel period with reference to an Hsync signal. The timing signals output from the counter 501 are input to a random number generator 502, which generates a positive random number value only when the timing signal is 0.

The signal output from the random number generator 502 is input to a maximum value controller 503 simultaneously with a signal (W/B) from the color/monochrome conversion unit 203. The maximum value controller 503 comprises a 255×255×8-bit look-up table, and controls the amplitude of an 8-bit signal from the random number generator 502 in accordance with an 8-bit signal from the color/monochrome conversion unit 203.

That is, when the 8-bit signal value input from the color/monochrome conversion unit 203 is small, the maximum value controller 503 performs output control to forcibly decrease the 8-bit signal value input from the random number generator 502. On the other hand, when the 8-bit signal value input from the color/monochrome conversion unit 203 is large, the maximum value controller 503 performs output control to amplify the 8-bit signal value input from the random number generator 502.

Note that the upper limit value of amplification of the signal value from the random number generator 502 is determined using an arbitrary value.

Figure 4:
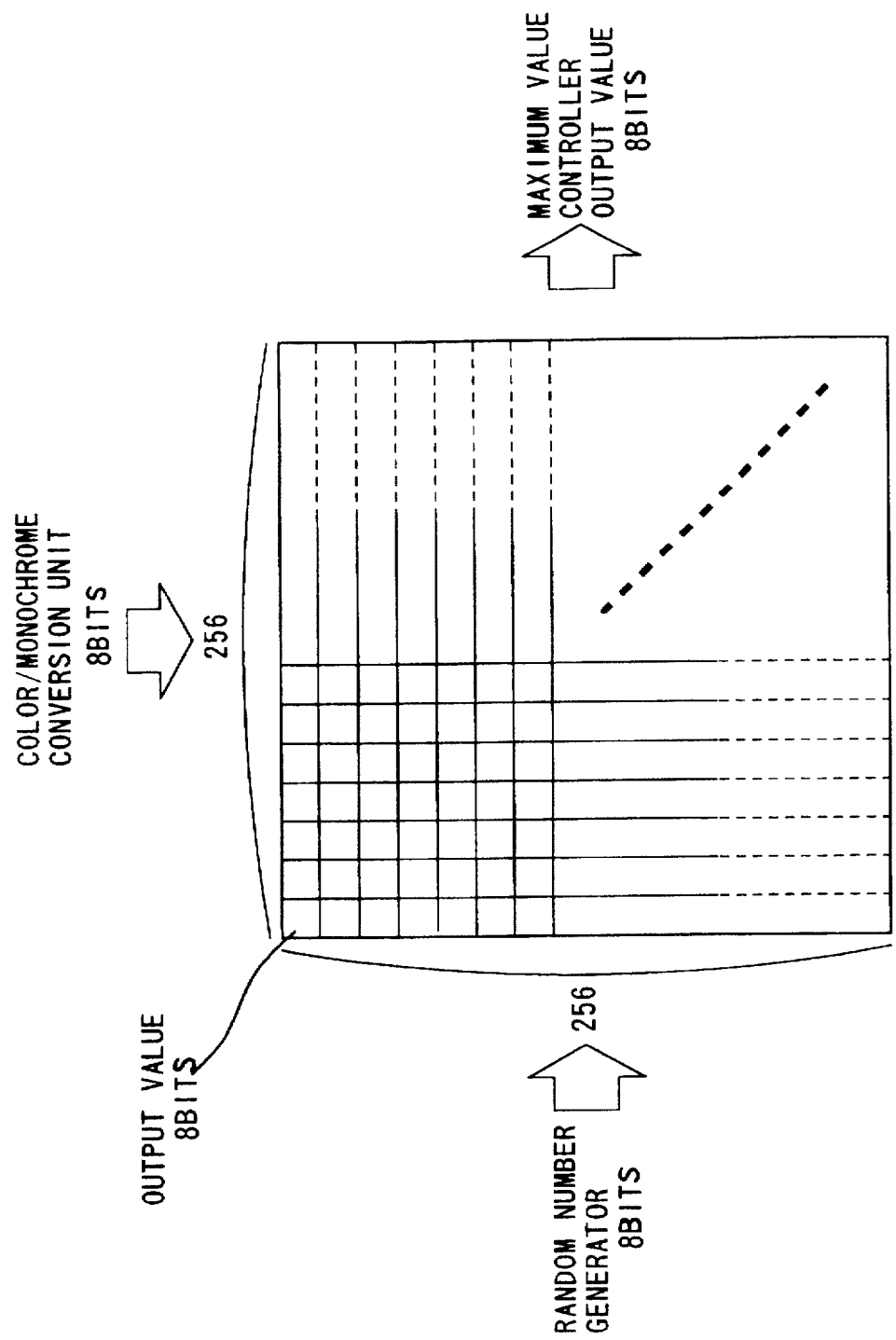
FIG. 4 is a view showing the concept of the table arrangement of a maximum value controller 503.

FIG. 4 is a view showing the concept of the table arrangement of the maximum value controller 503. FIG. 4 shows the state wherein 8-bit output values are written in a matrix memory. That is, the matrix memory receives an 8-bit signal from the color/monochrome conversion unit 203 and an 8-bit signal from the random number generator 502, and outputs a memory value at the coordinate position defined by the two signals. Note that an input A of a selector 505 receives data from a memory 504, and an input $\overline{A}$ thereof receives data from the maximum value controller 503.

The signal output from the maximum value controller 503 with the above arrangement is input to the memory 504 and the selector 505. The memory 504 temporarily stores the 8-bit signal value. The selector 505 switches its inputs A and $\overline{A}$ on the basis of the signal from the counter 501, which is synchronized with the timing of the maximum value controller 503, and outputs the input signal value.

More specifically, when the signal from the counter 501 is 0, the selector 505 directly outputs the signal from the maximum value controller 503; when the signal from the counter 501 is 1, the selector 505 outputs the signal from the memory 504. With this arrangement, an identical signal value can be output for two consecutive pixels.

In this manner, the signal value output from the selector 505 is input to a positive/negative inverter 506. The positive/negative inverter 506 performs control to switch the algebraic sign of the signal value input from the selector 505 to positive or negative on the basis of the timing signal from the counter 501. For example, when the signal value from the counter 501 is 0, the inverter 506 directly outputs the signal value from the selector 505 while leaving it "plus"; when the signal value from the counter 501 is 1, the inverter 506 inverts the sign of the signal value from the selector 505 to "minus", and outputs the inverted signal value.

The signal value output from the positive/negative inverter 506 is added to a VIDEO signal output from the color/monochrome conversion unit 203, which has been timing-corrected in a latch 510, by an adder 507, and the sum is input to an error diffusion processor 508. Although not shown, when the signal value as a result of addition of the adder 507 exceeds 255 (8 bits) or becomes equal to or smaller than 0, processing for clipping the signal value to 255 or 0 is performed. The error diffusion processor 508 performs processing based on a normal 1-bit error diffusion method, though a detailed description thereof will be omitted.

Note that the number of bits of the error diffusion processing is not limited to 1 bit, but error diffusion processing to 2 to 4 bits may be performed. Also, the error diffusion processor 508 diffuses errors generated upon conversion of m-bit input data into n-bit output data (m and n are integers and m>n) to surrounding input data by multiplying them with predetermined weighting coefficients.

The VIDEO signal subjected to the above-mentioned processing is output from the image processing unit 104, and is finally output from the printer unit 105.

As described above, according to the first embodiment, as the pre-processing of the error diffusion method as the density preservation type quantization method, the signal value of the random number generator is controlled in accordance with the input VIDEO signal value. That is, in a high-density portion, a normal random number is added to the VIDEO signal value while changing its sign to positive or negative. In a low-density portion, since granularity is conspicuous, a random number is added to the VIDEO signal value while gradually suppressing the amplitude of the random number and changing its sign to positive or negative as the density changes from high density to low density. In this manner, the granularity of images can be suppressed in consideration of the visual characteristics.

<Modification of First Embodiment>

Figure 5:
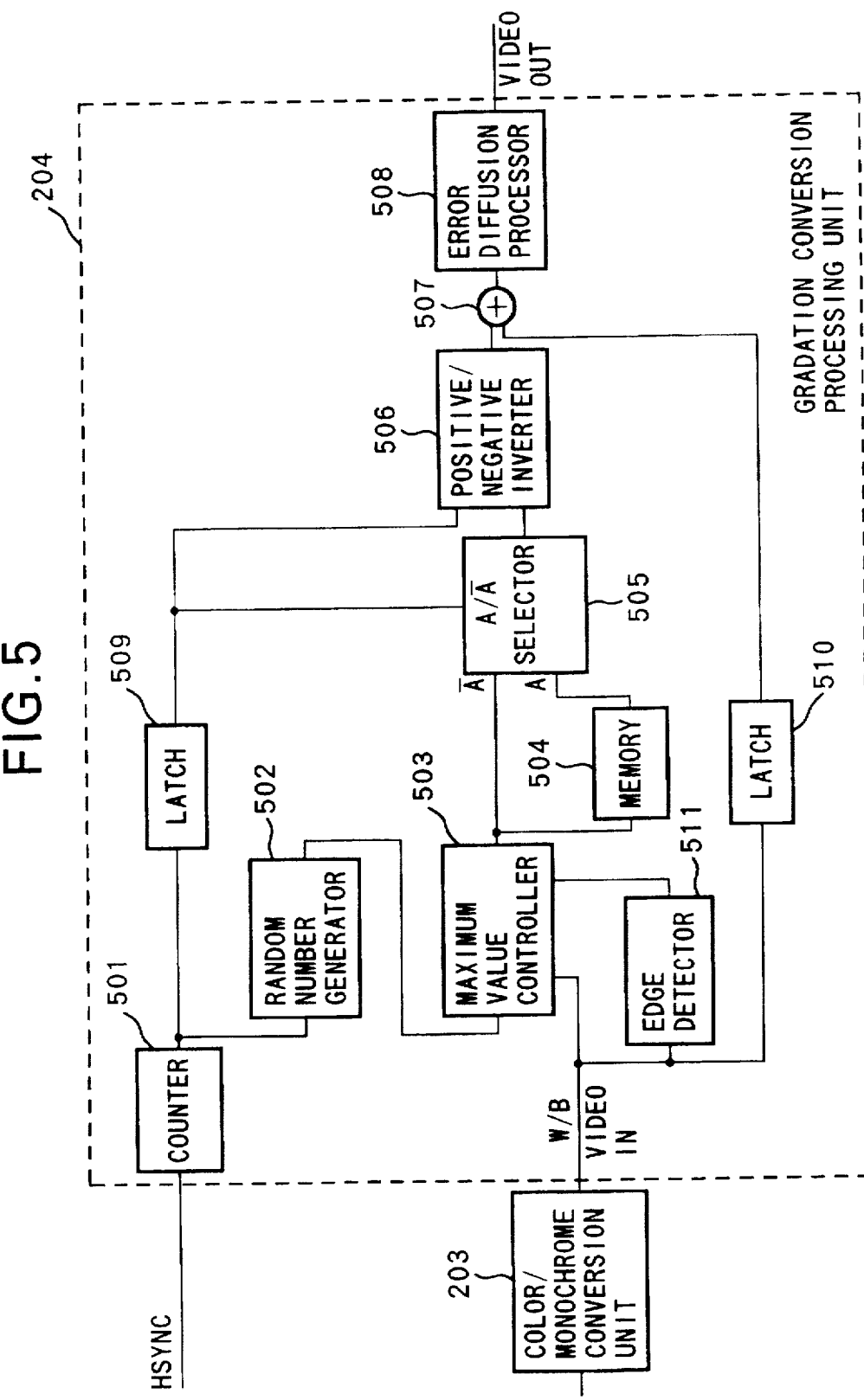
FIG. 5 is a block diagram showing the arrangement of a gradation conversion processing unit according to a modification of the gradation conversion processing unit 204 according to the first embodiment.

FIG. 5 is a block diagram showing the arrangement of the gradation conversion processing unit according to a modification of the gradation conversion processing unit 204 according to the first embodiment shown in FIG. 3. Note that the same reference numerals in FIG. 5 denote the same parts as in FIG. 3, and a detailed description thereof will be omitted.

In the gradation conversion processing unit shown in FIG. 5, a signal output from the color/monochrome conversion unit 203 is also input to an edge detector 511. The signal from color/monochrome conversion unit 203 is input to the maximum value controller 503 simultaneously with the signal output from the random number generator 502 and the signal output from the edge detector 511.

The maximum value controller 503 according to this modification controls the amplitude of an 8-bit signal from the random number generator 502 in accordance with an 8-bit signal from the color/monochrome conversion unit 203 and the signal from the edge detector 511.

In this modification, when the signal from the edge detector 511 is input to the maximum value controller 503, the 8-bit signal value input from the random number generator 502 is controlled to be forcibly decreased and output, independently of the magnitude of the 8-bit signal value input from the color/monochrome conversion unit 203.

As described above, according to the modification of the first embodiment, since the signal value of the random number generator is controlled in accordance with edge information of the input VIDEO signal so as not to decrease the edge information by adding a random number to an edge portion of a thin line, a character, or the like, the edge information of input image information can be held, and an increase in granularity can be suppressed.

|Second Embodiment|

The second embodiment according to the present invention will be described below. Note that the same reference numerals in the arrangement of an image processing apparatus of this embodiment denote the same parts as in the arrangement of the first embodiment, and a detailed description thereof will be omitted.

Figure 6:
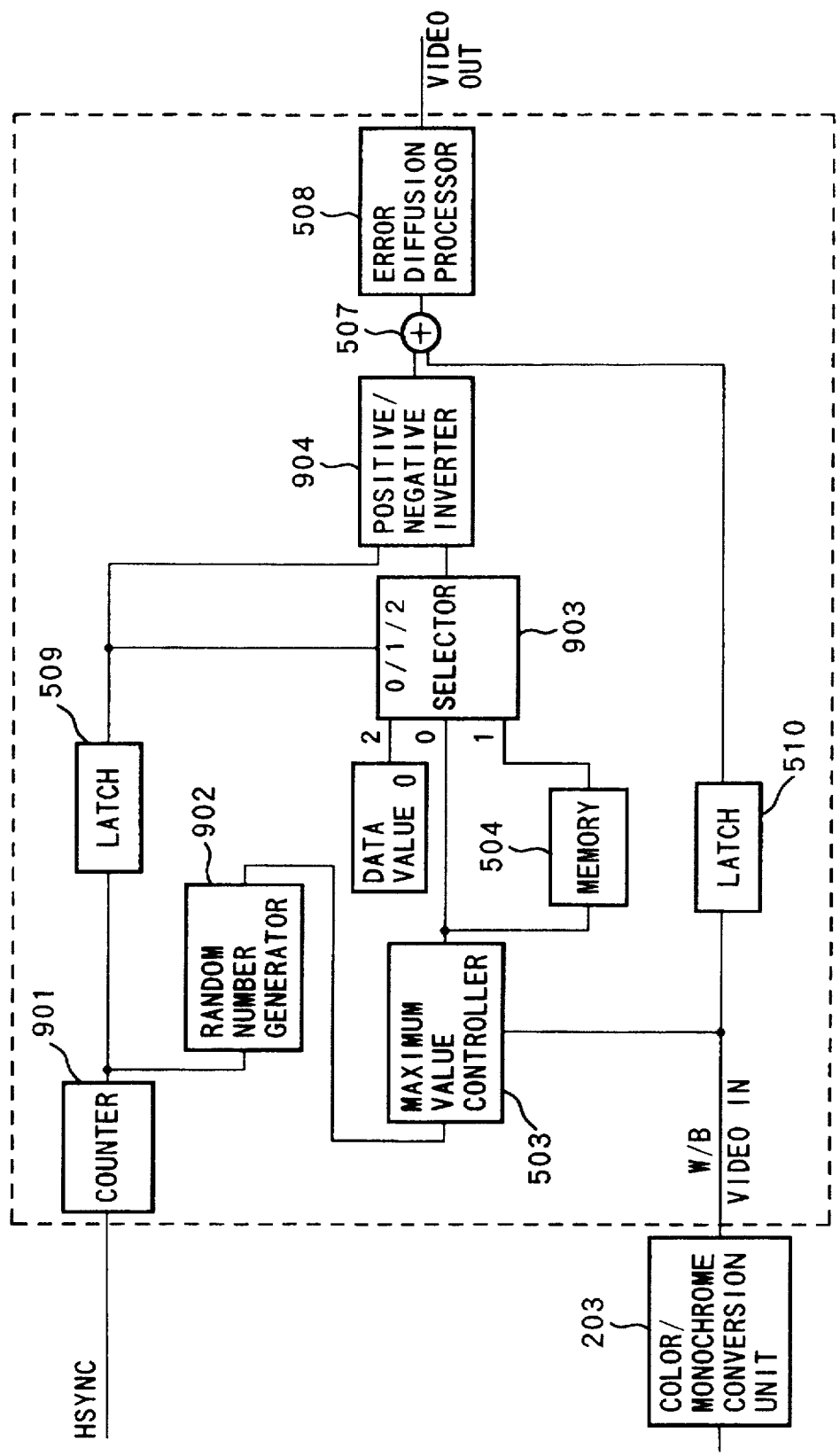
FIG. 6 is a block diagram showing the arrangement of a gradation conversion processing unit according to the second embodiment.

FIG. 6 is a block diagram showing the arrangement of a gradation conversion processing unit according to the second embodiment. Referring to FIG. 6, a counter 901 generates timing signals of 0, 1, and 2 in turn at a 3-pixel period with reference to an Hsync signal. The timing signal output from the counter 901 is input to a random number generator 902, which generates a positive random number only when the timing signal is 0.

The signal output from the random number generator 902 is input to a maximum value controller 503 simultaneously with the signal from a color/monochrome conversion unit 203. The maximum value controller 503 performs the same processing as in the first embodiment, and thereafter, outputs the obtained signal value to a selector 903.

The selector 903 performs processing for switching three signal values in accordance with the timing signal from the counter 901, which has been timing-corrected in a latch 509. The three signals are a signal having data value 0, the signal from the maximum value controller 503, and the signal from a memory 504. When a switching signal is 0, the selector 903 directly outputs the signal from the maximum value controller 503; when the switching signal is 1, the selector 903 outputs the signal from the memory 504; and when the switching signal is 2, the selector 903 outputs the value 0.

In this manner, the signal output from the selector 903 is input to a positive/negative inverter 904, and its sign is switched to positive/negative/0 in accordance with the timing signal from the counter 901. More specifically, when the signal value from the counter 901 is 0 or 2, the inverter 904 directly outputs the signal value from the selector 903 while leaving it "plus"; when the signal value from the counter 901 is 1, the inverter 904 inverts the sign of the signal value from the selector 903 to "minus" and outputs the inverted signal value.

The signal value output from the positive/negative inverter 904 is processed in the same manner as in the first embodiment, and the processed signal is output from an error diffusion processor 508. The VIDEO signal subjected to the above-mentioned processing is output from an image processing unit 104, and is finally output from a printer unit 105.

As described above, according to the second embodiment, since texture patterns generated upon n-value conversion processing tend to be connected vertically as compared to the first embodiment, and dots are connected vertically, stable image formation in terms of the process can be realized.

<Modification of Second Embodiment>

Figure 7:
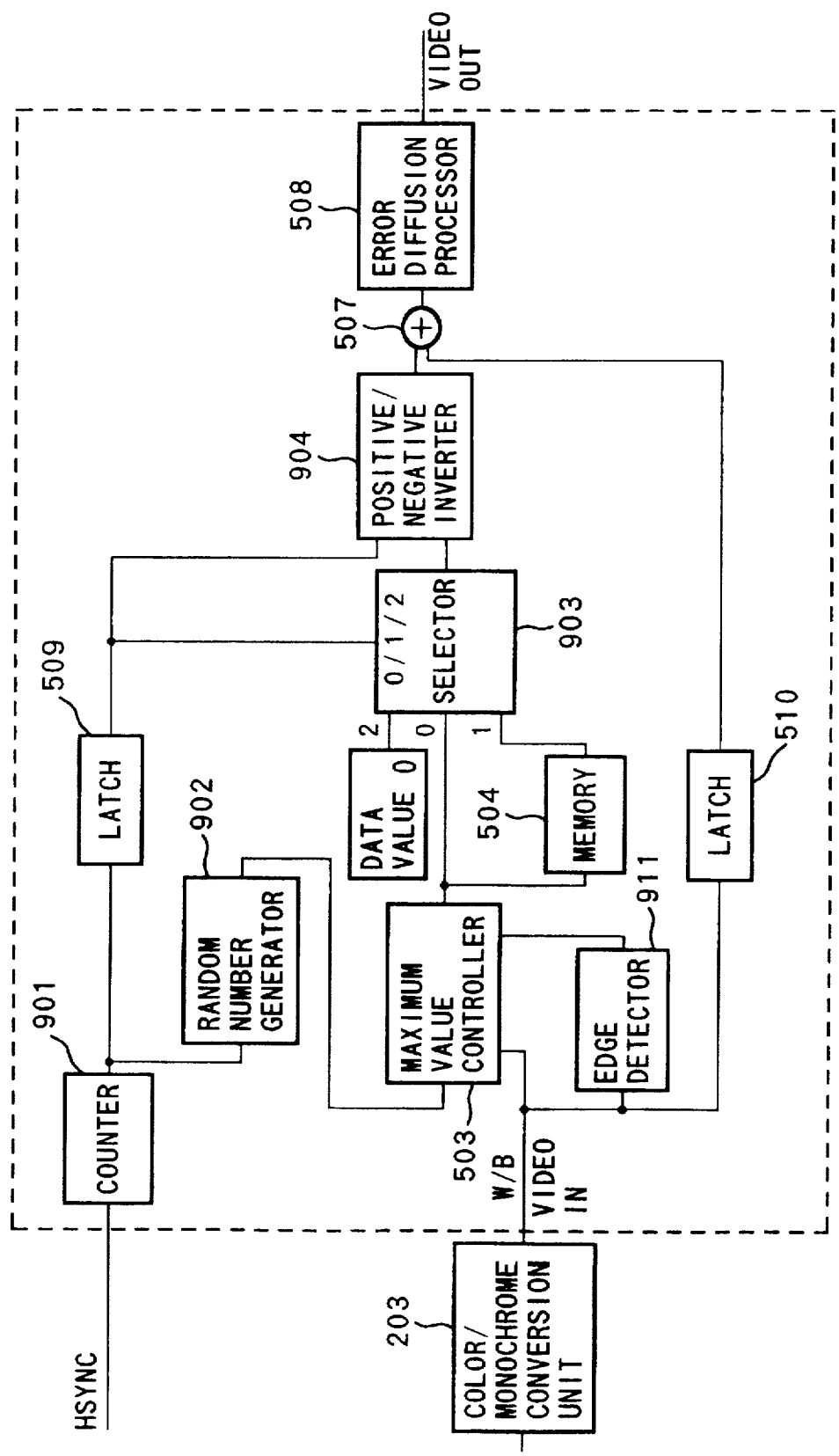
FIG. 7 is a block diagram showing the arrangement of a gradation conversion processing unit according to a modification of the second embodiment.

FIG. 7 is a block diagram showing the arrangement of the gradation conversion processing unit according to a modification of the second embodiment. As shown in FIG. 7, in the gradation conversion processing unit according to this modification, an edge detector 911 is added to the gradation conversion processing unit shown in FIG. 6.

More specifically, in this modification, the signal output from the random number generator 902 is input to the maximum value controller 503 simultaneously with the signal from the color/monochrome conversion unit 203 and the signal from the edge detector 911.

In this manner, since the random number value to be added to the signal value of an original image is controlled in accordance with edge information, the edge information of the original image can be preserved.

[Third Embodiment]

The third embodiment according to the present invention will be described below. Note that the same reference numerals in the arrangement of an image processing apparatus of this embodiment denote the same parts as in the arrangement of the first embodiment, and a detailed description thereof will be omitted.

Figure 8:
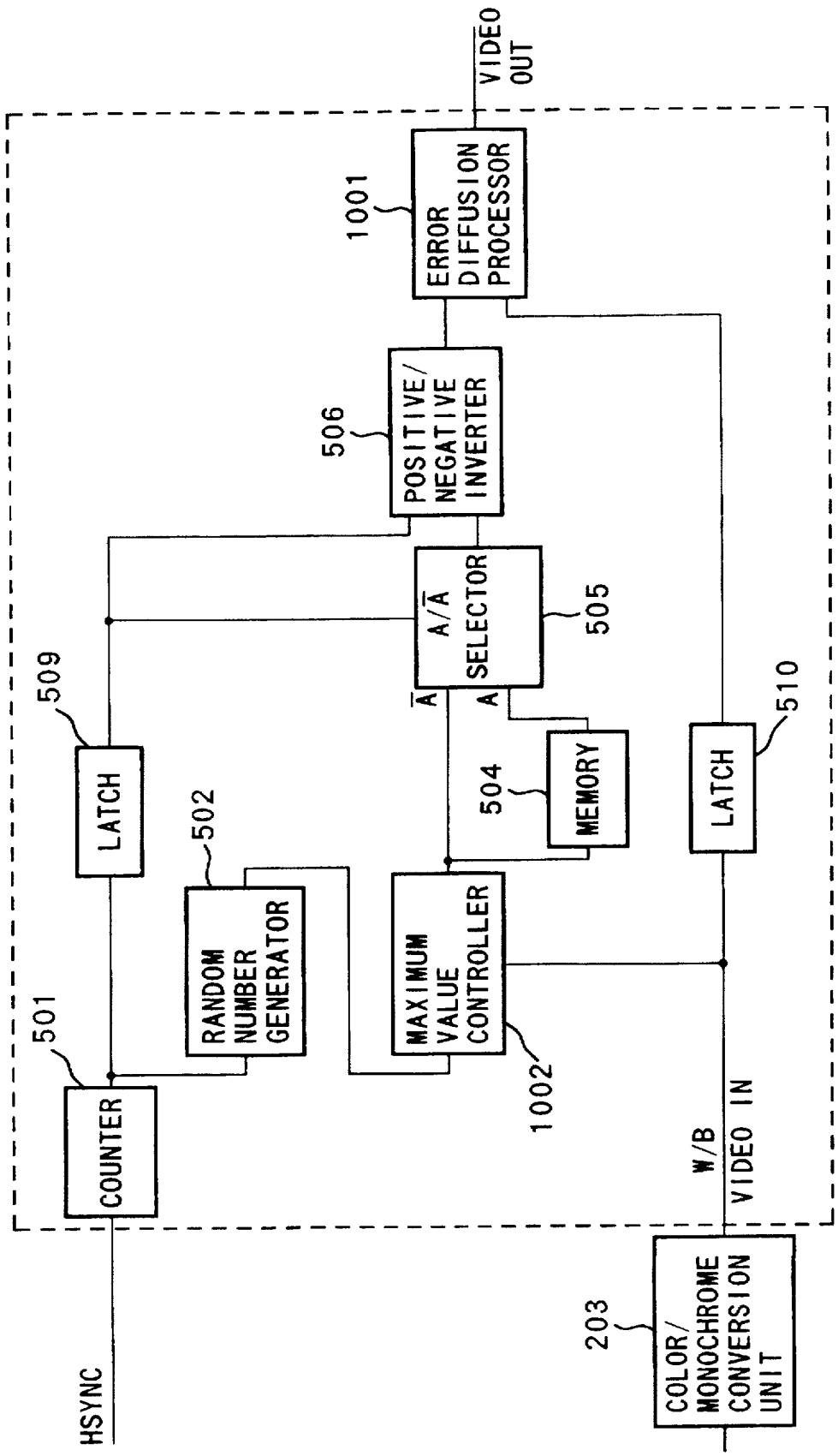
FIG. 8 is a block diagram showing the arrangement of a gradation conversion processing unit according to the third embodiment.

FIG. 8 is a block diagram showing the arrangement of a gradation conversion processing unit according to the third embodiment. Referring to FIG. 8, a maximum value controller 1002 comprises a 255×255×8-bit look-up table as in the first embodiment, and controls the amplitude of an 8-bit signal from a random number generator 502 in accordance with an 8-bit signal from a color/monochrome conversion unit 203.

More specifically, when the 8-bit signal value input from the color/monochrome conversion unit 203 is small, the maximum value controller 1002 performs output control to forcibly decrease the 8-bit signal value input from the random number generator 502. On the other hand, when the 8-bit signal value input from the color/monochrome conversion unit 203 is large, the maximum value controller 1002 performs output control to amplify the 8-bit signal value input from the random number generator 502.

However, the point which differentiates the maximum value controller 1002 according to the third embodiment from the maximum value controller of the first embodiment is that the amplification limit value of the output signal value is set to be a value equal to or smaller than a value twice as large as a level of a first threshold value of an error diffusion processor 1001.

The signal value subjected to the same processing as in the first embodiment, as described above, is output from a positive/negative inverter 506, and is input to the error diffusion processor 1001 simultaneously with the signal from the color/monochrome conversion unit 203, which has been timing-corrected in a latch 510. This error diffusion processor 1001 performs processing for adding the signal value input from the positive/negative inverter 506 to a threshold value for an n-value conversion, although not shown. The signal value output from the error diffusion processor 1001 is output from an image processing unit 104, and is finally output from a printer unit 105.

As described above, according to this embodiment, since the processed random number is added to a threshold value for the n-value conversion in accordance with the ED method, the granularity of an image can be suppressed in consideration of the visual characteristics.

<Modification of Third Embodiment>

Figure 9:
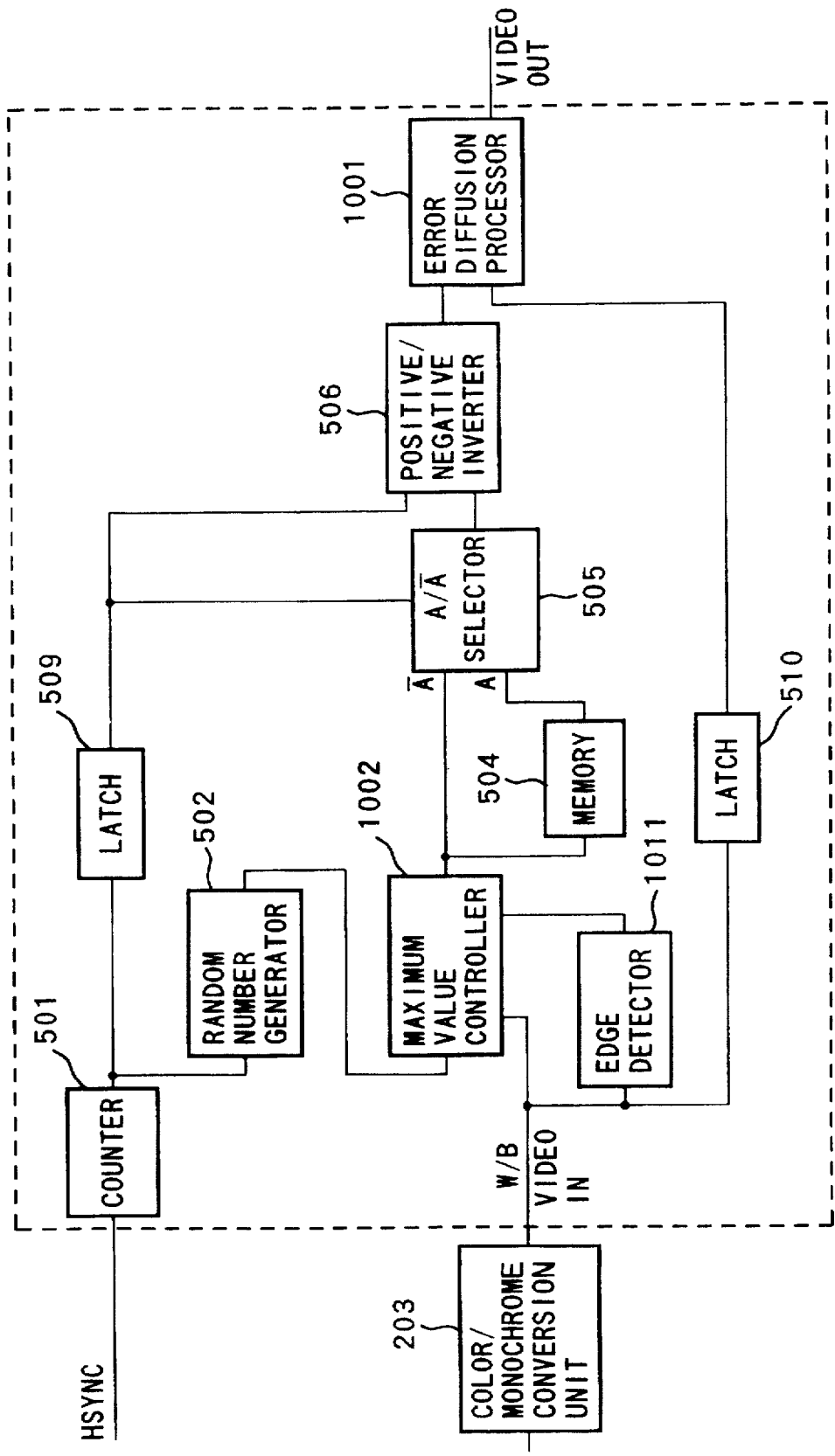
FIG. 9 is a block diagram showing the arrangement of a gradation conversion processing unit according to a modification of the third embodiment.

FIG. 9 is a block diagram showing the arrangement of the gradation conversion processing unit according to a modification of the third embodiment. As shown in FIG. 9, in the gradation conversion processing unit according to this modification, an edge detector 1011 is added to the gradation conversion processing unit shown in FIG. 8.

More specifically, when a signal from the edge detector 1011 is input to the maximum value controller 1002, the 8-bit signal value input from the random number generator 502 is controlled to be forcibly decreased and output, independently of the magnitude of the 8-bit signal value input from the color/monochrome conversion unit 203.

As described above, according to this modification, since the signal value of the random number generator is controlled in accordance with edge information of the input VIDEO signal, the edge information of input image information can be held, and an increase in granularity can be suppressed.

[Fourth Embodiment]

The fourth embodiment according to the present invention will be described below. Note that the same reference numerals in the arrangement of an image processing apparatus of this embodiment denote the same parts as in the arrangements of the first and second embodiments, and a detailed description thereof will be omitted.

Figure 10:
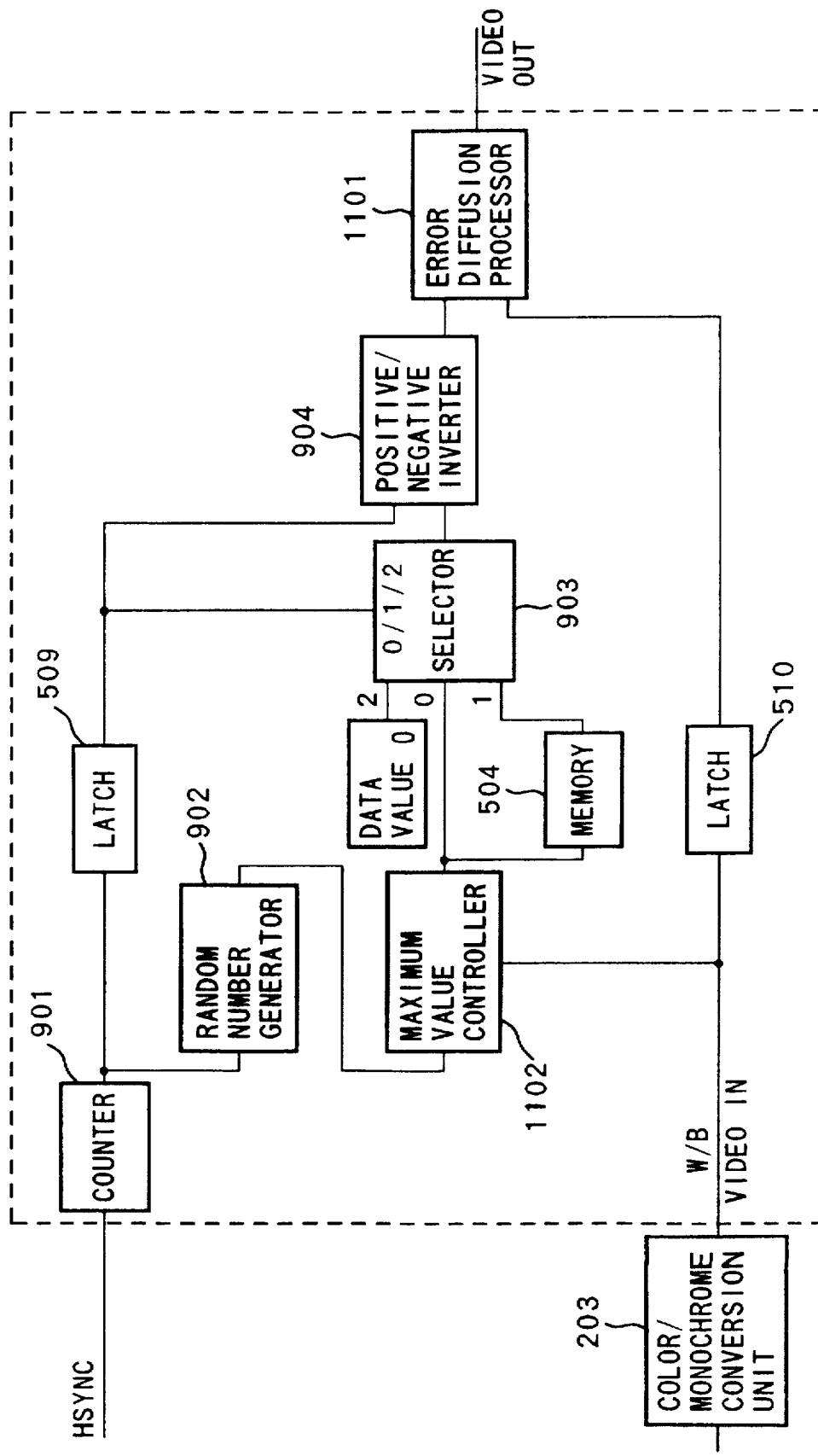
FIG. 10 is a block diagram showing the arrangement of a gradation conversion processing unit according to the fourth embodiment.

FIG. 10 is a block diagram showing the arrangement of a gradation conversion processing unit according to the fourth embodiment. Referring to FIG. 10, a maximum value controller 1102 comprises a 255×255×8-bit look-up table as in the second embodiment, and controls the amplitude of an 8-bit signal from a random number generator 902 in accordance with an 8-bit signal from a color/monochrome conversion unit 203. In the maximum value controller 1102, the amplification limit value of the output signal value is set to be a value equal to or smaller than a value twice as large as a level of a first threshold value of an error diffusion processor 1101.

The signal value obtained as a result of the same processing as in the second embodiment is output from a positive/negative inverter 904, and is input to the error diffusion processor 1101 simultaneously with the signal from the color/monochrome conversion unit 203, which has been timing-corrected in a latch 510. This error diffusion processor 1101 performs processing for adding the signal value input from the positive/negative inverter 904 to a threshold value for an n-value conversion, although not shown. The signal value output from the error diffusion processor 1101 is output from an image processing unit 104, and is finally output from a printer unit 105.

As described above, according to this embodiment, since the processed random number is added to a threshold value of the n-value conversion, the same effect obtained upon adding the processed random value to the VIDEO signal is obtained, i.e., texture patterns generated upon n-value conversion processing tend to be connected vertically, thus allowing image formation which is stable in terms of the process.

<Modification of Fourth Embodiment>

Figure 11:
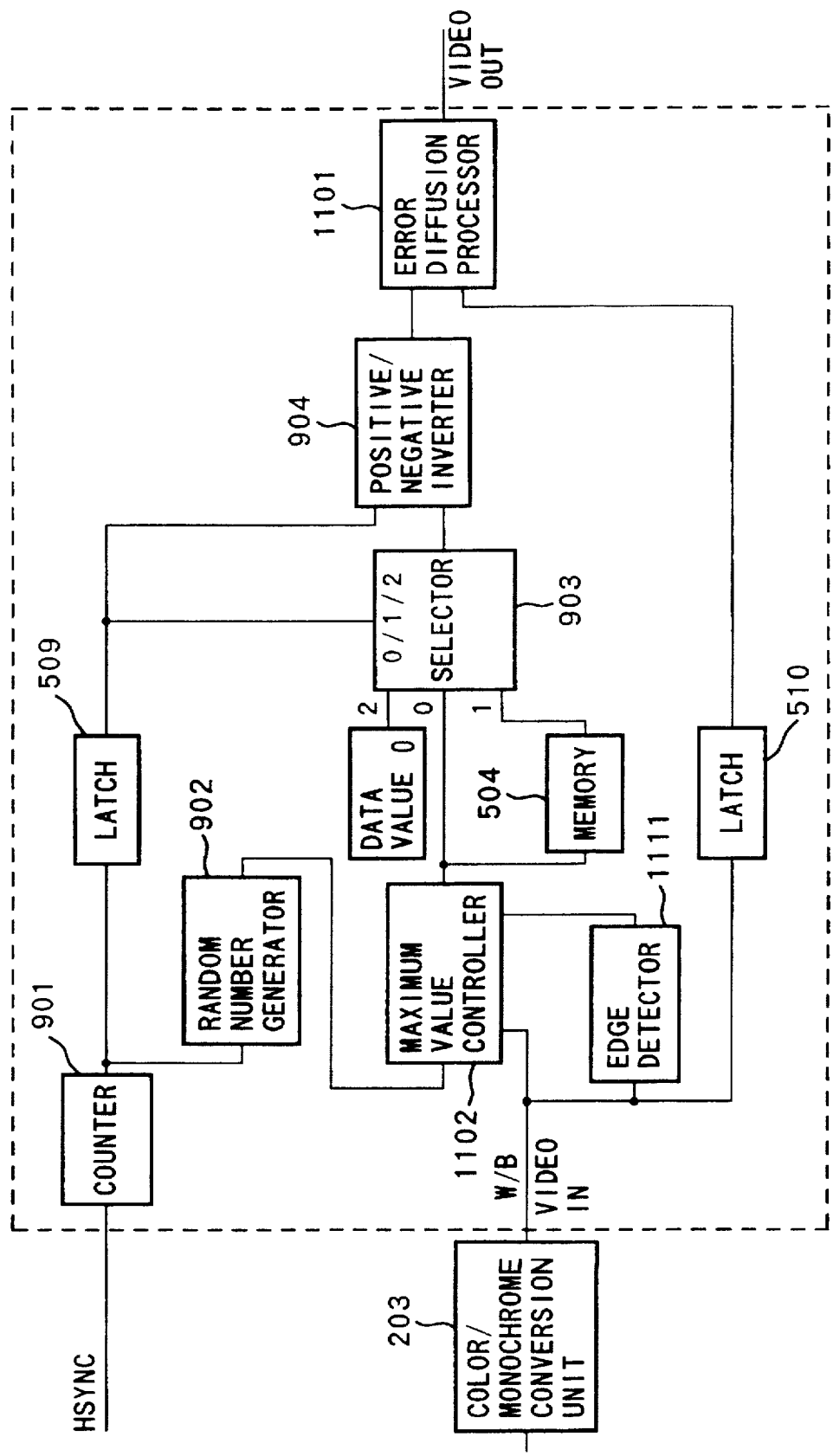
FIG. 11 is a block diagram showing the arrangement of a gradation conversion processing unit according to a modification of the fourth embodiment.

FIG. 11 is a block diagram showing the arrangement of the gradation conversion processing unit according to a modification of the fourth embodiment. As shown in FIG. 11, in the gradation conversion processing unit according to this modification, an edge detector 1111 is added to the gradation conversion processing unit shown in FIG. 10.

More specifically, in this modification, the amplitude of an 8-bit signal from the random number generator 902 is controlled in accordance with an 8-bit signal from the color/monochrome conversion unit 203 and a signal from the edge detector 1111. When a signal from the edge detector 1111 is input to a maximum value controller 1102, the 8-bit signal value input from the random number generator 902 is controlled to be forcibly decreased and output, independently of the magnitude of the 8-bit signal value input from the color/monochrome conversion unit 203.

As described above, by controlling the random number to be added to the signal value of an original image in accordance with edge information, the edge information of the original image can be preserved.

Figure 12:
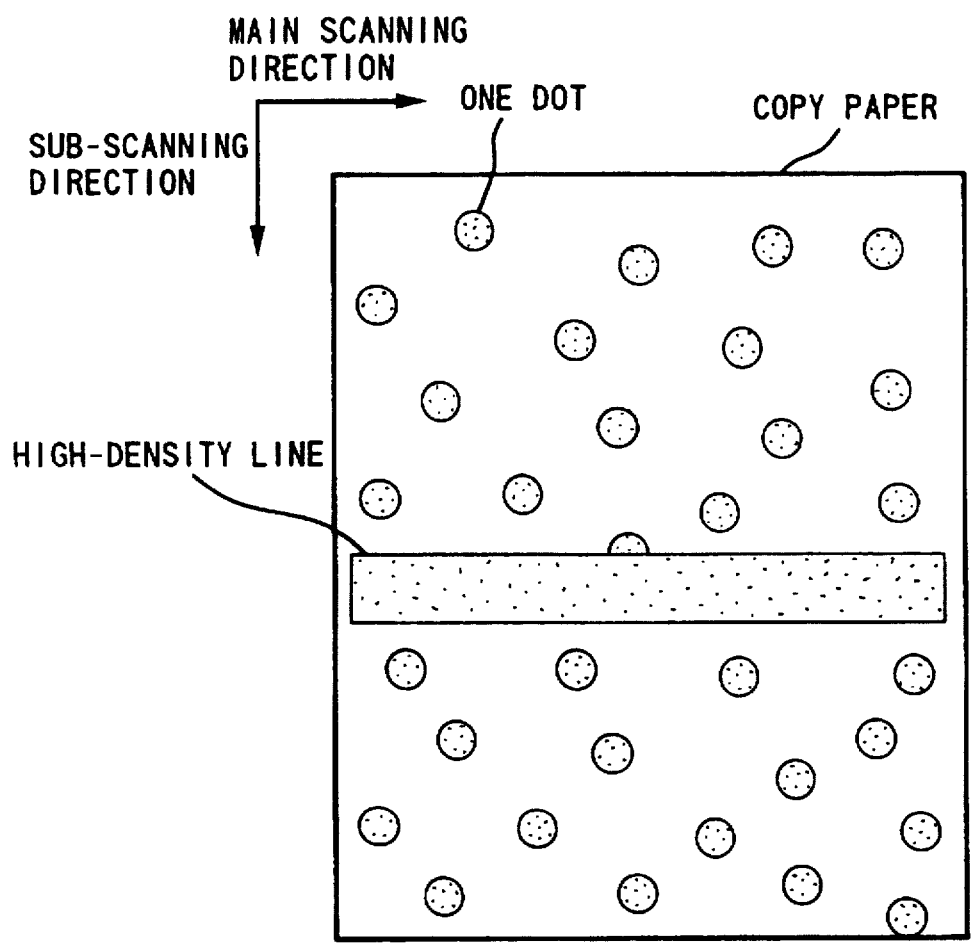
FIG. 12 is an enlarged view of an output image obtained by each of the first to fourth embodiments when a high-density line or character is present in an even low-density portion.
Figure 13:
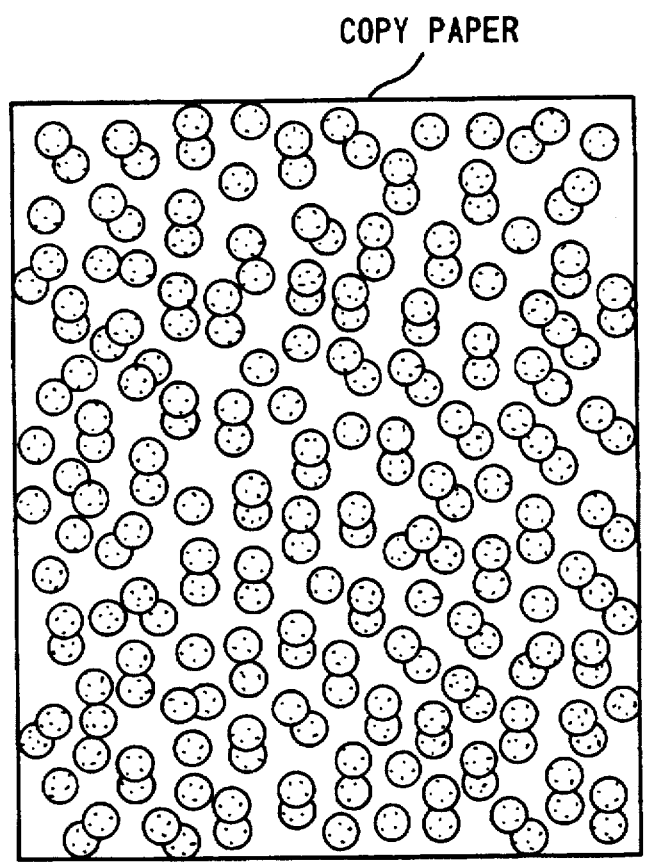
FIG. 13 is an enlarged view of an output image obtained when an even middle-density portion is subjected to ED processing of each of the first to fourth embodiments.

Note that FIGS. 12 and 13 show the gradation conversion processing results according to the above embodiments and their modifications. FIG. 12 shows an output image obtained when a high-density line or character is present in an even low-density portion. FIG. 13 shows an output image obtained when an even middle-density portion is subjected to an ED processing. As can be seen from a comparison between FIGS. 12 and 13 and FIGS. 46 and 47, problems such as sweeping, texture, and the like can be solved by applying the present invention to the gradation conversion processing.

As described above, according to the first to fourth embodiments, since the maximum value of a random number is changed in accordance with the data value of input image information, and the random numbers, the signs of which change from positive to negative or from negative to positive at a predetermined period, are added to the data value, the problems such as sweeping, texture, and the like can be solved without emphasizing the granularity of an image.

Addition of a random number generated based on edge information which is detected from input image information to the input image information solves the problems such as sweeping, texture, and the like, without emphasizing the granularity of an image, while preserving the edge information.

In each of the first to fourth embodiments, the maximum value controller comprises a look-up table, as described above. However, the present invention is not limited to such specific arrangement. For example, the maximum value controller may comprise a logic arithmetic circuit.

In each of the first to fourth embodiments described above, generation of sweeping, texture, and the like in the ED method is prevented by adding random number values, the signs of which change periodically, to image data. However, when the input image is a dot image, moire may be generated due to interference between the random value and the dot image.

In view of this problem, the fifth to eighth embodiments to be described below show, an example that can remove sweeping and texture as problems unique to the ED method or screen method without emphasizing granularity. The example described below can also solve the problem of a pseudo edge, and suppress moire.

[Fifth Embodiment]

The fifth embodiment according to the present invention will be described below. In an image processing apparatus according to this embodiment, the same reference numerals denote the same parts as in the image processing apparatus according to the first embodiment, and a detailed description thereof will be omitted.

<Arrangement of Gradation Conversion Processing Unit>

Figure 14:
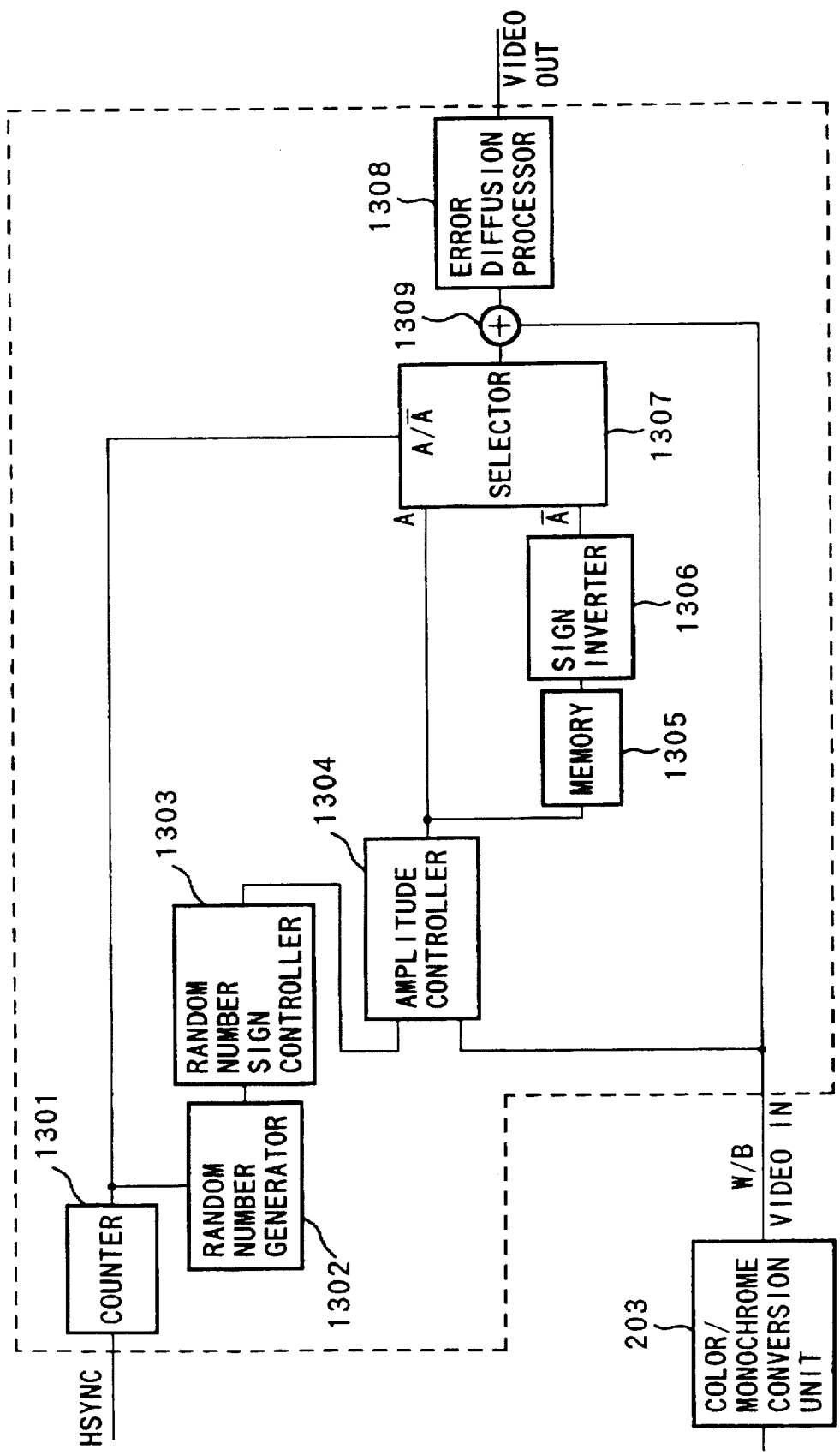
FIG. 14 is a block diagram of a gradation conversion processing unit according to the fifth embodiment.

FIG. 14 is a block diagram showing in detail a gradation conversion processing unit 204 as the characteristic feature of this embodiment.

Figure 18:
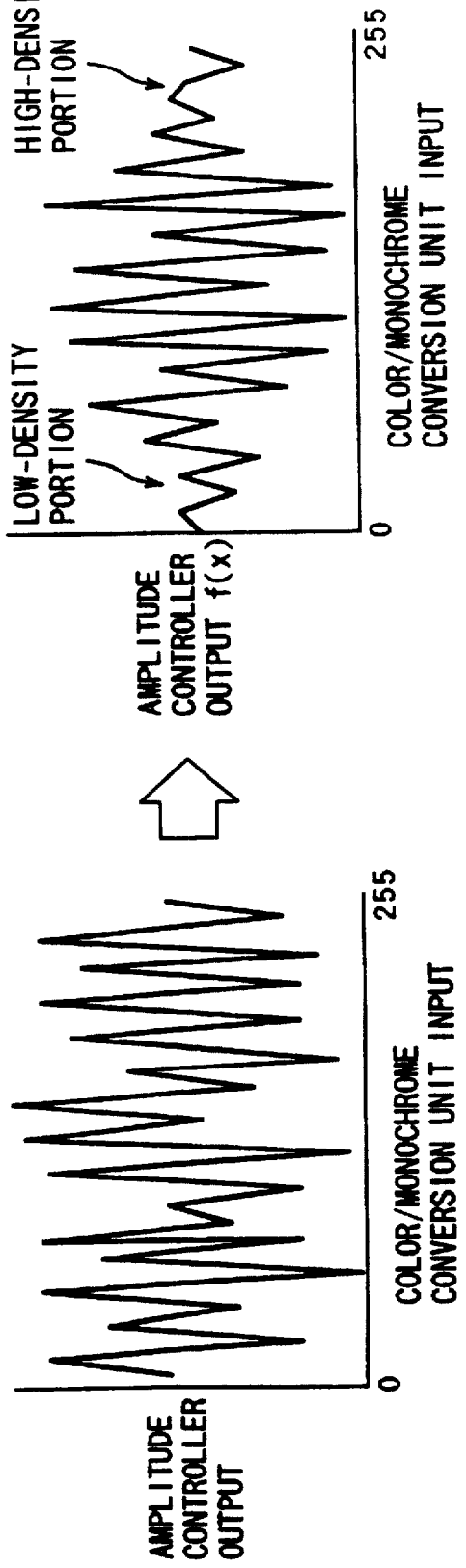
FIG. 18 is an explanatory view of amplitude control in the eighth embodiment.

The gradation conversion processing unit 204 shown in FIG. 14 alternately generates timing signals of 0 and 1 at a 2-pixel period using a counter 1301. The counter 1301 generates a signal in synchronism with each pixel of an image, and generates 0 at an edge portion. The timing signal output from the counter 1301 is input to a random number generator 1302, which generates a positive random number only when the timing signal is 0. The signal output from the random number generator 1302 is input to a random number sign controller 1303, in which its sign is randomly converted to positive or negative one, and the converted signal is output. The signal value output from the random number sign controller 1303 is input to an amplitude controller 1304, which controls the amplitude of that value in accordance with an 8-bit signal output from a color/monochrome conversion unit 203. More specifically, the output signal value from the controller 1304 acts as a function of the signal from the color/monochrome conversion unit 203, and the amplitude of the output signal is controlled to be decreased in low- and high-density portions with respect to density data. FIG. 18 shows an example of this amplitude control. An illustration denoted (a) in FIG. 18 shows a case wherein no amplitude control is performed, and an illustration (b) in FIG. 18 shows a case wherein the amplitude control is performed. That is, in (b), by controlling the amplitude, the function which acts to decrease the amplitudes of random values in the low- and high-density portions is applied.

The signal output from the amplitude controller 1304 is input to a memory 1305 and a selector 1307. The memory 1305 temporarily stores the signal value output from the amplitude controller 1304. The selector 1307 switches inputs A and $\overline{A}$ on the basis of the signal from the counter 1301. When the signal from the counter 1301 is 0, the selector 1307 directly outputs the signal output from the amplitude controller 1304; when the signal from the counter 1301 is 1, the selector 1307 outputs the signal output from a sign inverter 1306. The sign inverter 1306 outputs the signal from the memory 1305 while inverting its sign. More specifically, when data from the memory 1305 has the negative sign, the inverter 1306 inverts the sign to the positive one and outputs the inverted data; when data from the memory 1305 has the positive sign, the inverter 1306 inverts the sign to the negative one and outputs the inverted data. With this arrangement, a pair of positive and negative or negative and positive random number values having equal absolute values can be output for two consecutive pixels.

In this manner, the signal value output from the selector 1307 is added to a VIDEO signal output from the color/monochrome conversion unit 203 by an adder 1309, and the sum signal is input to an error diffusion processor 1308. Although not shown, when the sum signal value calculated by the adder 1309 exceeds 255 (8 bits) or becomes equal to or smaller than 0, processing for clipping the signal value to 255 or 0 is performed. The error diffusion processor 1308 performs processing based on normal error diffusion for binary data, screen processing such as dithering for binary data, or the like, although its details are not shown.

The VIDEO signal subjected to the above-mentioned processing is output from an image processing unit 104 shown in FIG. 1, and is finally output from a printer unit 105.

As described above, according to the fifth embodiment, in order to solve the problem associated with granularity that becomes more enhanced when a random number is added to normal image density data, the signal value output from the random number generator is controlled to be a function of the VIDEO signal value, as shown in the illustration (b) in FIG. 18.

Furthermore, when random numbers, which have equal absolute values and regularly change their signs in the order from positive to negative, are added to a VIDEO signal in units of two pixels, there is another problem that the random numbers interfere with the read dot image, thus generating moire. In order to solve this problem, signals according to this embodiment, which have equal absolute values and randomly change their signs in the order from positive to negative or from negative to positive, are added to a VIDEO signal in units of two pixels.

As described above, according to the fifth embodiment, sweeping and texture as the problems unique to the n-bit ED method or screen method can be removed without emphasizing granularity, the problem of a pseudo edge can also be solved, and moire can be suppressed.

In the fifth embodiment, the signs of random number values are randomly switched in the order from positive to negative or from negative to positive in units of two pixels. However, the present invention is not limited to the two-pixel system, but the signs may be switched in units of three pixels. In this case, the signs of random number values may be randomly switched in the order of (positive, 0, negative) or (negative, 0, positive).

|Sixth Embodiment|

An image processing apparatus according to the sixth embodiment of the present invention will be described below. The same reference numerals in the sixth embodiment denote the same parts as in the first and fifth embodiments, and a detailed description thereof will be omitted.

Figure 15:
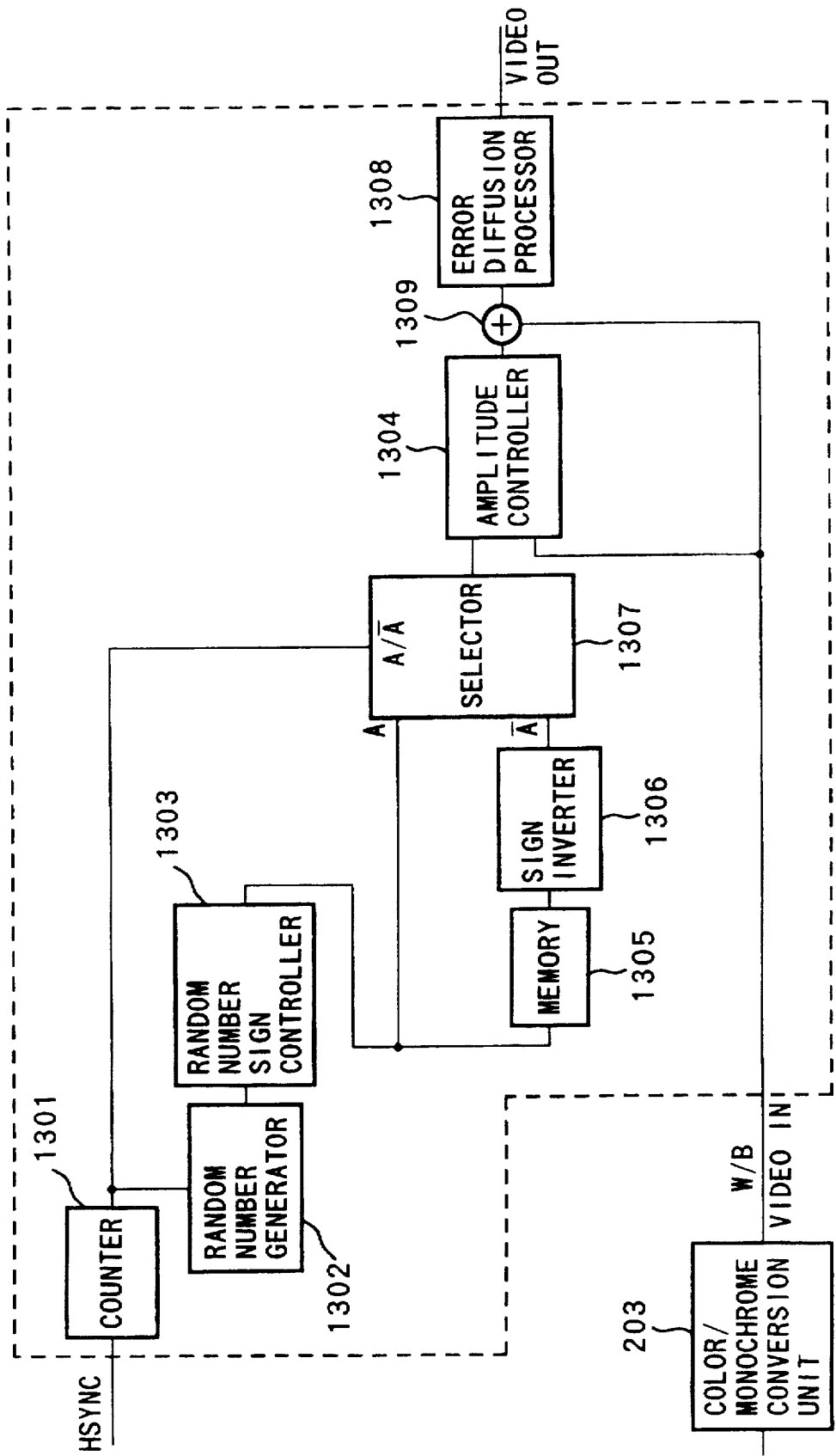
FIG. 15 is a block diagram of a gradation conversion processing unit according to the sixth embodiment.

FIG. 15 is a block diagram showing in detail the arrangement of a gradation conversion processing unit 204 of the sixth embodiment.

Referring to FIG. 15, a signal value output from a random number sign controller 1303 is input to a memory 1305 and a selector 1307. The memory 1305 temporarily stores the signal value output from the random number sign controller 1303 as in the fifth embodiment. The selector 1307 switches inputs A and $\overline{A}$ on the basis of the signal from a counter 1301. More specifically, when the signal from the counter 1301 is 0, the selector 1307 directly outputs the signal from the random number sign controller 1303; when the signal from the counter 1301 is 1, the selector 1307 outputs the signal from a sign inverter 1306. The sign inverter 1306 outputs the signal from the memory 1305 while inverting its sign as in the fifth embodiment. More specifically, when data from the memory 1305 has the negative sign, the inverter 1306 inverts the sign to positive and outputs the inverted data; when data from the memory 1305 has the positive sign, the inverter 1306 inverts the sign to negative and outputs the inverted data. With this arrangement, random number values having equal absolute values but different signs can be output for two consecutive pixels.

The signal output from the selector 1307 is input to an amplitude controller 1304, and the ratio of the amplitude of a random number is controlled in units of pixels, as shown in the illustration (b) in FIG. 18. Thereafter, the amplitude-controlled signal is output.

In this manner, as in the fifth embodiment, the signal value output from the amplitude controller 1304 is added to a VIDEO signal from a color/monochrome conversion unit 203, by an adder 1309, and the sum signal is input to an error diffusion processor 1308. Then, the signal is subjected to processing such as normal n-bit error diffusion, screen processing, or the like.

The VIDEO signal subjected to the above-mentioned processing is output from an image processing unit 104 shown in FIG. 1, and is finally output from a printer unit 105.

In the sixth embodiment, since the amplitude control by the amplitude controller 1304 is performed on each pixel, which does not result in adding random number values having equal absolute values but different signs to odd- and even-numbered pixels, and hence, density data cannot be accurately preserved, as compared to the fifth embodiment. However, it is capable of controlling not to add unnecessary data to the edge of a character portion or an image portion, and the reproducibility of the edge portion can be improved.

|Seventh Embodiment|

An image processing apparatus according to the seventh embodiment of the present invention will be described below. Note that the same reference numerals in the seventh embodiment denote the same parts as in the first and fifth embodiments, and a detailed description thereof will be omitted.

Figure 16:
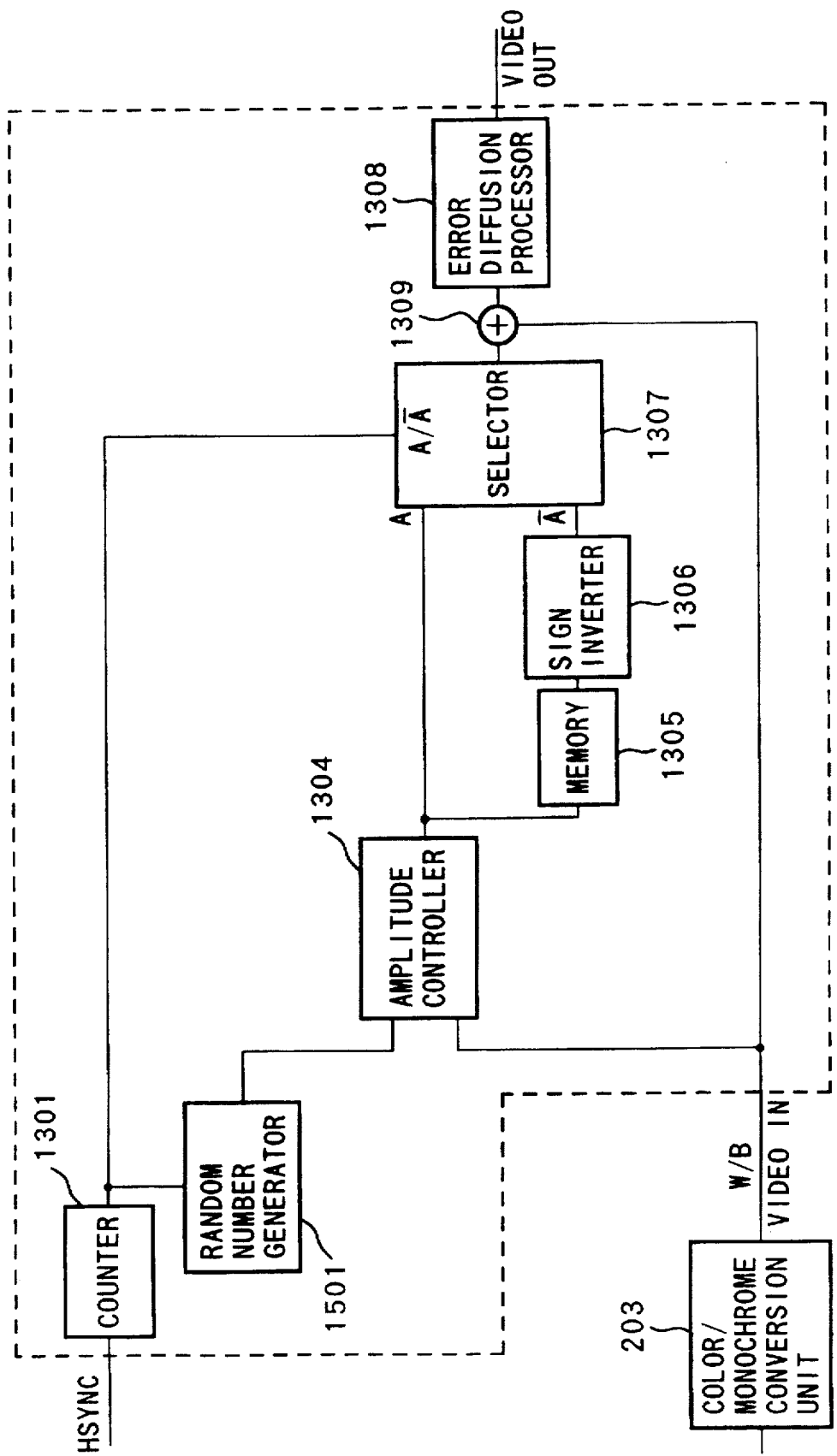
FIG. 16 is a block diagram of a gradation conversion processing unit according to the seventh embodiment.

FIG. 16 is a block diagram showing in detail a gradation conversion processing unit 204 according to the seventh embodiment.

Referring to FIG. 16, a counter 1301 alternately generates timing signals of 0 and 1 at a two-pixel period as in the fifth embodiment. The counter 1301 generates a signal in synchronism with each pixel of an image, and generates 0 at an edge portion. The timing signal from the counter 1301 is input to a random number generator 1501, which generates a random number only when the timing signal is 0. The signal output from the random number generator 1501 is a random number value that has either the positive or negative sign. The signal from the random number generator 1501 is input to a memory 1305 and a selector 1307. The selector 1307 selects and outputs one of the signal value from the random number generator 1501 and a signal from a sign inverter 1306, which are inputs at terminals A and $\overline{A}$ of the selector 1307, on the basis of the signal from the counter 1301. The sign inverter 1306 outputs the signal from the memory 1305 while inverting its sign, as in the fifth embodiment.

In this manner, as in the fifth embodiment, the signal value output from the selector 1307 is added to a VIDEO signal from a color/monochrome conversion unit 203 by an adder 1309, and the sum signal is input to an error diffusion processor 1308. Then, the signal is subjected to processing such as normal n-bit error diffusion, screen processing, or the like.

The VIDEO signal subjected to the above-mentioned processing is output from an image processing unit 104 shown in FIG. 1, and is finally output from a printer unit 105.

In the seventh embodiment, since the random number generator 1501 generates both positive and negative random number values, a random number sign controller 1306 can be omitted, and the hardware arrangement can be simplified, as compared to the fifth embodiment.

[Eighth Embodiment]

An image processing apparatus according to the eighth embodiment of the present invention will be described below. Note that the same reference numerals in the eighth embodiment denote the same parts as in the first and fifth embodiments, and a detailed description thereof will be omitted.

Figure 17:
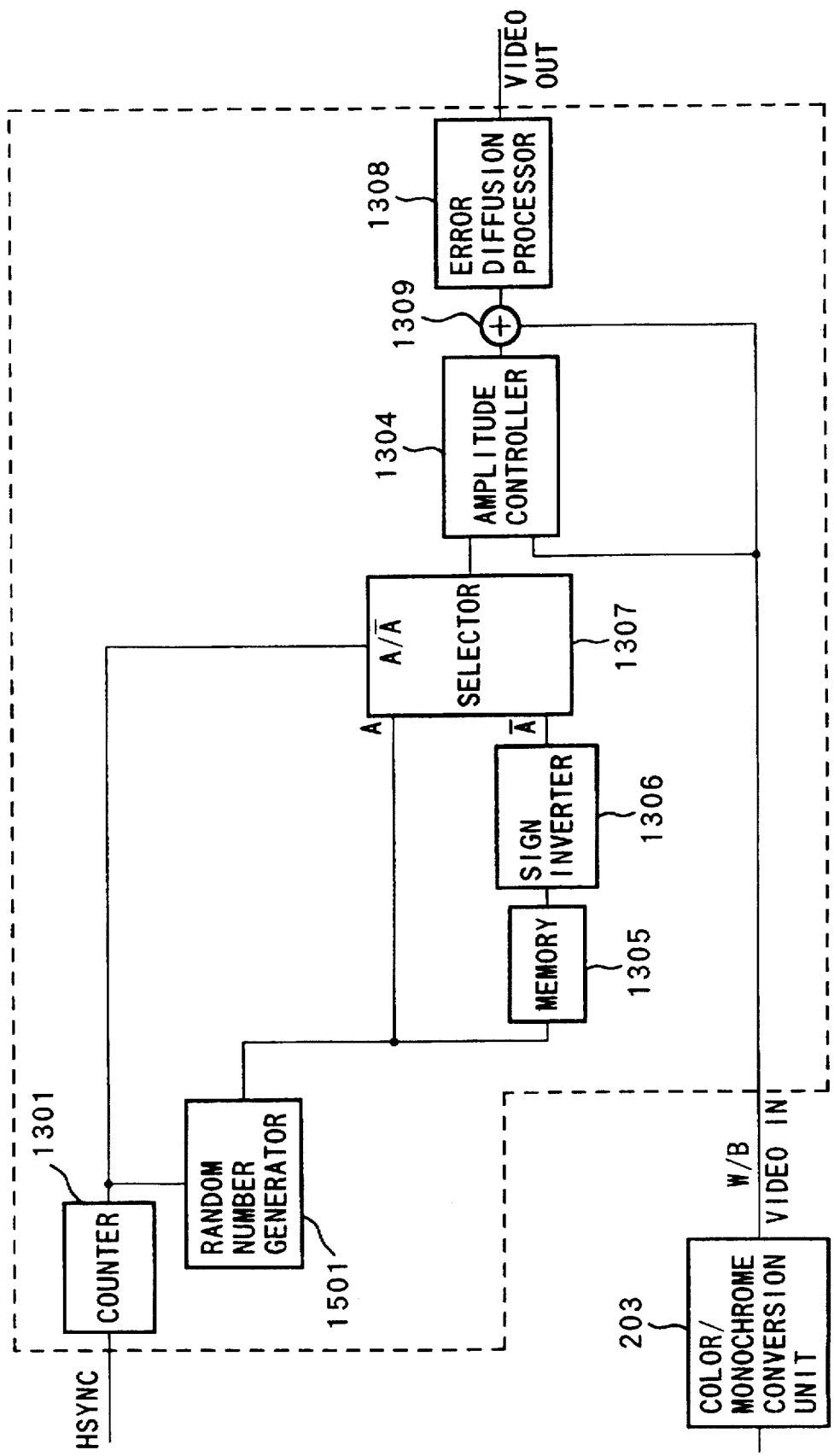
FIG. 17 is a block diagram of a gradation conversion processing unit according to the eighth embodiment.

FIG. 17 is a block diagram showing in detail a gradation conversion processing unit 204 according to the eighth embodiment.

Referring to FIG. 17, a counter 1301 alternately generates timing signals of 0 and 1 at a two-pixel period as in the fifth embodiment. The timing signal from the counter 1301 is input to a random number generator 1501, which generates a random number only when the timing signal is 0. The signal output from the random number generator 1501 is a random number which may have either the positive or negative sign, as in the seventh embodiment.

The signal value from the random number generator 1501 is input to a memory 1305 and a selector 1307. The selector 1307 selects and outputs signal values which are inputs at its terminals A and $\overline{A}$, on the basis of the signal from the counter 1301. More specifically, when the signal from the counter 1301 is 0, the selector 1307 directly outputs the signal from the random number generator 1501; when the signal from the counter 1301 is 1, the selector 1307 outputs a signal from a sign inverter 1306. The sign inverter 1306 outputs the signal from the memory 1305 while inverting its sign, as in the fifth embodiment. With this arrangement, random number values having equal absolute values but different signs can be output for two consecutive pixels.

The signal from the selector 1307 is input to an amplitude controller 1304, and the ratio of the amplitude of a random number is controlled in units of pixels, as shown in the illustration (b) in FIG. 18. Thereafter, the amplitude-controlled signal is output.

As in the fifth embodiment, the signal value output from the amplitude controller 1304 is added to a VIDEO signal from a color/monochrome conversion unit 203 by an adder 1309, and the sum signal is input to an error diffusion processor 1308. Then, the signal is subjected to processing such as normal n-bit error diffusion, screen processing, or the like.

The VIDEO signal subjected to the above-mentioned processing is output from an image processing unit 104 shown in FIG. 1, and is finally output from a printer unit 105.

In the eighth embodiment, since the amplitude controller 1304 performs amplitude control on each pixel as in the sixth embodiment, density data cannot be accurately preserved as compared to the fifth embodiment. However, it is possible to perform control that does not add unnecessary data to the edge of a character portion or an image portion, and the reproducibility of the edge portion can be improved.

Furthermore, as in the seventh embodiment, since the random number generator 1501 generates random numbers having both the positive and negative signs, a random number sign controller can be omitted, and the hardware arrangement can be simplified.

As described above, an image processing apparatus according to each of the fifth to eighth embodiments comprises a random number generation means for generating positive random number values at every other pixel, a random number sign control means for randomly converting the signs of the random number values generated by the random number generation means to positive or negative, an amplitude control means for changing the ratio of the amplitude of each of the random number values output from the random number sign control means as a function of a signal value of input image data, a sign inversion means for generating at a pixel position where no random number value is generated by the random number generation means, a value which has the same absolute value as but a different sign from a value output from the amplitude control means at an immediately preceding pixel position, and an addition means for alternately adding the signal values generated by the amplitude control means and the sign inversion means to signal values of the input image data.

When 8-bit input image information is binarized by the ED method or screen method, problems such as sweeping, texture, and the like are posed. However, each of the above embodiments solves these problems, since the ratio of the amplitude value of a random number generated every other pixels is controlled in correspondence with the input image data value, and random number values are added to each pixel value of input image data while randomly changing the sign pattern of random number values to be a pair of positive and negative sign or negative and positive sign, in which these values having equal absolute values which are to be added to each pixel in units of two pixels.

Also, the image processing apparatus is characterized in that moire can be suppressed while solving the problem associated with granularity that worsens upon adding a random number to normal image density data. This invention is not limited to an image formation in which gradation conversion from 8 bits to 1 bit is performed. It is also characterized remove switching noise, i.e., a pseudo edge generated when performing gradation conversion to other gray levels (e.g., n bits such as 2 bits, 3 bits, and the like).

As described above, according to the fifth to eighth embodiments, sweeping and texture as the problems unique to the n-bit ED method or screen method can be removed without emphasizing granularity, and the problem of a pseudo edge can also be solved, and moire can be suppressed.

Examples that can realize image formation with higher image quality by a simpler hardware arrangement will be described hereinafter as the ninth to 11th embodiments.

[Ninth Embodiment]

The ninth embodiment according to the present invention will be described below. Note that the same reference numerals in an image processing apparatus according to this embodiment denote the same parts as in the image processing apparatus according to the first embodiment, and a detailed description thereof will be omitted.

Figure 19:
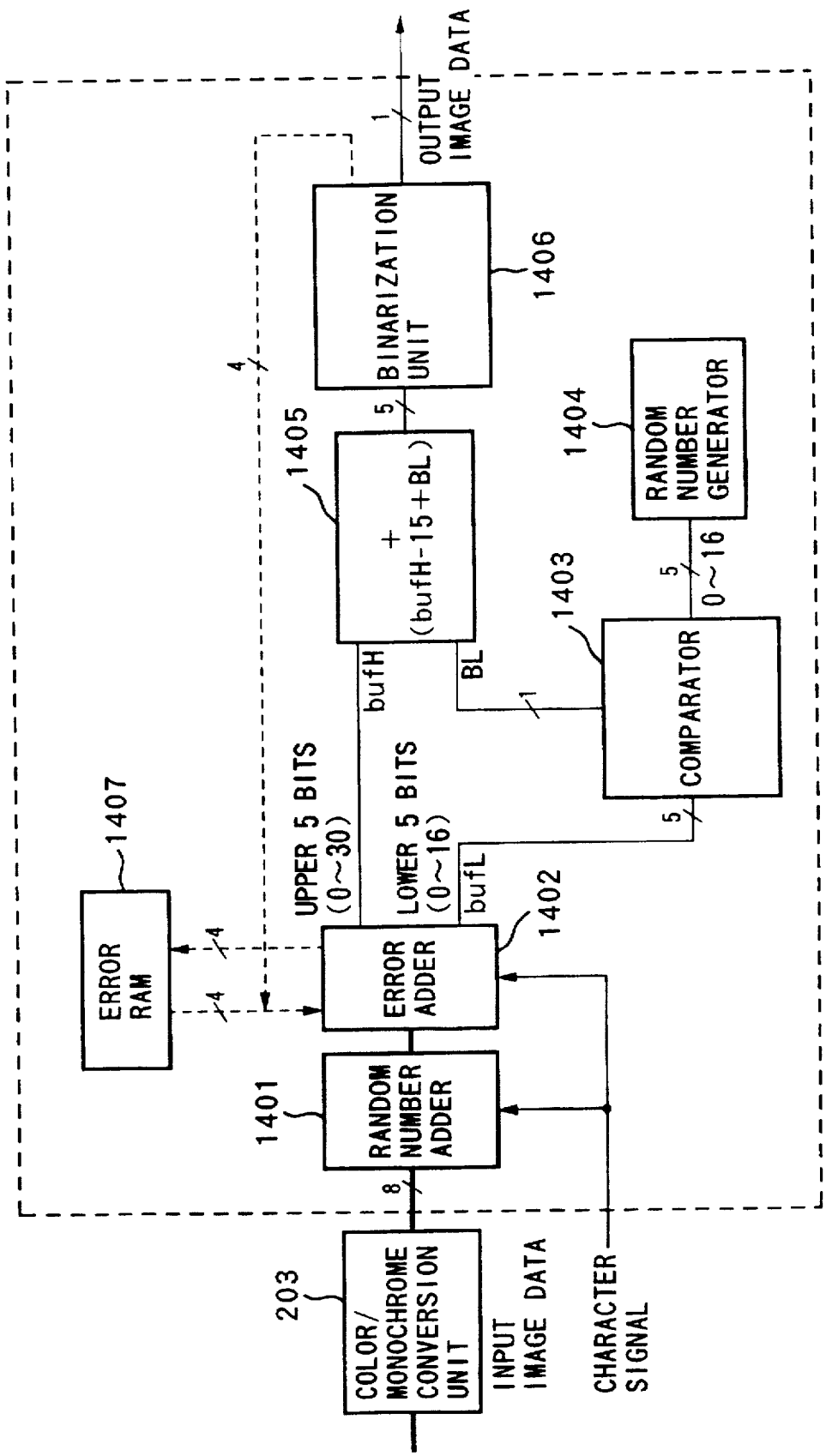
FIG. 19 is a block diagram showing the arrangement of a gradation conversion processing unit according to the ninth embodiment.

FIG. 19 is a block diagram showing in detail a gradation conversion processing unit 204 as the characteristic feature of the ninth embodiment.

Figure 20:
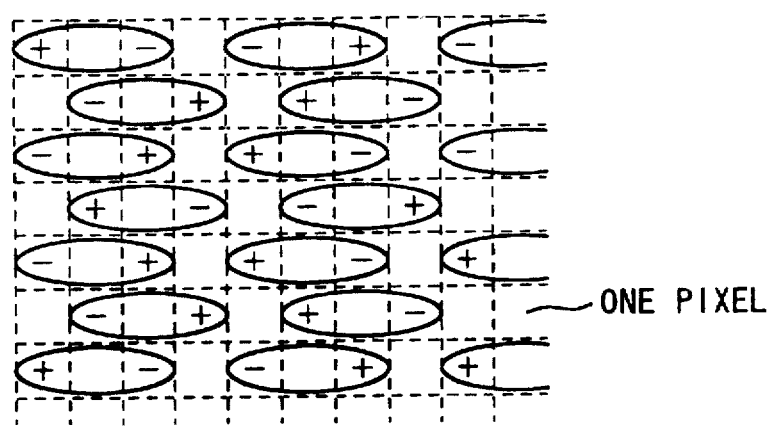
FIG. 20 is a view for explaining the processing of a random number adder shown in FIG. 19.
Figure 21:
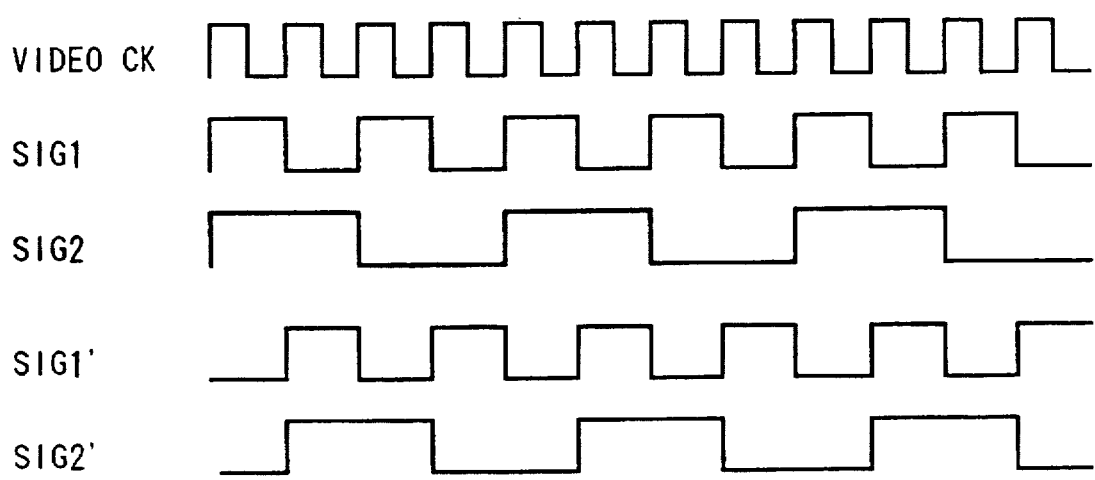
FIG. 21 is a timing chart showing the timings of signals used in the random number adder shown in FIG. 19.
Figure 22:
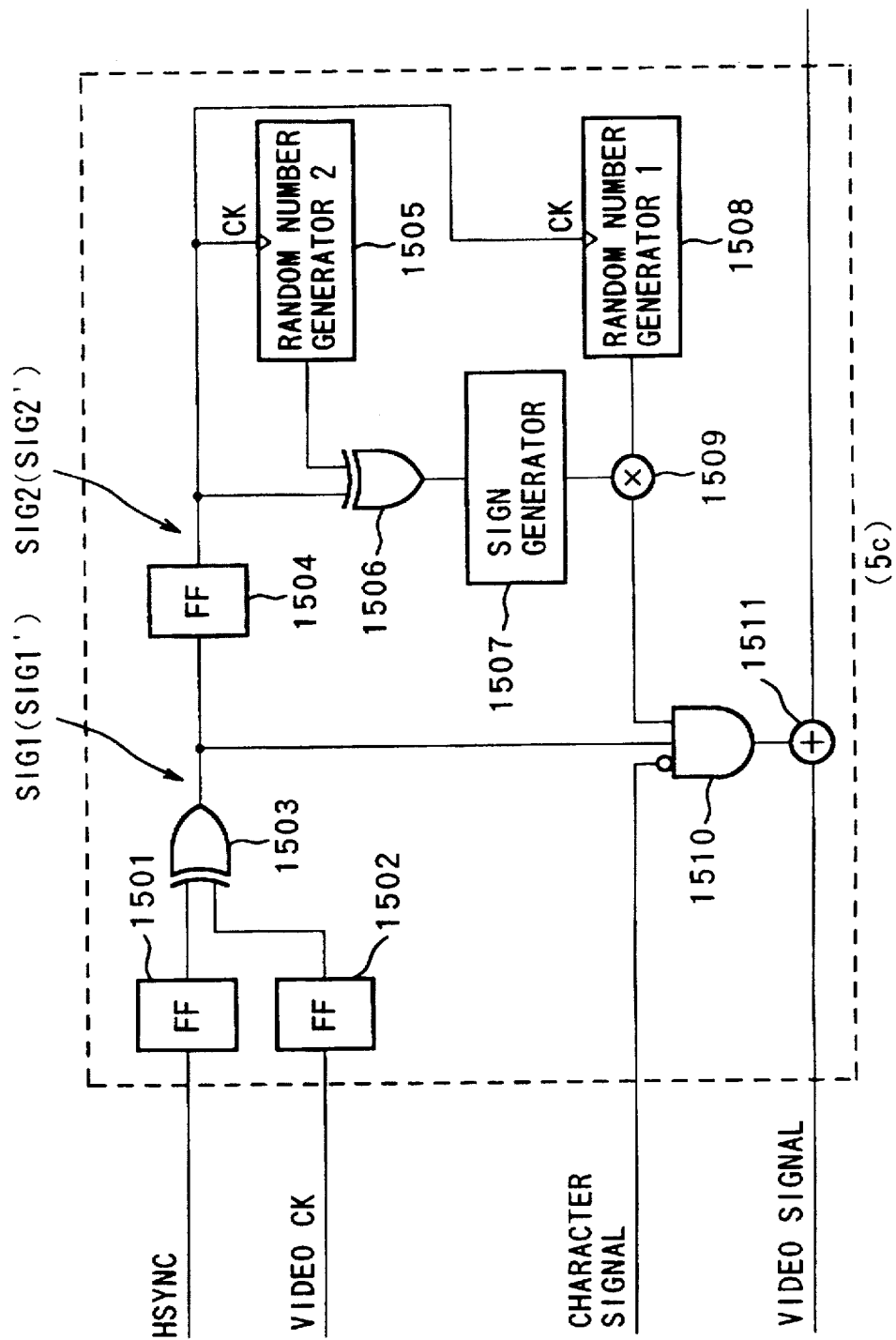
FIG. 22 is a block diagram showing the arrangement of the random number adder shown in FIG. 19.

In the gradation conversion processing unit 204 shown in FIG. 19, a random number adder 1401 adds a random number to input image data (8 bits, 256 levels). FIGS. 20, 21, and 22 are explanatory views of the random number adder 1401. Referring to FIG. 22, reference numerals 1501, 1502, and 1504 denote flip-flops; 1503 and 1506, EX-OR gates; 1509, a multiplier; 1510, an AND gate; 1505 and 1508, random number generators; 1507, a sign generator; and 1511, an adder.

Hsync and Video clock (Video CK) signals generated in the main scanning direction (X-direction) are respectively input to the flip-flops 1501 and 1502, which generate signals at timings of signals sig1 and sig1' shown in FIG. 21. The sig1 represents a signal generated in an even line, and the sig1' represents a signal generated in an odd line. The signals sig1 and sig1' shown in FIG. 21 correspond to signals generated in portions of "+, −, −, +, −, . . . " shown in FIG. 20. According to this embodiment, signals are two-dimensionally generated in a checkerboard pattern by shifting the generation positions by one pixel in the first and second lines. The signal output from the EX-OR gate 1503 is input as a timing signal to the random number generators 1505 and 1508 via the flip-flop 1504 at timings of signals sig2 and sig2' shown in FIG. 21. This means that signals are generated on the left side of circled portions shown in FIG.

20. That is, signals are generated every four pixels in an even line, and in an odd line, signals are generated every four pixels at positions shifted by one pixel from those generated in the even line. Therefore, the random number generator 1 (1508) generates a random number ranging from 0 to 31 every four pixels in synchronism with the signal from the flip-flop 1504. The random number value from the generator 1508 is multiplied with a signal from the sign generator 1507 by the multiplier 1509. On the other hand, the random number generator 2 (1505) generates a random number of 0 or 1 every four pixels in synchronism with the signal from the flip-flop 1504 as in the random number generator 1 (1508). The signal value output from the generator 1505 is EX-ORed with a signal from the flip-flop 1504 by the EX-OR gate 1506, and the result is input to the sign generator 1507.

When the signal from the EX-OR gate 1506 is "1", the sign generator 1507 outputs "−1"; when the signal from the EX-OR gate 1506 is "0", the generator 1507 outputs "1". With the above-mentioned arrangement, the random number adder 1401 can generate pairs of positive and negative or negative and positive random numbers at every other positions in a checkerboard pattern while shifting the generation positions by one pixel with respect to even and odd lines, as shown in FIG. 20, by calculating the output signals from the sign generator 1507 and the random number generator 1508 by the multiplier 1509. In the AND gate 1510, the random value obtained from the multiplier 1509 is added to a Video signal by the adder 1511 in accordance with the signal from the EX-OR gate 1503, only when no character signal is input. That is, when a character signal representing a character portion is input as a Video signal, no random number is added, while only when values of the Video signal do not represent a character portion, random numbers are added to the values of the Video signal at every other positions in a checkerboard pattern.

In this manner, the arrangement for adding positive and negative (or negative and positive) random numbers at every other pixel positions can suppress granular noise since the number of pixels using random numbers is small.

Note that each of the random number generators 1505 and 1508 comprises an m-sequence shift register code sequence generator. With this generator, when the number of stages of the shift register is set to be N, pseudo random numbers having a period of 2N−1 can be easily generated by a simple hardware arrangement. Each generator according to this embodiment, comprises a 25-stage, 1-bit shift register so as to prevent generation of periodicity even when an A3 original is processed at 400 dpi.

In this random number generator, "0" is written in a register p[ii] (0≦ii≦25) and "1" is set only in a register p[12] for initialization. Before each random number value is output, the following calculation is made:

$p[0]=((p[25]\hat{\ }p[24]\hat{\ }p[23]\hat{\ }p[22])\&1)$

A random number ranging from 0 to 31 is output by:

random number=$p[17]*16+p[18]*8+p[19]*4+p[20]*2+p[21]$

When outputting a random number ranging from 0 to 16, the following calculation is performed, after a random number described by a sufficiently long expression is output:

random number=$(p[16]*32+p[17]*16+p[18]*8+p[19]*4+p[20]*2+p[21]*16/63$

Figure 24:
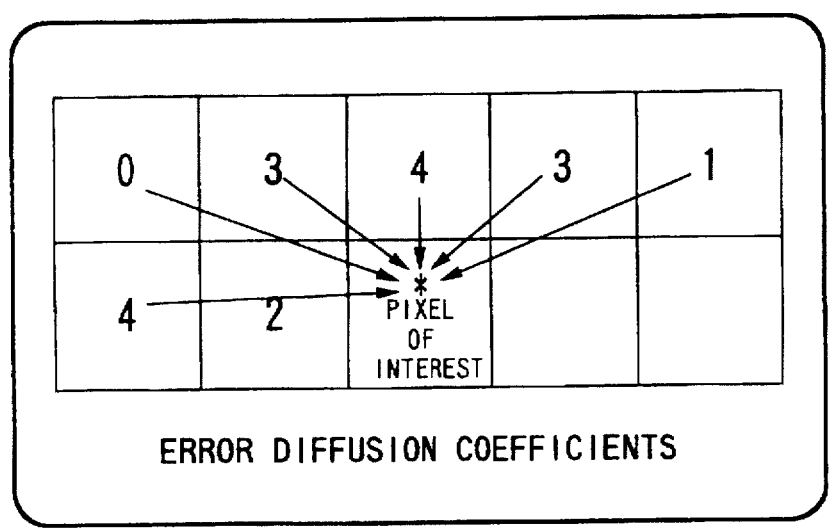
FIG. 24 is a view showing error diffusion coefficients used in an error adder shown in FIG. 19.
Figure 25:
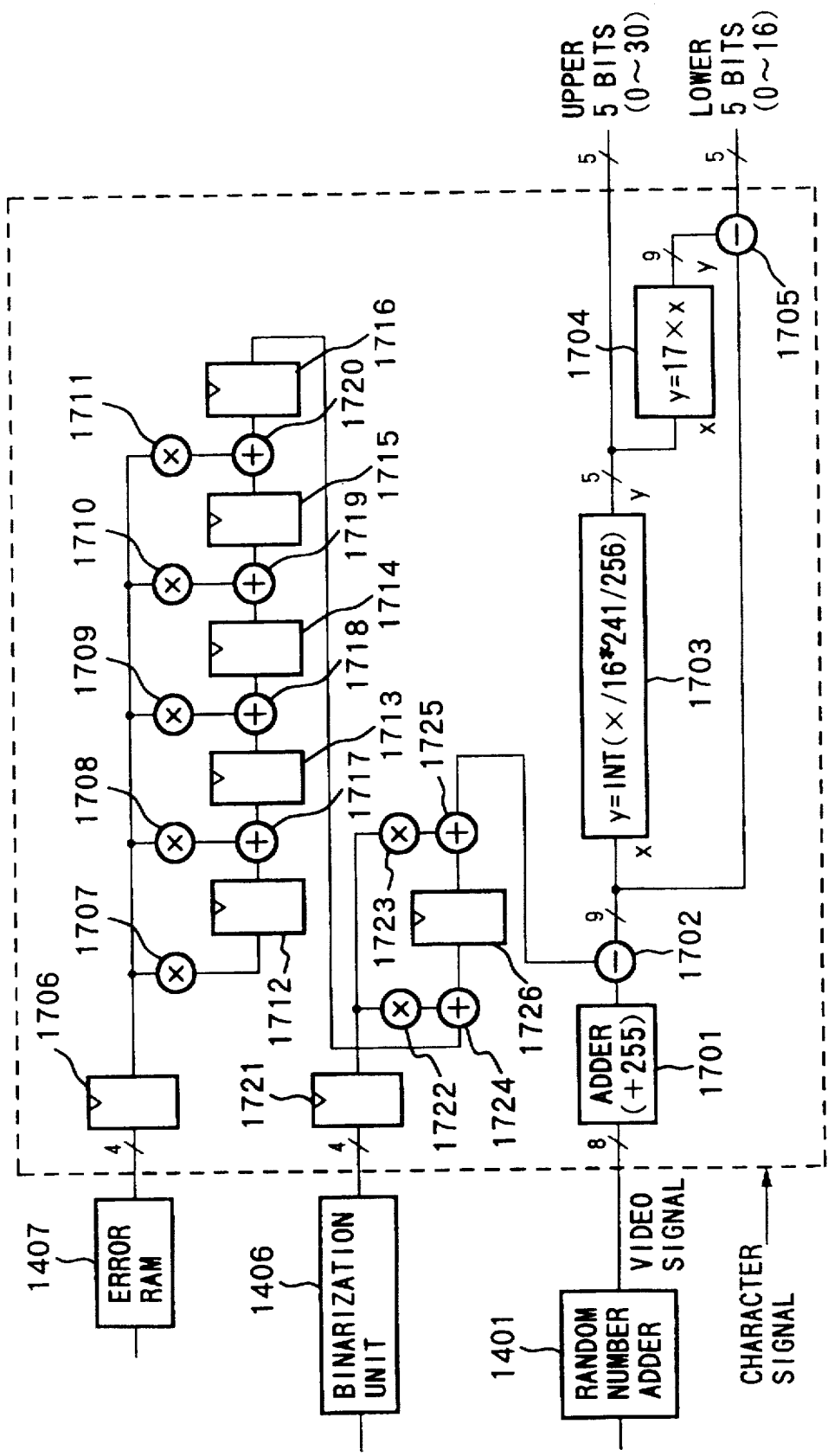
FIG. 25 is a block diagram showing the arrangement of the error adder shown in FIG. 19.

Referring back to FIG. 19, the signal output from the random number adder 1401 is density-corrected by an error adder 1402 using correction signals from a binarization unit 1406 and an error RAM 1407. FIGS. 24 and 25 show the details of the error adder 1402. Referring to FIG. 25, reference numerals 1706, 1712, 1713, 1714, 1715, 1716, 1721, and 1726 denote latch circuits; 1707, 1708, 1709, 1710, 1711, 1722, and 1723, multipliers; 1717, 1718, 1719, 1720, 1724, 1725, 1702, and 1705, adders and subtracters; 1701, a constant adder for adding a constant "255"; and 1703 and 1704, arithmetic devices.

Signals from the error RAM 1407 and the binarization unit 1406 are input to the latches 1706 and 1721, for calculating accumulated error. Thereafter, the subtraction processing is performed on the accumulated error with respect to a signal value from the constant adder 1701 by the subtracter 1702. The signal from the constant adder 1701 is obtained by adding "+255" to an input Video signal so as for the output to become a negative value. With this calculation, the amplitude of the Video signal falls within the range from 0 to 510. The multipliers 1707, 1708, 1709, 1710, and 1711 for obtaining the accumulated error use coefficients "0, 3, 4, 3, 1" shown in FIG. 24. Similarly, the multipliers 1722 and 1723 use coefficients "4, 2" shown in FIG. 24. These coefficients are characterized in that their sum is 17. That is, the sum total of the weighting coefficients is 17.

The signal output from the subtracter 1702 is divided by a constant "17" by the arithmetic device 1703. Then, the error adder 1402 outputs the result (quotient: 0 to 30) as an upper 5-bit signal bufH, and outputs the remainder (0 to 16) as a lower 5-bit signal bufL. The same processing as the division by 17 is described in the block of the arithmetic device 1703 shown in FIG. 25. That is, y=INT(x/16*241/256) can attain the same processing as the calculation y=x/17.

The characteristic feature of this arrangement is as follows. When input data is divided in advance by 17 in the arithmetic device 1703, the quotient bufH falls within the range from 0 to 30. An adder 1405 calculates "bufH−15" to yield 15 (L(16) level) as an absolute value, and the sum total of the error diffusion coefficients equals the value "17" obtained by calculating 255 ((M−1)level)+15((L−1)level)= 17. With this arrangement, the division in the arithmetic device that calculates the accumulated error can be omitted, and the number of bits of the input signal to the arithmetic device 1703 can be reduced, thus reducing the memory capacity of the error RAM 1407 shown in FIG. 19. Of course, the density of the Video signal can be preserved.

Although not shown, when a character signal is input to the error adder 1402, the error diffusion coefficients shown in FIG. 24 are switched. More specifically, the ninth embodiment is characterized by using a mask having substantially the same error diffusion coefficients, the sum total of which is 17, when a character signal is input.

Figure 23:
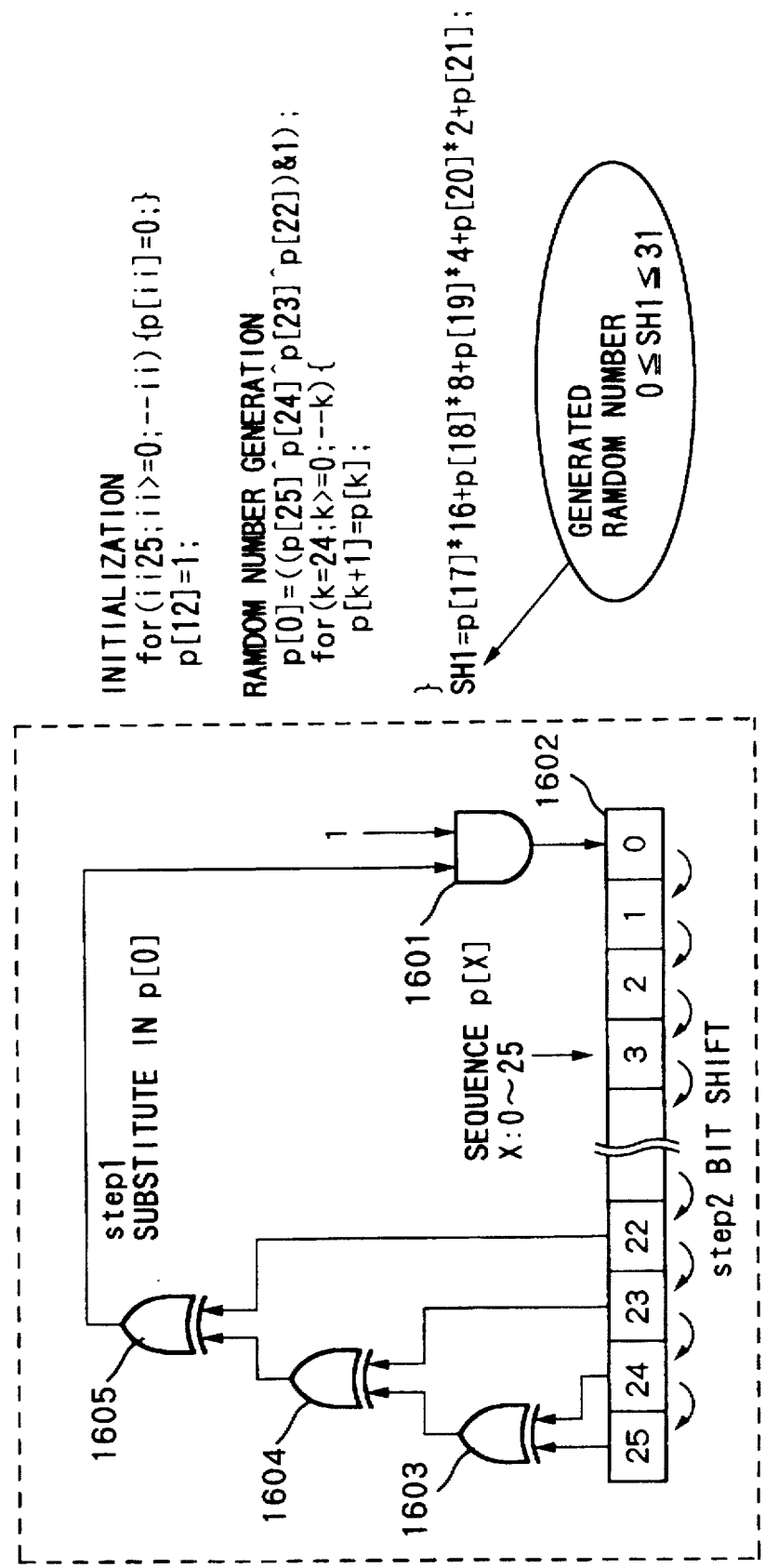
FIG. 23 is a block diagram showing the arrangement of a random number generator shown in FIG. 22.

Referring back to FIG. 19, the lower 5-bit signal bufL output from the error adder 1402 is input to a comparator 1403, and is compared with a signal (0 to 16) from a random number generator 1404. If the signal value bufL is larger than the signal from the random number generator 1404, the comparator 1403 generates a BL signal "1"; otherwise, the comparator 1403 generates a BL signal "0". Not that the hardware arrangement of the random number generator 1404 is the same as that shown in FIG. 23, and a detailed description thereof will be omitted.

The adder 1405 outputs a result obtained by adding the upper 5-bit signal bufH from the error adder 1402 and the BL signal from the comparator 1403, and by subtracting a constant "15" from the sum, to the binarization unit 1406. The reason for subtracting the constant "15" is that the error adder 1402 has added the constant "255", which requires the subtraction of the constant "15" obtained by calculating 255/17=15. The value "17" in the division 255/17 is obtained from "÷17" used in the arithmetic device 1703 within the error adder 1402.

The binarization unit 1406 determines only if the input value is larger or smaller than a threshold value "0". If the input data is larger than the threshold value "0", the unit 1406 outputs "1" to hold the generated 4-bit quantization error in a memory. At this time, the quantization error is calculated by "input data−15". On the other hand, when the input data value is smaller than the threshold value "0", the unit 1406 outputs "0" to similarly hold the generated 4-bit quantization error in the memory. In the latter, the quantization error is calculated by "input data−0". This arrangement is characterized in that the error value calculated by decreasing the number of bits is held in the memory, and the corrected signal value subjected to the accumulated error calculation is fed back to the error adder 1402 at the input stage of the section that processes a multi-value signal in the gradation conversion processing unit.

The signal value subjected to the above-mentioned processing is output as a VIDEO signal from an image processing unit 104 shown in FIG. 1, and is finally output from a printer unit 105.

Figure 26:
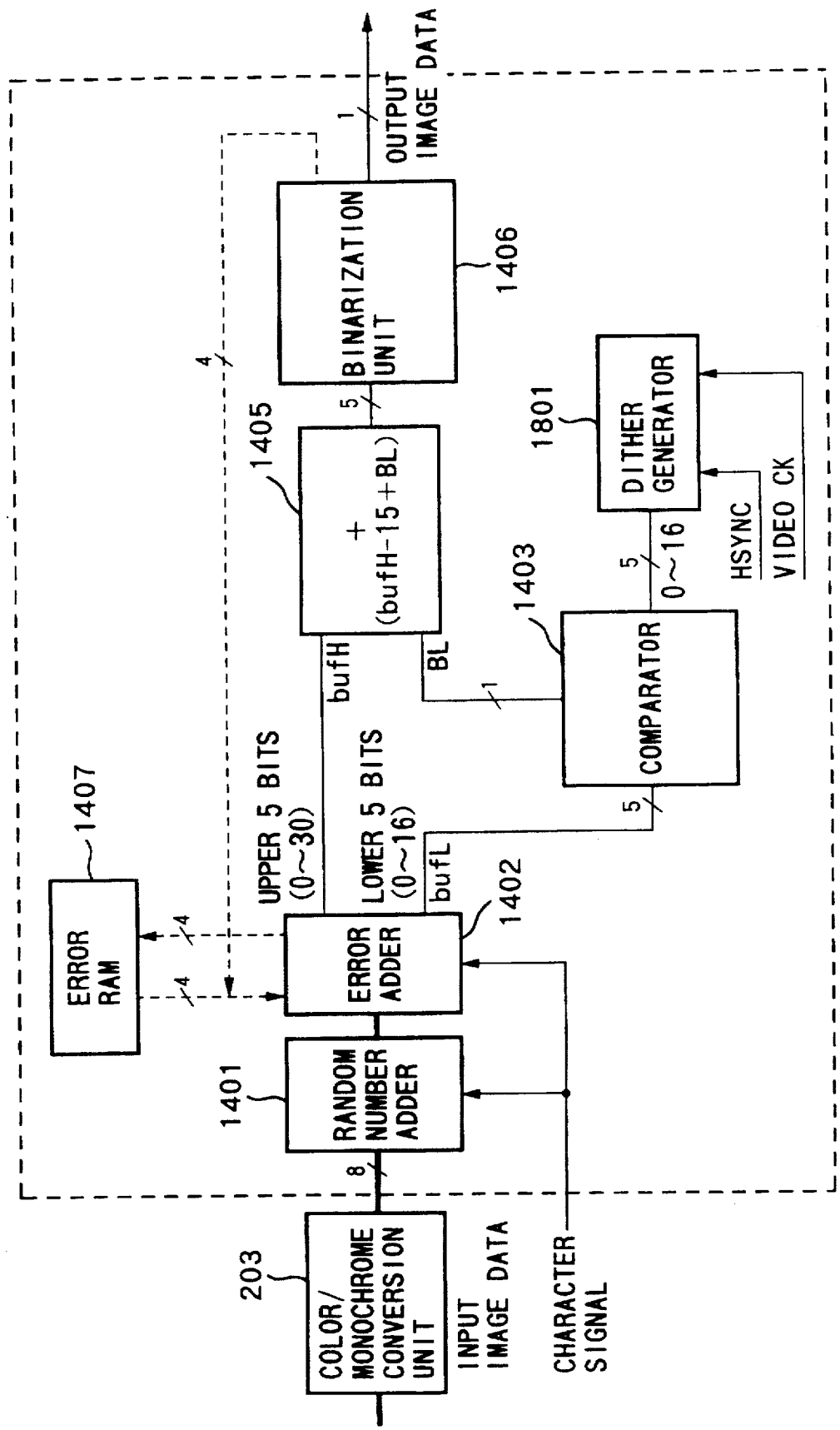
FIG. 26 is a block diagram showing the arrangement of a gradation conversion processing unit according to a modification of the ninth embodiment.

In the ninth embodiment, the comparator 1403 shown in FIG. 19 attains binarization by comparing the signal bufL from the error adder 1402 and the signal from the random number generator 1404. The same processing can be attained by replacing the circuit of the random number generator 1404 by a dither generation circuit 1801 shown in FIG. 26. More specifically, a pattern ranging from 0 to 16 is generated by the dither generation circuit, and compares it with the signal bufL from the error adder 1402, thus attaining binarization.

As described above, according to the ninth embodiment, by generating random number values whose maximum values are controlled at intervals of several pixels with respect to the input Video signal values, and by adding random pairs of positive and negative or negative and positive random number values having equal absolute values to the Video signal values at intervals of several pixels, the problems of sweeping and texture can be solved while suppressing granular noise.

Furthermore, the conventional error diffusion method requires a sufficiently large memory capacity which causes to raise a cost, so as to hold errors generated upon quantization. However, in the arrangement of this embodiment, after pseudo halftone processing of L level is performed, by setting the quotient and remainder, which are obtained by dividing an input video signal by an arbitrary constant, respectively to be upper- and lower-bit signals, binarization is performed by comparing it with a random number or a dither signal, and errors generated as a result of error diffusion processing of the pseudo halftone signal of the L level are corrected as accumulated errors of neighboring pixels with respect to the input video signal. In this manner, the number of bits required by the memory for holding errors can be decreased, and a cost reduction can also be attained.

In the ninth embodiment, random numbers are generated every four pixels, and the signs of the random numbers are inverted every other pixels. Generally, this processing amounts to generating random numbers every 2α+1 pixels (α is integer; α>0) and inverting the signs of the random numbers every α pixels.

[10th Embodiment]

An image processing apparatus according to the 10th embodiment of the present invention will be described below. In the 10th embodiment, the same reference numerals denote the same parts as in the first and ninth embodiments, and a detailed description thereof will be omitted.

Figure 27:
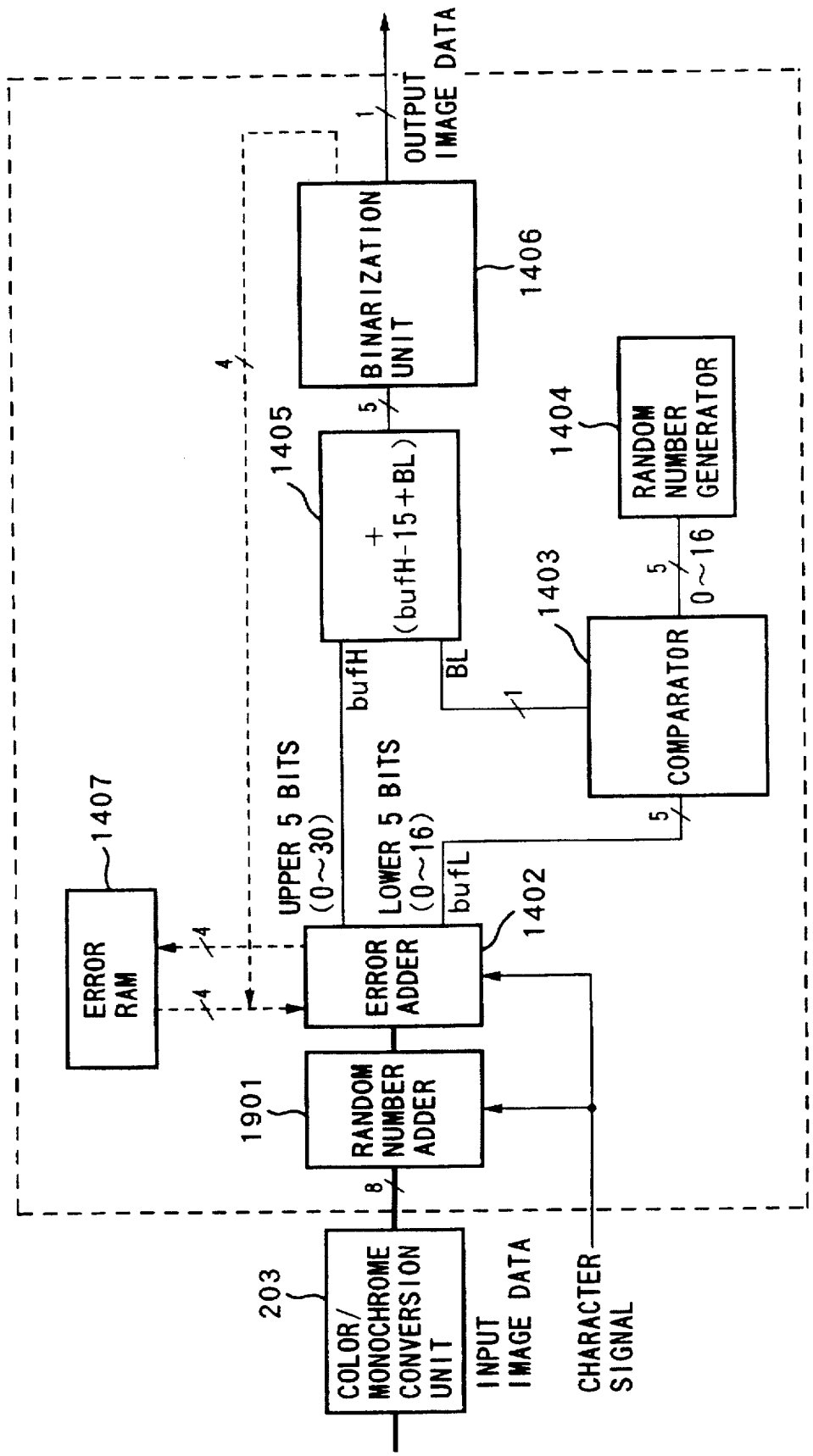
FIG. 27 is a block diagram showing the arrangement of a gradation conversion processing unit according to the 10th embodiment.

FIG. 27 is a block diagram showing in detail a gradation conversion processing unit 204 of the 10th embodiment. In FIG. 27, this embodiment is different from the ninth embodiment in a portion of a random number adder 1901. FIGS. 28 to 31 are views for explaining the details of the random number adder 1901.

Referring to FIGS. 28 to 31, symbols "+" and "−" represent pixels to which random numbers are to be added. That is, positive random numbers are added at the positions indicated by the symbols "+", and negative random numbers are added at the positions indicated by the symbols "−". The point is that pairs of random numbers in circled portions are controlled to have equal absolute values, and are added to Video signal values. That is, this embodiment is characterized in that random pairs of positive and negative or negative and positive random numbers are added to Video signal values.

Figure 28:
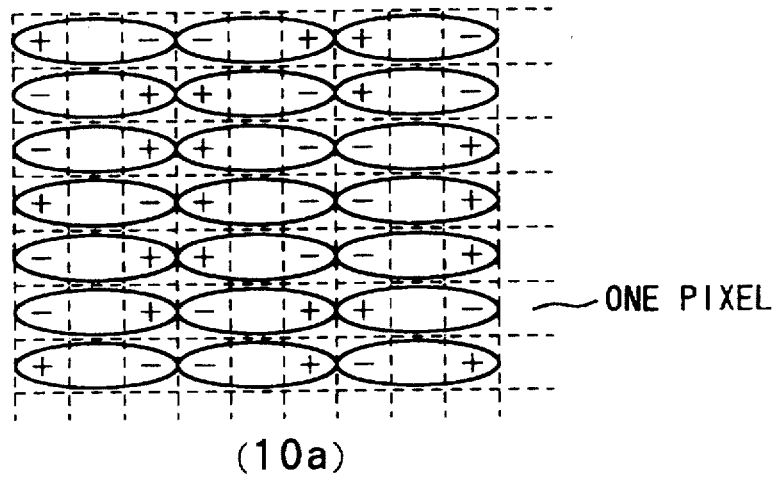
FIGS. 28 to 31 are views for explaining the processing in a random number adder shown in FIG. 27.
Figure 30:
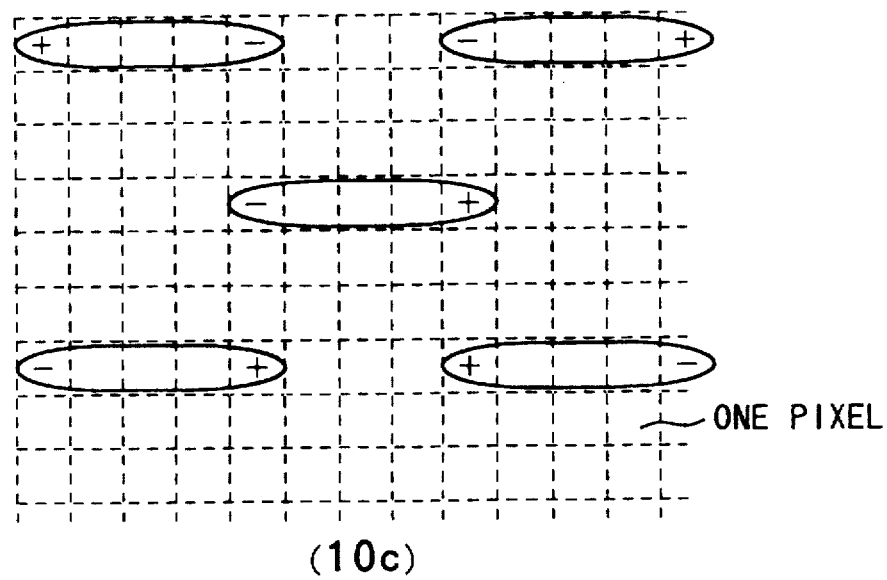
Figure 31:
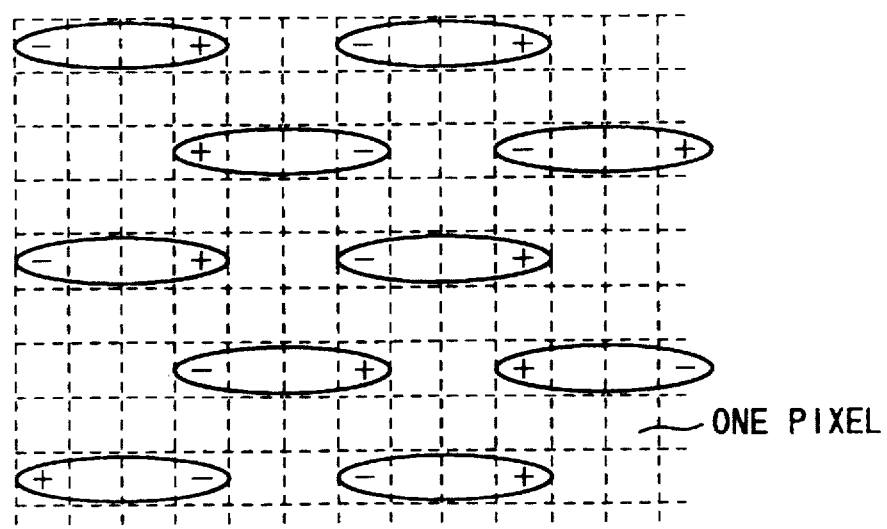

Also, the same effect as in the ninth embodiment can be obtained not only by adding random numbers in a checkerboard pattern shown in FIG. 20 but also by adding random numbers at positions every three pixels, every four pixels, and the like in patterns shown in FIGS. 28, 30, and 31. In the 10th embodiment, by decreasing the number of pixels to which random numbers are to be added with respect to a Video signal, granular noise can be reduced.

Figure 29:
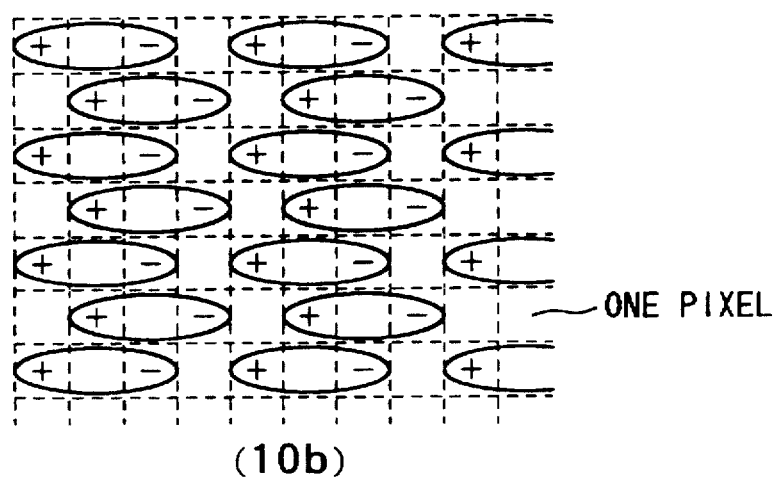

In order to simplify the hardware arrangement, an arrangement for omitting processing of switching combinations of random number, say, positive, negative, positive, negative, . . . , or negative, positive, negative, positive, . . . , as shown in FIG. 29, and for adding random numbers regularly may be adopted.

The hardware arrangements for realizing the addition patterns shown in FIGS. 28 to 31 can be constituted based on the same concept as that of the arrangement of the ninth embodiment shown in FIG. 22, and a detailed description thereof will be omitted.

The signal value subjected to the above-mentioned processing is also subjected to the same processing as in the ninth embodiment, and is output from an image processing unit 104 (FIG. 1) as a 1-bit Video signal. The video signal is then output from a printer unit 105.

According to the 10th embodiment, by adding random numbers to pixels not only in a checkerboard pattern as in the ninth embodiment but also at positions every three pixels shown in FIG. 31 or at positions every four pixels shown in FIG. 30, the problems of sweeping and a pseudo edge can be solved without emphasizing granular noise.

[11th Embodiment]

An image processing apparatus according to the 11th embodiment of the present invention will be described below. In the 11th embodiment, the same reference numerals denote the same elements as in the first and ninth embodiments, and a detailed description thereof will be omitted.

Figure 32:
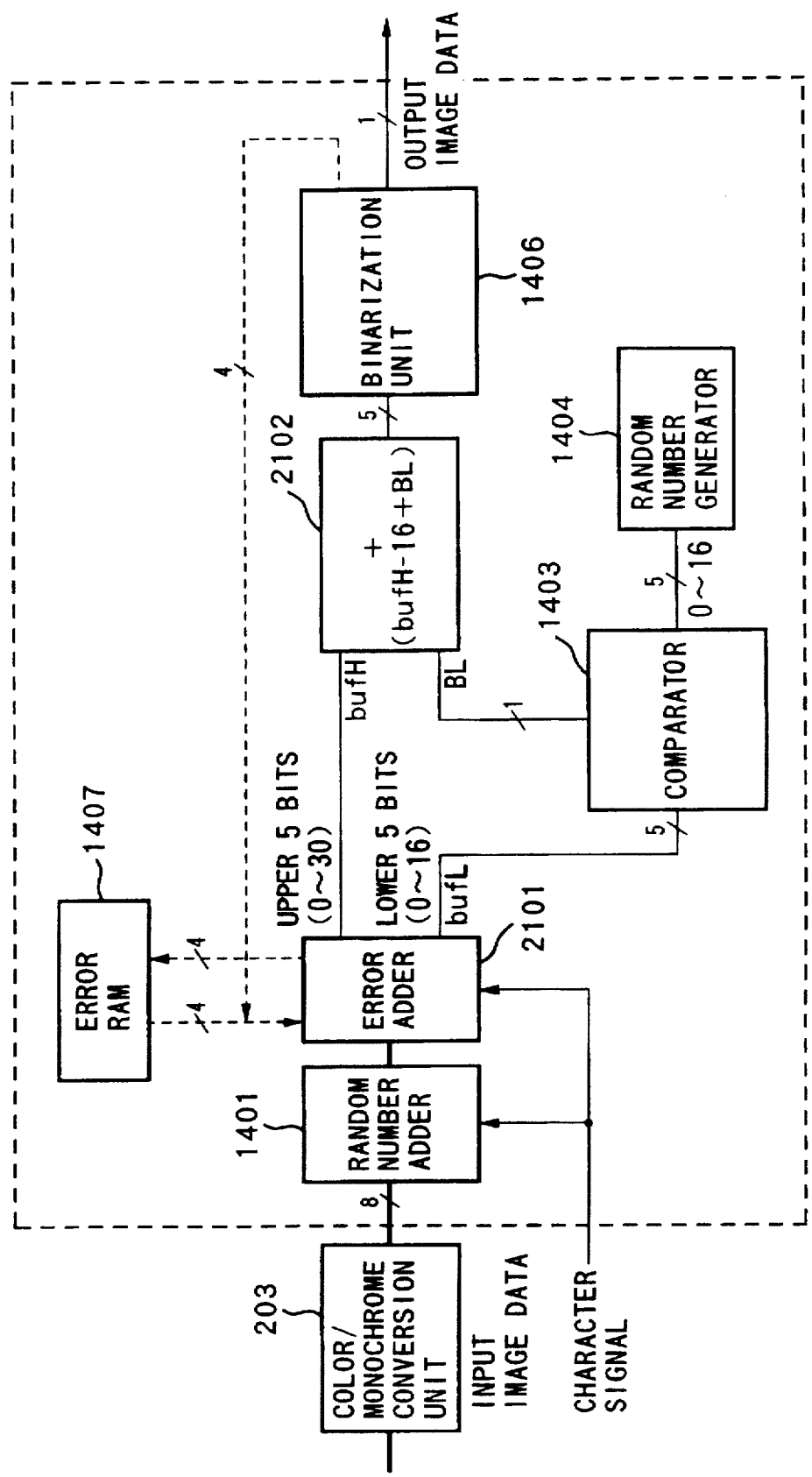
FIG. 32 is a block diagram showing the arrangement of a gradation conversion processing unit according to the 11th embodiment.
Figure 33:
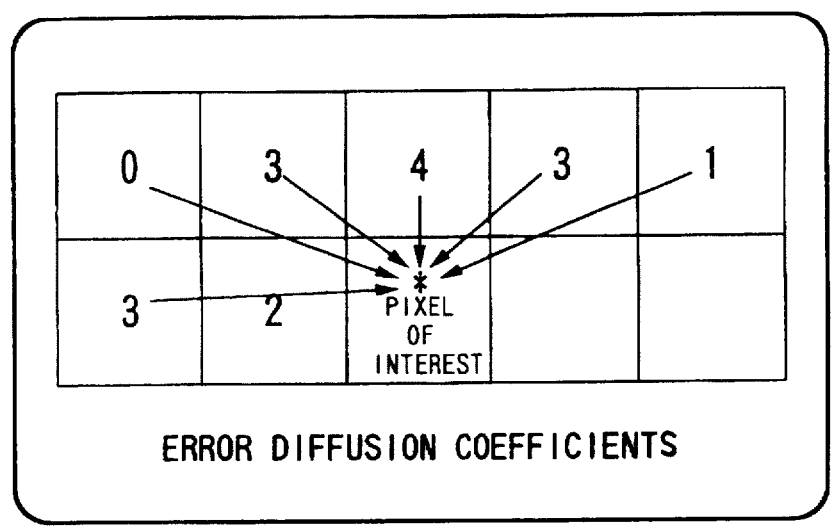
FIG. 33 is a view showing error diffusion coefficients used in an error adder shown in FIG. 32.
Figure 34:
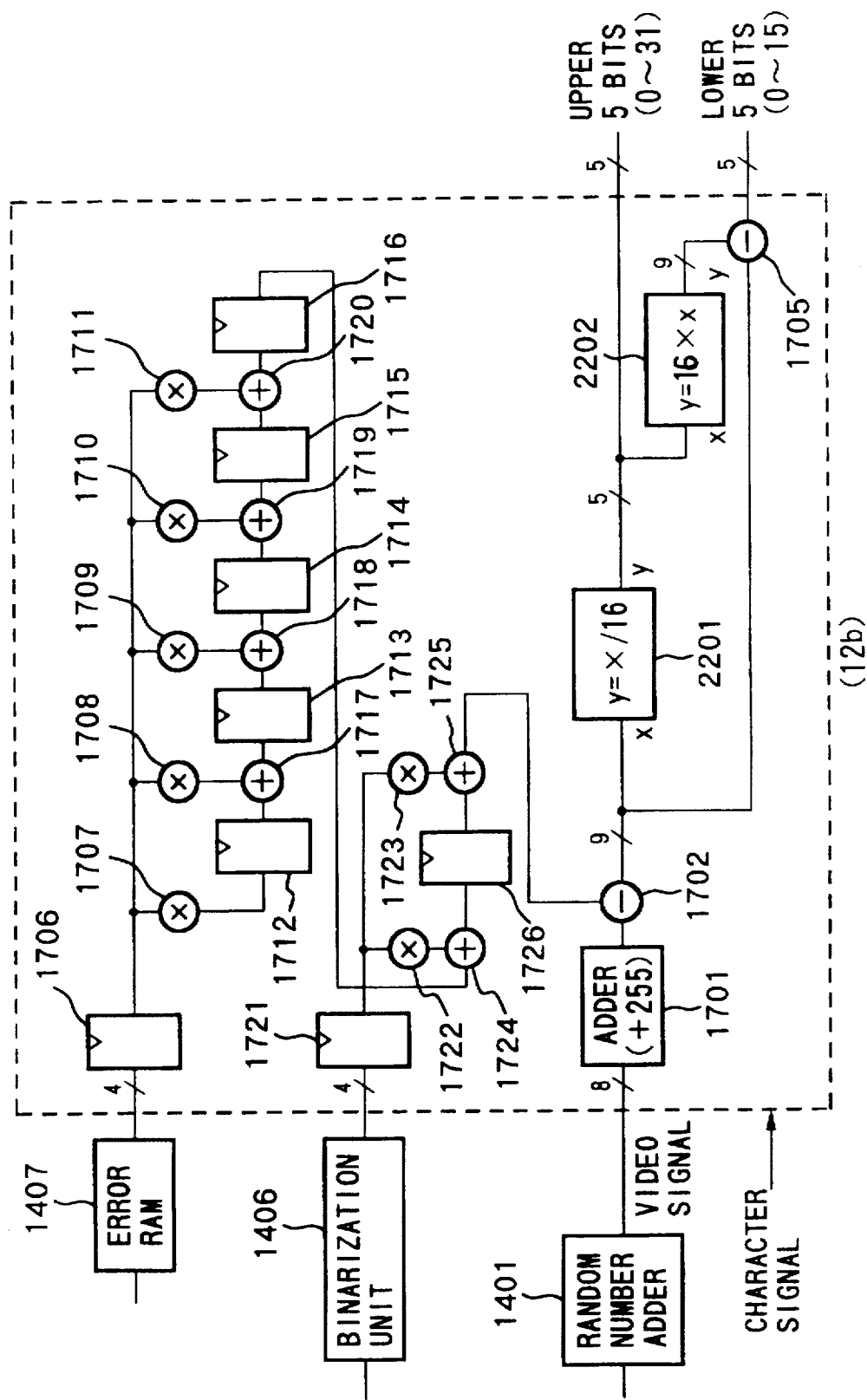
FIG. 34 is a block diagram showing the arrangement of the error adder shown in FIG. 32.

FIG. 32 is a block diagram showing in detail a gradation conversion processing unit of the 11th embodiment. In FIG. 32, this embodiment is different from the ninth and 10th embodiments in a portion of an error adder 2101. FIGS. 33 and 34 are views for explaining the details of the error adder 2101.

In FIG. 34, this embodiment has a difference point compared with the ninth embodiment that the division by a constant "16" is replaced by the division by the constant "17". That is, arithmetic devices 2201 and 2202 can be attained by a simple bit shifting. According to this arrangement, a complicated calculation can be omitted, thus simplifying the hardware arrangement.

When the arithmetic device 2201 performs the division by the constant "16" that can be attained by bit shifting as in the 11th embodiment, an upper-bit signal bufH output from the error adder 2101 in FIG. 32 consists of 5 bits that can express a value ranging from 0 to 31, and a lower-bit signal bufL consists of 4 bits that can express a value ranging from 0 to 15. In this case, when a BL signal value is "1" as a result of binarization of the lower-bit signal in a comparator 1403, bufH may be assumed to be 32. For this reason, even when the arithmetic device 2102 subtracts the constant "16", bufH actually takes a value ranging from 0 to 16 (L(17) level) as an absolute value. At this time, the sum total of error diffusion coefficients (FIG. 33) is determined in correspondence with a value "16" obtained by calculating 255 ((M−1) level)+16 ((L−1) level)=15.9375→16. That is, the sum total of the weighting coefficients is 16.

Note that the constant "16" subtracted by the arithmetic device 2102 is a value obtained by calculating 255÷16= 15.9375→16.

Since the value 15.9375 is rounded up to 16, the division in the arithmetic device that calculates an accumulated error can be omitted, and at the same time the hardware arrangement can be simplified. Also, the number of bits contained in the input signal to the arithmetic device 2201 can be reduced, and hence, the memory capacity of an error RAM 1407 can be reduced.

The signal value subjected to the above-mentioned processing is also subjected to the same processing as in the ninth embodiment, and is output from an image processing unit 104 (FIG. 1) as a 1-bit Video signal. The video signal is then output from a printer unit 105.

The 11th embodiment can simplify the hardware arrangement compared to the ninth embodiment, since the hardware arrangement of the arithmetic device 2201 can be realized only by bit shifting.

In the ninth, 10th, and 11th embodiments, binarization has been exemplified. That is, the binarization unit 1406 shown in each of FIGS. 19, 26, 27, and 32 performs binarization. However, the present invention is not limited to binarization, but may be similarly applied to n-value conversion processing (n is an integer which is larger than 2).

In the ninth to 11th embodiments, an error diffusion method is used. However, the present invention is not limited to the processing using the error diffusion, and the same effect can be expected even when the binarization unit is replaced by one that performs dither processing, screen processing, or the like.

In the ninth to 11th embodiments, binarization is performed after upper and lower bits are separated. However, the present invention is not limited to this specific arrangement. The random-number addition method of the present invention can also be applied to the arrangement that simply performs n-value (n is an integer equal to or larger than 2) conversion processing without separating upper and lower bits.

Furthermore, in the error adder 1402 or 2101, the upper-bit signal bufH consists of 5 bits. However, the present invention is not limited to this specific number of bits. For example, the number of bits of the upper-bit signal bufH may be 3 or 4.

The same effect may be expected if the random number adder has one of the following three arrangements.

(1) Constant values, the signs of which are switched randomly (using random numbers) in pairs of positive and negative values or negative and positive values, are amplitude-controlled in accordance with the input image signal values, and are added to the input image signal.

(2) Random number values, which are amplitude-controlled in accordance with the input image signal values, are added to the input image signal by inverting their signs in the order of positive and negative at predetermined periods.

(3) Random number values, the signs of which are switched randomly (using random numbers) in pairs of positive and negative values or negative and positive values, are amplitude-controlled in accordance with the input image signal values, and are added to the input image signal.

In the ninth, 10th, and 11th embodiments described above, monochrome processing has been exemplified. However, the same processing can be applied to a color image. In this case, by changing the amount of random numbers to be added or the addition period in correspondence with each color, the granularity of an image can be further reduced.

In a case where additional information is added in an arbitrary color, if no random numbers are added to the color to which the additional information is added, so as not to disturb the additional information by random number signal values added to the arrangement of each of the above embodiments, the same effect can be obtained by adding random number signal values to other colors.

As described above, according to the ninth, 10th, and 11th embodiments, by generating random number values whose maximum values are controlled at intervals of several pixels with respect to the input video signal values, and by adding random pairs of positive and negative or negative and positive random number values having equal absolute values to the video signal values at intervals of several pixels, the problems of sweeping and texture can be solved while suppressing granular noise.

Figure 45:
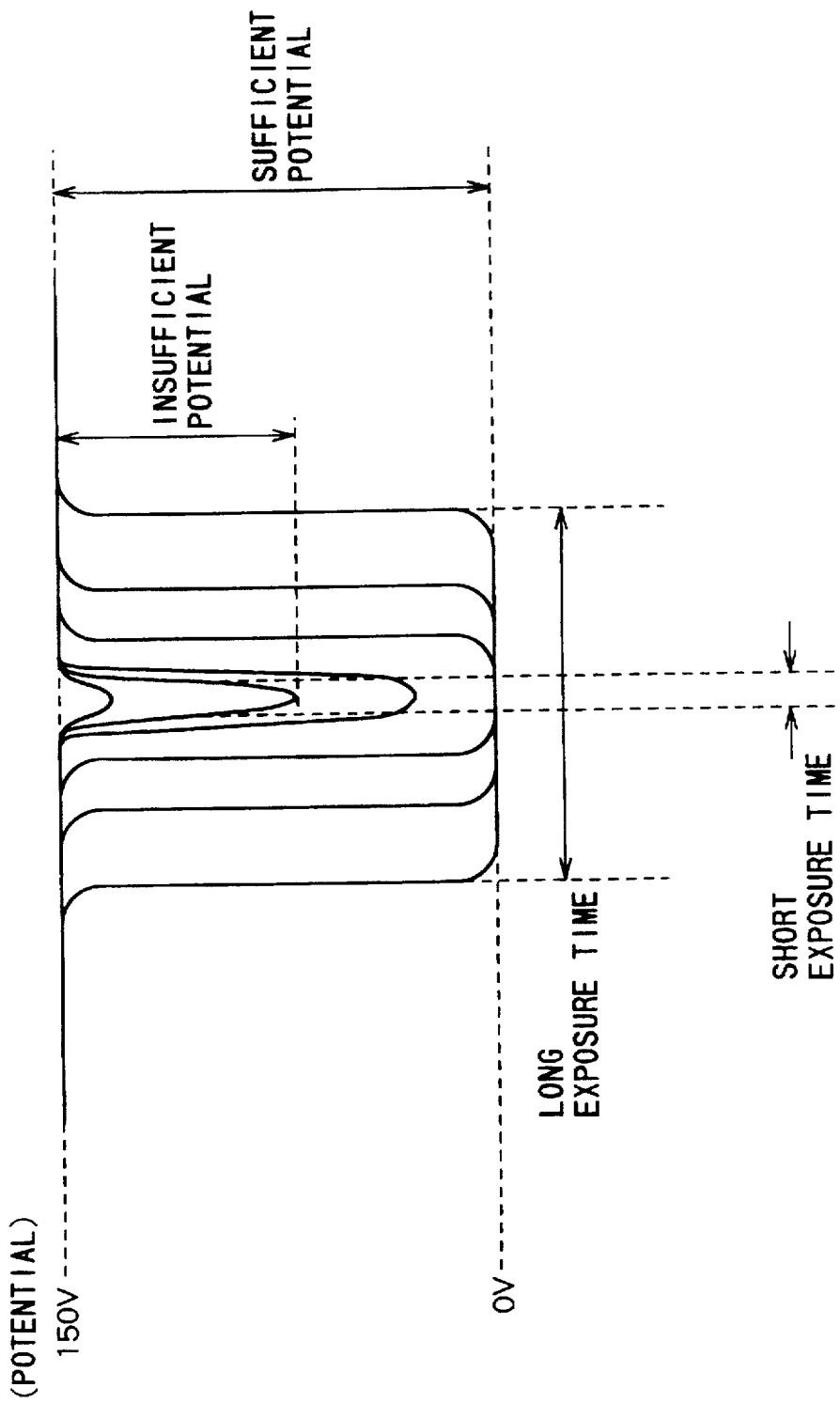
FIG. 45 is a graph showing the potential on the surface of a photosensitive body.
Figure 46:
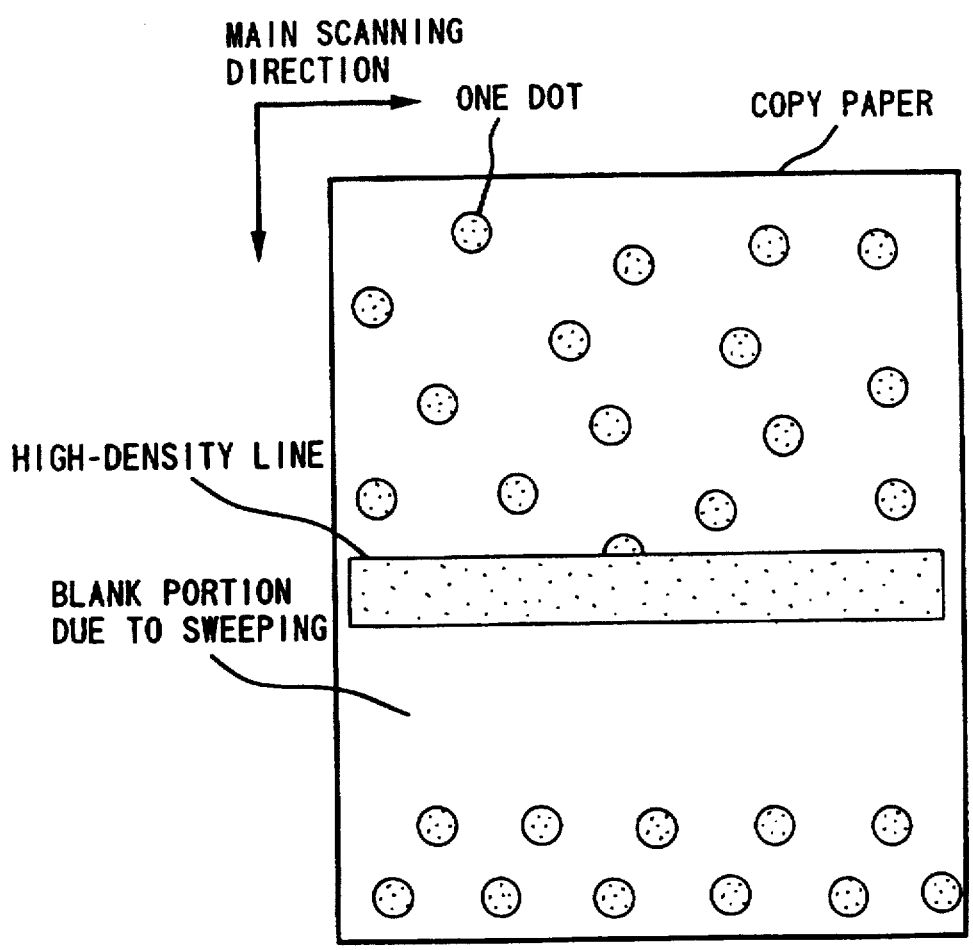
FIG. 46 is an enlarged view showing a low-density portion according to the conventional ED processing.
Figure 47:
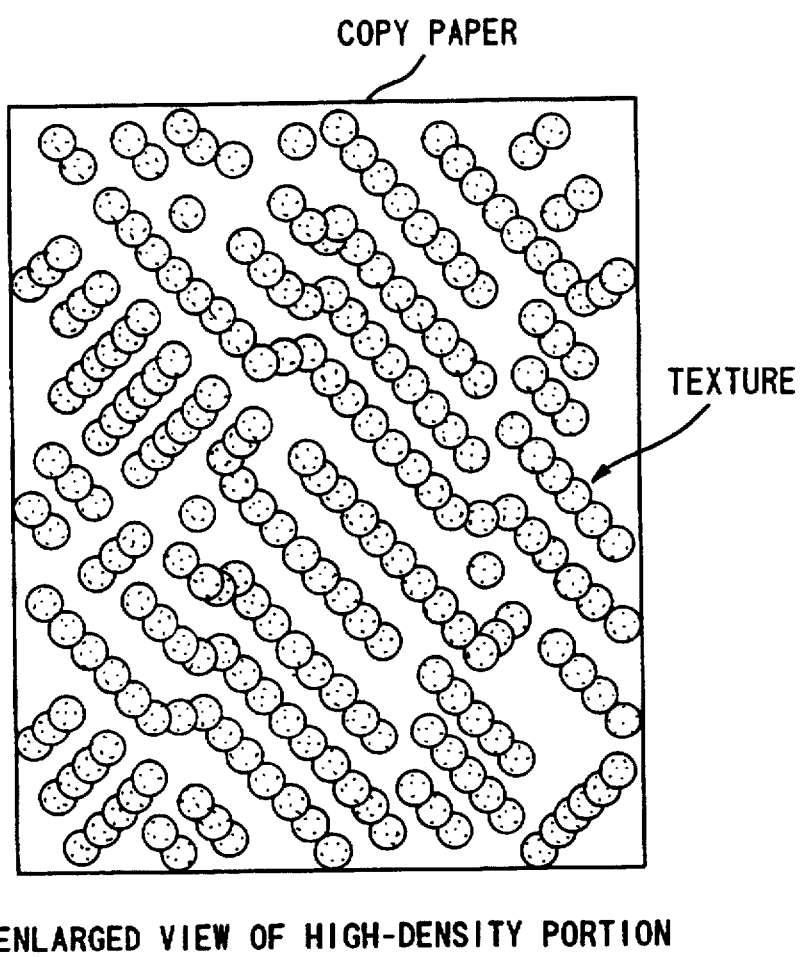
FIG. 47 is an enlarged view of a high-density portion according to the conventional ED processing.

As has been described above with reference to FIG. 45, as the resolution of the printing apparatus becomes higher, and the exposure time on the surface of the photosensitive body becomes shorter, attachment of toner onto the surface of the photosensitive body becomes more unstable.

In particular, when random numbers are added to input data, as has been described in the above embodiments, a unique pattern can be prevented from being generated on a smooth portion which has less change in density. However, the number of isolated points increases, and toner cannot be stably attached to the photosensitive body. More specifically, control for reproducing halftone densities is very difficult.

An embodiment that can also solve these problems will be described hereinafter.

[12th Embodiment]

First, the features of the image processing method and apparatus according to the 12th embodiment of the present invention will be summarized first, and then, a detailed description thereof will be made.

Figure 35A:
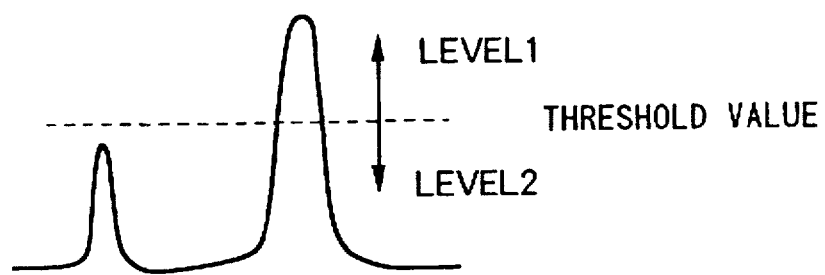
FIG. 35a is a view showing binarization of the edge amount in the 12th embodiment.
Figure 35B:
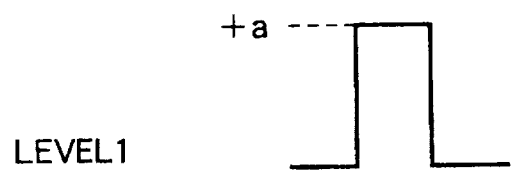
FIG. 35b is a view showing the pseudo random number period of level 1 in the 12th embodiment.
Figure 35C:
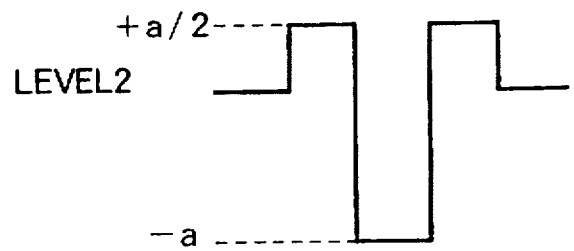
FIG. 35c is a view showing the pseudo random number period of level 2 in the 12th embodiment.

The image processing method and apparatus according to the 12th embodiment of the present invention vary the generation period of pseudo random numbers to be added to an image signal in correspondence with the feature signal of image data. More specifically, for a flat portion, i.e., a pixel having a small edge amount, as shown in FIG. 35*a*, three density levels generated based on one pseudo random number are respectively reflected in image data of three pixels, as shown in FIG. 35c.

In this case, a pseudo random number a is converted into pseudo random numbers +a/2−a, and +a/2, and thereafter, these random numbers are added to corresponding three pixel data.

Figure 36:
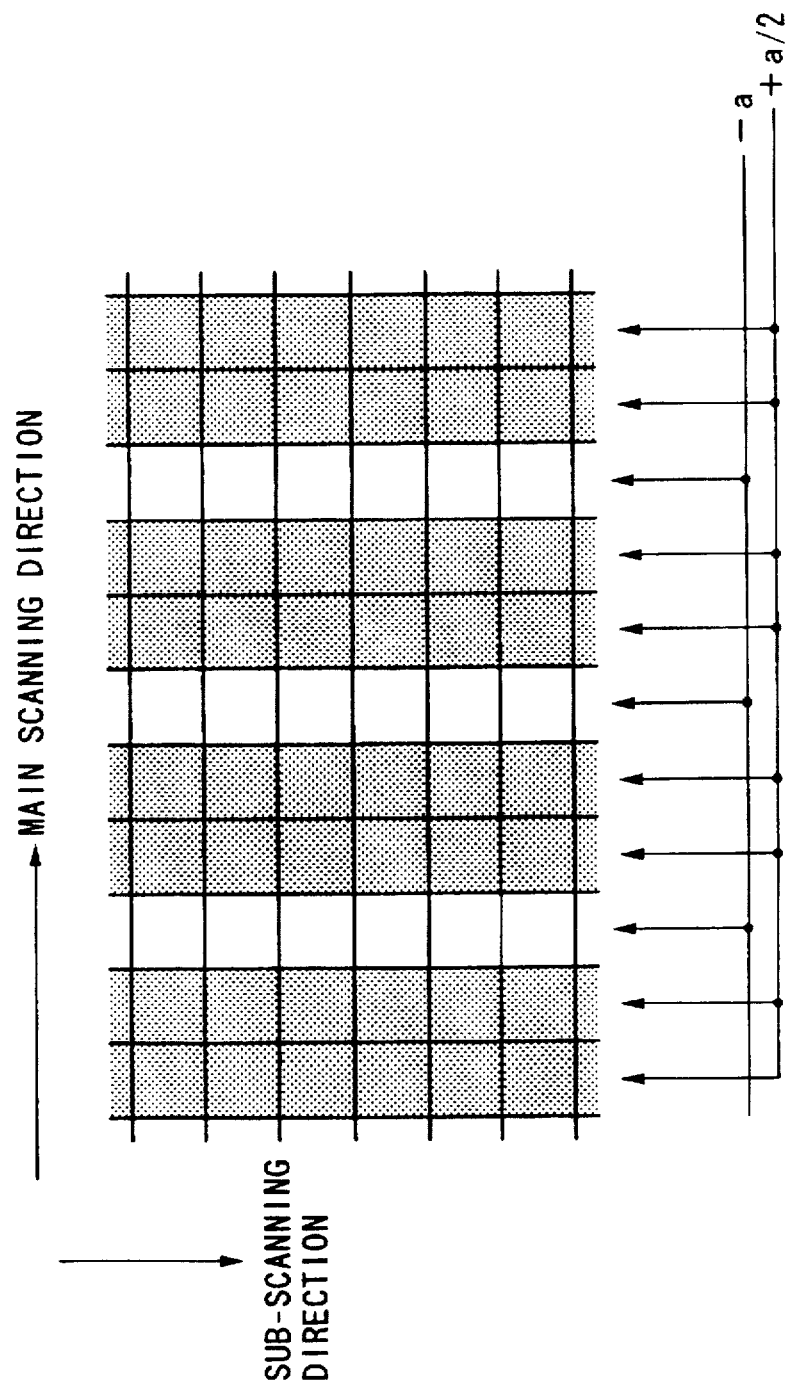
FIG. 36 is a view for explaining an output image when correction values on the basis of pseudo random numbers of a 3-pixel period are applied to the respective pixels.

According to this processing, as shown in FIG. 36, a pseudo random number +a/2 is added to a pixel so as for the pixel value to be easily changed to logic level "1" upon error diffusion processing. More specifically, on a non-edge portion, dots that capable of being easily changed to logic level "1" can be controlled not to be isolated but to gather together, and on an edge portion, dots can be controlled to be scattered.

In this manner, the density can be preserved, and high image quality can be assured for both a smooth portion such as a photograph and a portion such as an edge in which the density abruptly changs.

The image processing method and apparatus according to the 12th embodiment of the present invention will be described in detail below.

Since the block diagram of the entire image processing apparatus of the 12th embodiment is the same as FIG. 1, a detailed description thereof will be omitted.

Figure 37:
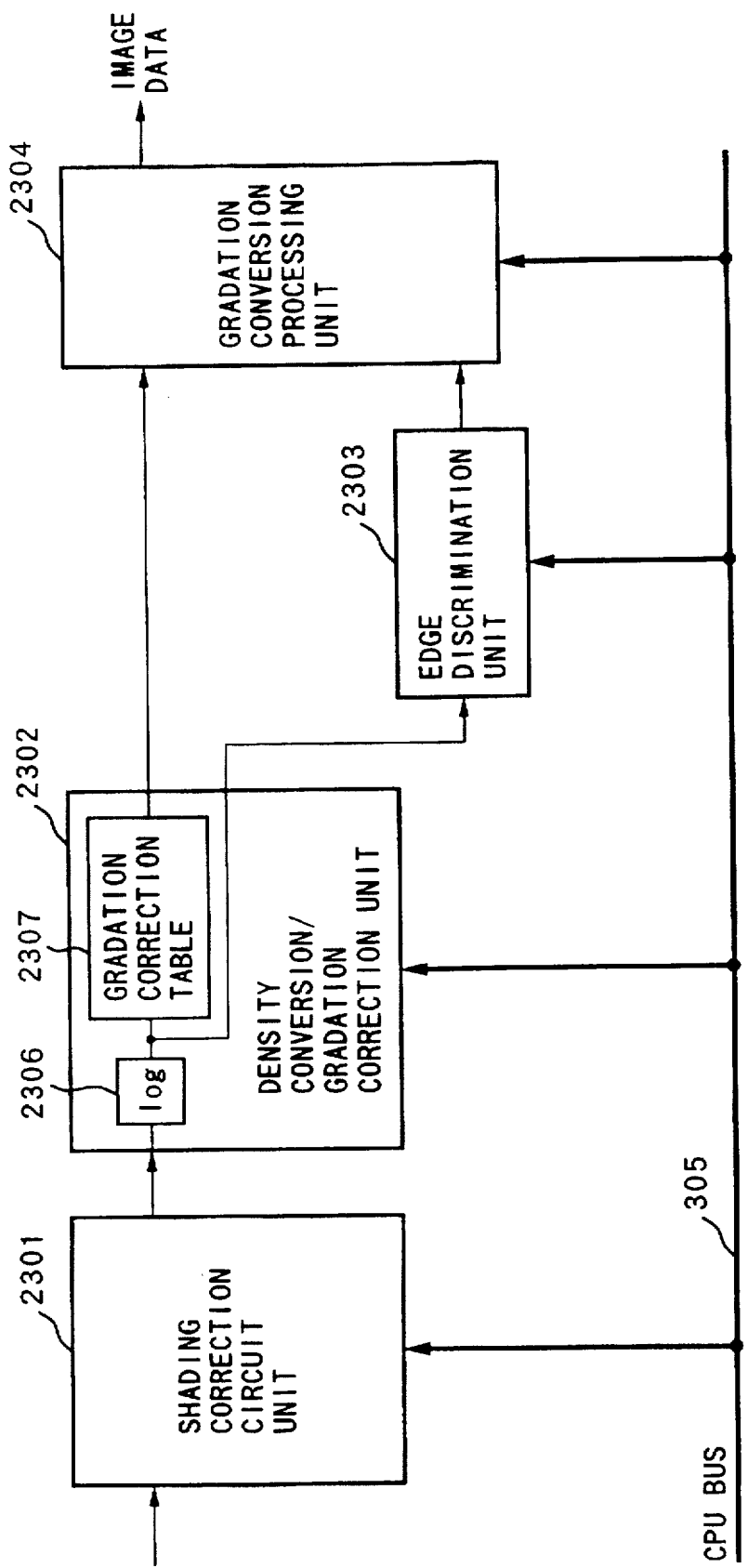
FIG. 37 is a block diagram showing the arrangement of an image processing unit of the 12th embodiment.

FIG. 37 shows the detailed arrangement of an image processing unit 204 according to the 12th embodiment.

An image signal converted into a digital signal by an analog signal processing unit 203 is input to a shading correction circuit 2301. The shading correction circuit 2301 performs black correction and white correction processing. When the amount of input light is very small, the output level, in a dark portion, of a CCD sensor becomes larger than the original one.

Therefore, if an image is read in this state, the entire read image has higher luminance level than the original image. To prevent this, the output level of the CCD obtained when an exposure lamp is turned off is subtracted from the read image signal.

The white level correction will be described below. In the white level correction, prior to scanning of an original, a reference white plate set at the reference position is read, and variations of an illumination system, an optical system, and sensitivity of the sensor are corrected on the basis of the read white plate data.

A density conversion gradation correction unit 2302 will be described below.

In this unit, density conversion and gradation correction processing for correcting the gradation characteristics of an image output apparatus are performed using an LUT (look-up table).

As density conversion processing for converting the read luminance signal into a density signal, log conversion is performed. A converted value Dout to be set in a log conversion table 2306 corresponds to each input value Din and the Dout is calculated by the following equation:

$$Dout = -(255/Dmax) \times \log(Din/255)$$

The converted value Dout calculated by this equation, which corresponds to each input value Di, is set in advance in the log conversion table. Therfore, the log conversion table 2306 converts an input value Din into the corresponding value Dout, and outputs the converted value. This output is sent to a gradation correction table 2307.

The gradation correction table 2307 will be described below.

Figure 38:
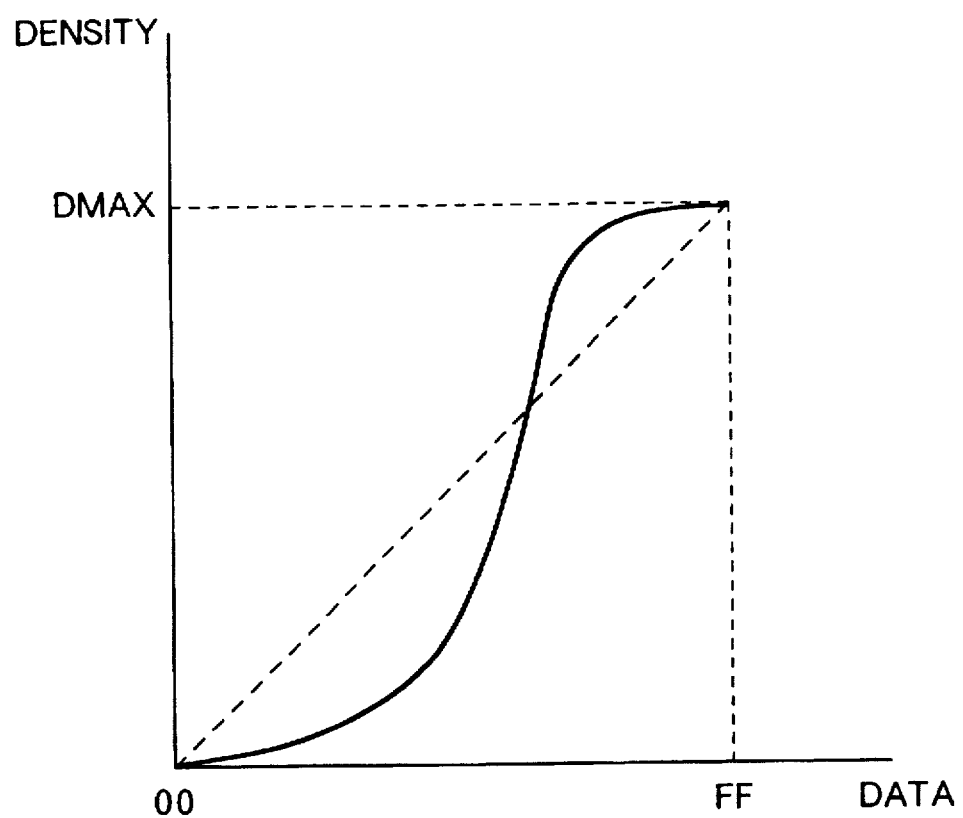
FIG. 38 is a graph showing the gradation characteristics of a printer.
Figure 39:
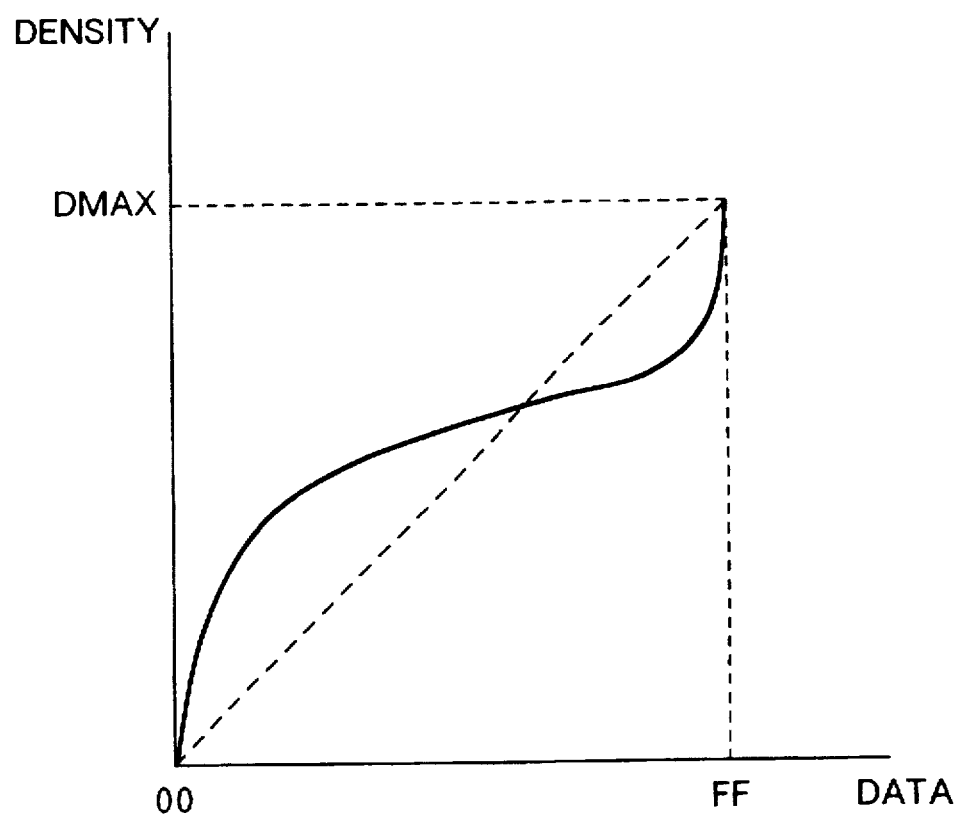
FIG. 39 is a graph showing the characteristics of a correction table.

The gradation correction table 2307 corrects the gradation characteristics of an image output apparatus. FIG. 38 shows an example of the gradation characteristics of an electrophotographic printer. FIG. 38 shows the output printer density with respect to the input data value. FIG. 39 shows input/output characteristics to be set in the gradation correction table 2307 so as to correct the nonlinear input/output characteristics to linear characteristics.

The gradation correction table 2307 pre-stores converted output values corresponding to different input data values so as to hold the input/output characteristics shown in FIG. 39.

This gradation correction table 2307 receives the output value from the log conversion table 2306, and outputs a linearly converted output value.

Image data obtained as a result of these correction processings sent to a gradation conversion processing unit. Since the characteristic correction on the printer side becomes nonlinear conversion, which is may often disturb edge discrimination, an image signal which has been subjected to only density conversion is supplied to an edge discrimination unit 2303.

Figure 40:
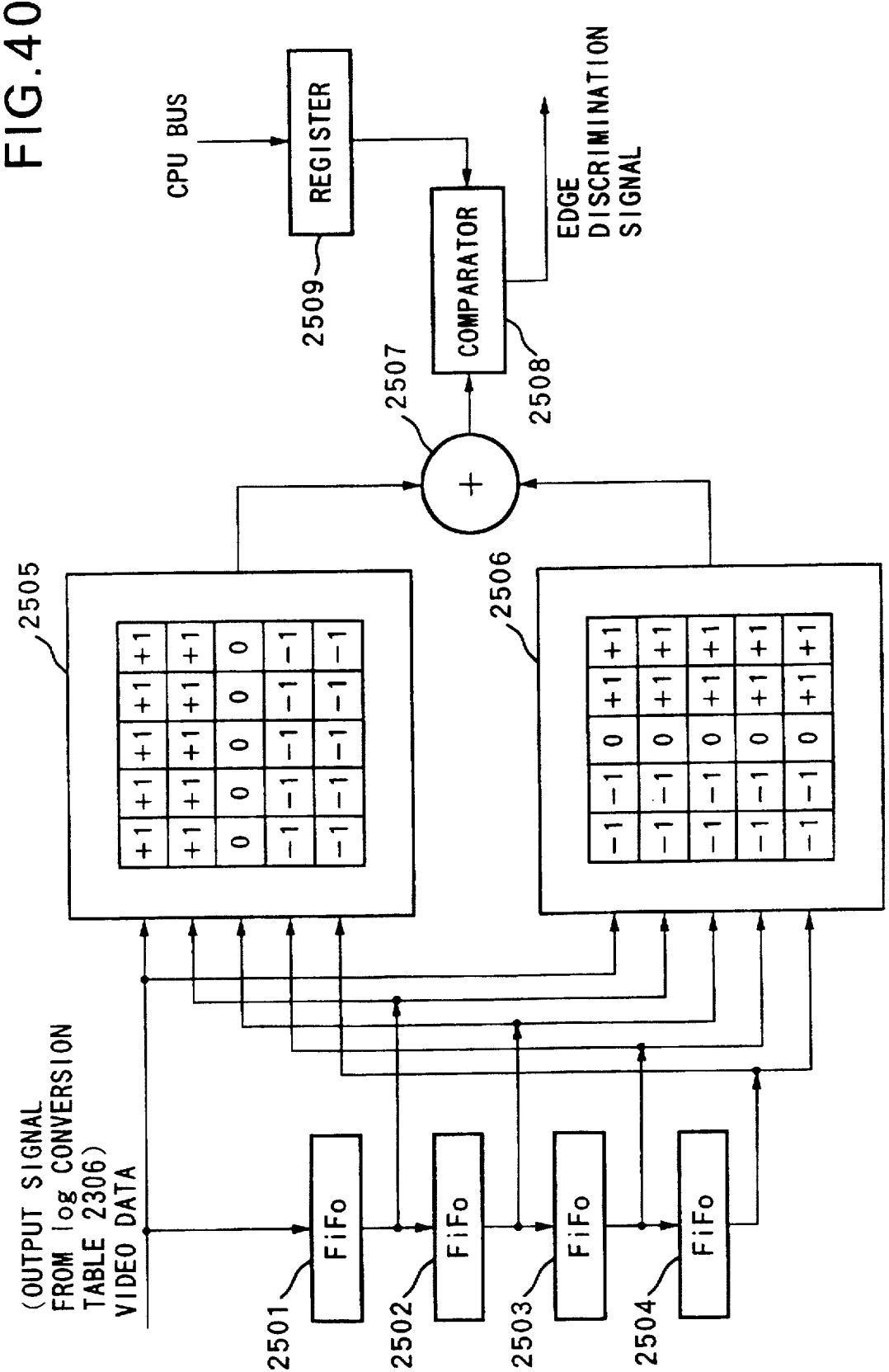
FIG. 40 is a block diagram showing the arrangement of an edge discrimination unit.

The edge discrimination unit 2303 will be described below with reference to FIG. 40.

The edge discrimination unit 2303 comprises filters 2505 and 2506 for detecting primary differential signals. Each filter comprises, e.g., a 5×5 pixel matrix, as shown in FIG. 40.

This filter 2505 performs processing for calculating the absolute value of the difference between the average value of the first and second lines and the average value of the fourth and fifth lines, with respect to signals (Video data) of five lines input in the sub-scanning direction.

The filter 2506 performs processing for calculating the absolute value of the difference between the average values of the first and second pixels in the respective lines and the average value of the fourth and fifth pixels, with respect to signals (Video data) in five lines input in the main scanning direction.

An image signal which has been converted into a predetermined density value by the log conversion table 2306 is delayed by a predetermined number of lines by delay FIFO memories 2501, 2502, 2503, and 2504 in the line direction, and thereafter, the absolute values of the density differences are calcuated by a filter 2505 for detecting density changes in the sub-scanning direction and a filter 2506 for detecting density changes in the main scanning direction. Then, the absolute values are added to each other by an adder 2507. A comparator 2508 compares the sum value with an arbitrary setting value, and a discrimination result is output.

In this embodiment, when the edge amount is large, "1" is output as an edge detection signal; otherwise, "0" is output as an edge detection signal. The arbitrary setting value (threshold value) is set in a register 2509 via a CPU bus 2305 by a CPU 106 prior to read-out of an image.

A gradation conversion processing unit 2304 will be described below with reference to FIG. 41. Since a printer used in the 12th embodiment is a binary printer, an input image signal must be converted into a binary signal. The gradation conversion processing unit 2304 performs such processing.

An image signal that has been subjected to the density conversion and the gradation correction in the gradation correction unit 2302 is added to a pseudo random number whose period is variable, as one characteristic feature of the 12th embodiment, by an adder 2607, and the sum signal is then subjected to binarization processing in an error diffusion processor 2608.

The pseudo random number to be added to image data is generated in synchronism with a pixel clock (to be referred to as a VCLK hereinafter) 2602. The input VCLK 2602 is frequency-divided to ½ VCLK by a frequency-division counter 2603, and the divided VCLK 2602 is input to a pseudo random number generator 2604. On the other hand, a pseudo random number generator 2605 receives the VCLK 2602 which is not frequency-divided.

The pseudo random number generator 2604 generates the following data with respect to a pseudo random number generated in synchronism with the frequency-divided clock, ½ VCLK, in synchronism with the input clock, as shown in FIGS. 35a and 35c:

+a/2, −a, +a/2

This is for allowing an image to which the following value is distributed to be easily changed to logic level "1" in the subsequent error diffusion processor 2608, as shown in FIG. 36:

"+pseudo random number value/2"

By regularly neighboring pixels which can be easily changed to logic level "1", the granularity of an output image can be suppressed.

Figure 35D:
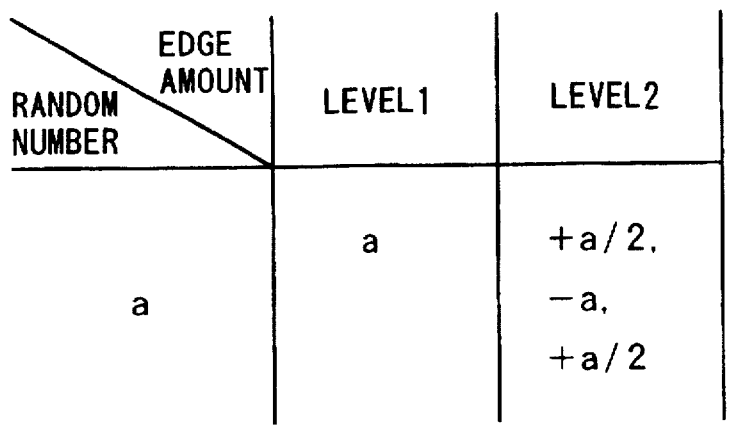
FIG. 35d is a view for explaining the rule of changing the type of pseudo random number to be applied to each pixel on the basis of the edge amount in the 12th embodiment.

As shown in FIG. 35d, when the edge amount is larger than a setting value (level 1), a pseudo random number value is directly added to image data.

Figure 42:
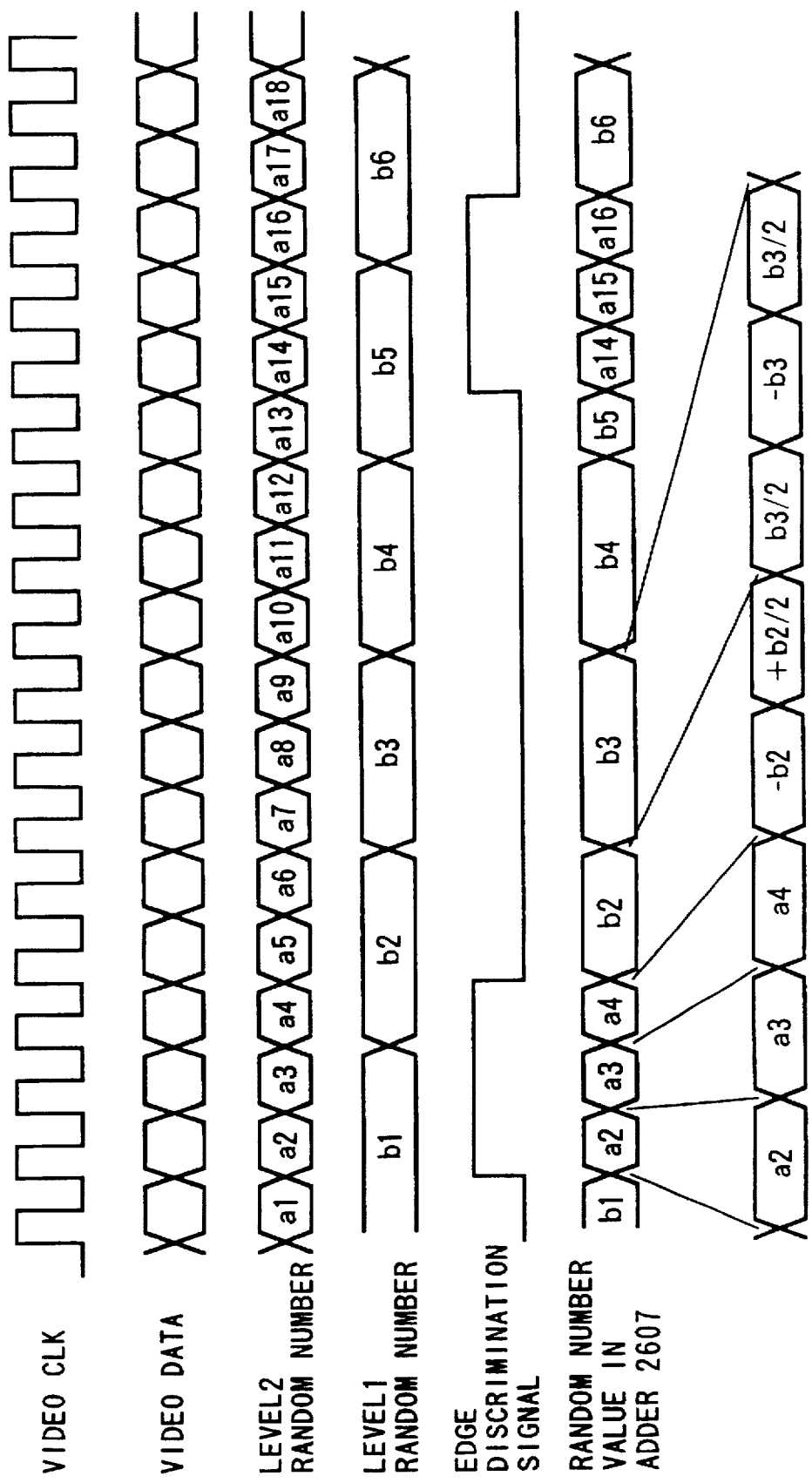
FIG. 42 is a timing chart showing the operation timings of the gradation conversion processing unit of the 12th embodiment.

FIG. 42 is a timing chart in which the period of a pseudo random number is variable in correspondence with the edge amount. Pseudo random number data of level 1 is a pseudo random number value generated by the pseudo random number generator 2604, and a pseudo random number of level 2 is the one generated by the pseudo random number generator 2605.

A selector 2606 selects the pseudo random number value of level 2 when the edge discrimination signal is "0"; it selects the pseudo random number of level 1 when the edge discrimination signal is "1". The selector 2606 outputs the selected random number to an adder 2607. The adder 2607 adds the input random number to image data, as described above, and the sum data is binarized by the error diffusion processor 2608. The binary data is supplied to a printer unit 105, thus performing image formation.

Figure 43:
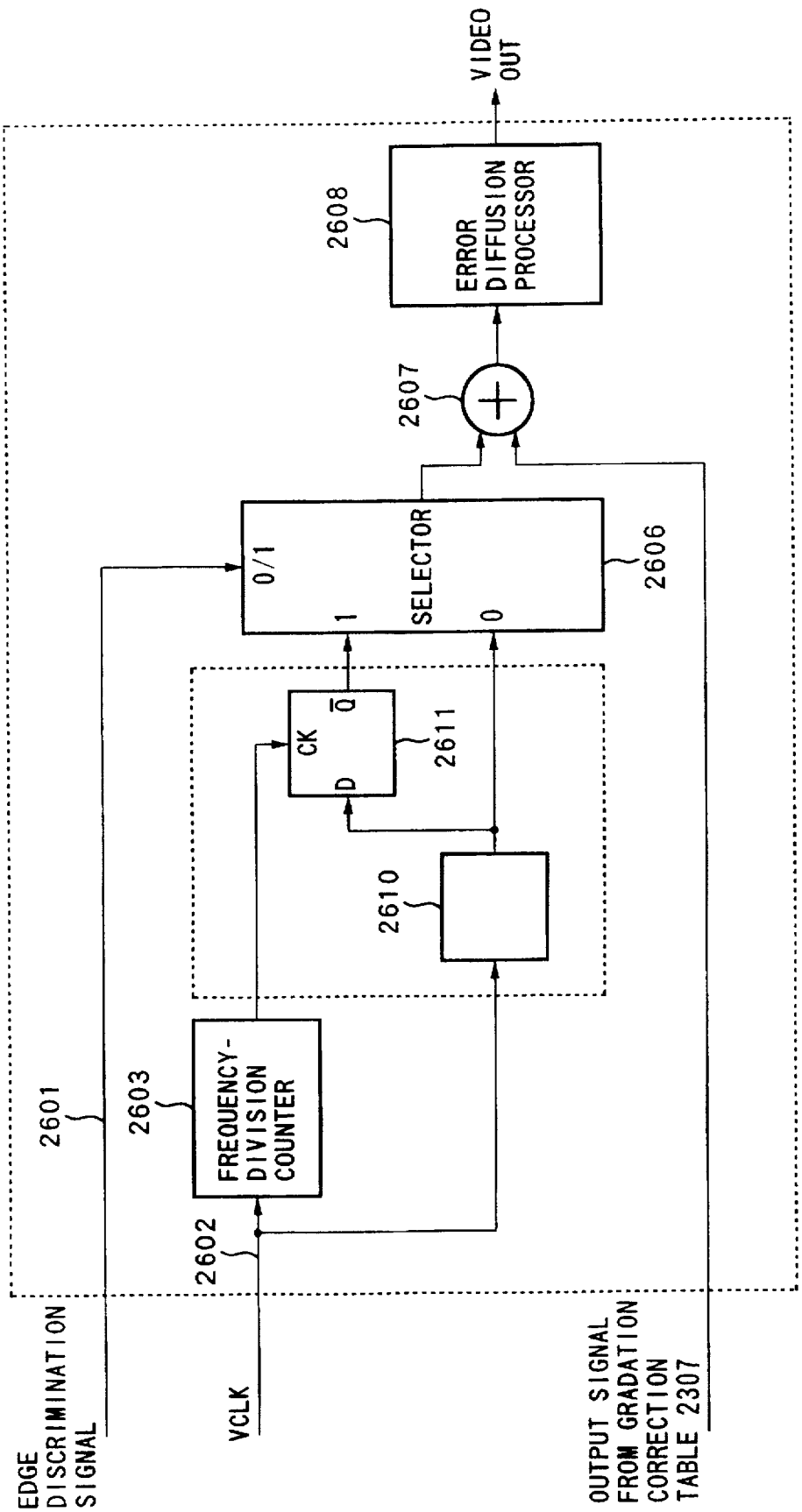
FIG. 43 is a block diagram showing the arrangement of a gradation conversion processing unit according to a modification of the 12th embodiment.

In the 12th embodiment, the two pseudo random number generators 2604 and 2605 are used. FIG. 43 shows an arrangement using one pseudo random number generator 2610. Hence, pseudo random numbers having two different periods can be generated by a simple arrangement.

FIG. 43 shows another arrangement of the gradation conversion processing unit of the 12th embodiment. The same reference numerals in FIG. 43 denote the same elements as in FIG. 41. Therefore, only portions different from those in FIG. 41 will be explained below.

Figure 41:
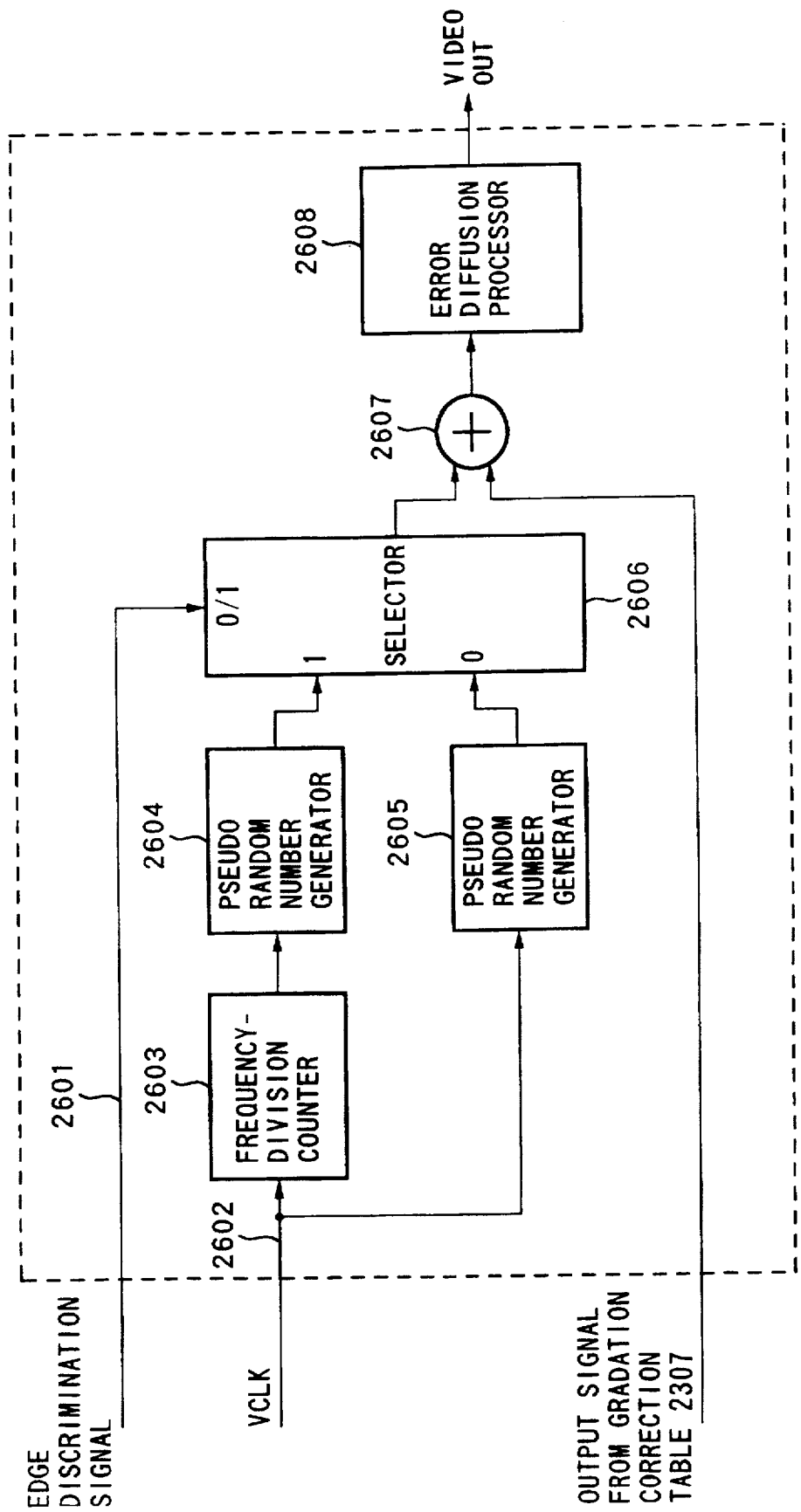
FIG. 41 is a block diagram showing the arrangement of a gradation conversion processing unit of the 12th embodiment.

The unit of FIG. 43 realizes processing equivalent to the processing attained by the two pseudo random number generators 2604 and 2605 shown in FIG. 41, by using the pseudo random number generator 2610 and a D flip-flop 2611.

The pseudo random number generator 2610 has the same arrangement as that of the pseudo random number generator 2605 shown in FIG. 41, and generates and outputs a pseudo uniform random number in synchronism with the input VCLK. The output from this generator 2610 is input to the selector 2606 and a data input terminal of the D flip-flop 2611.

The D flip-flop 2611 latches pseudo random number data from the pseudo random number generator 2610 in synchronism with the clock from the frequency-division counter 2603, and outputs the latched data to the selector 2606.

Note that the pseudo random number generators shown in FIGS. 41 and 43 may comprise a sequence circuit or may be realized by executing a pseudo random number generation program by a microprocessor. Also, the error diffusion processor may comprise a sequence circuit, or may be realized by executing an error diffusion processing program by a microprocessor.

With this arrangement, the gradation conversion processing unit can be constituted by a simpler arrangement.

As described above, according to the 12th embodiment, texture peculiar to the density preservation method can be removed by adding a pseudo random number to image data, and a halftone image such as a photograph can be stably reproduced and a sharp image can be obtained at an edge portion by varying the period of random numbers.

In each of the first to 12th embodiments described above, the gradation conversion processing for one color data has been described. By providing the above-mentioned gradation conversion circuits in correspondence with each of a plurality of color data, a full-color image can be output.

Note that the present invention may be applied to either a system constituted by a plurality of equipments such as a FAX apparatus, a digital copying machine, a printer, and the like, or an apparatus consisting of a single equipment (e.g., a FAX apparatus, a digital copying machine, a printer, or the like).

The present invention is also attained by describing the processing sequence of the image processing unit 104 represented by FIG. 1 above in a software manner, pre-storing the program in the ROM 107, and executing the program by the CPU.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU, MPU, or the like) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the program code read out by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer and receives the program code read out from the storage medium.

Figure 44:
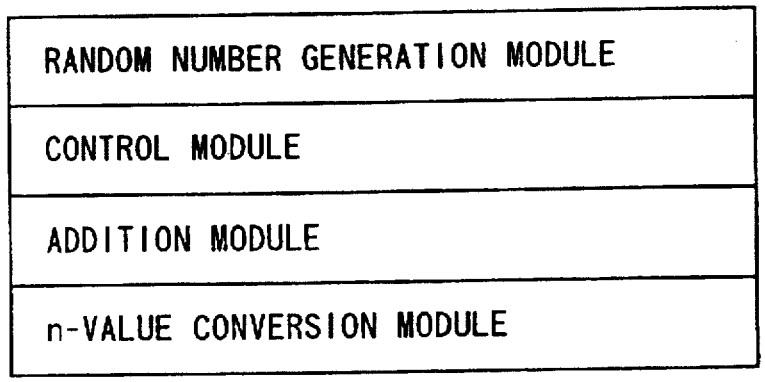
FIG. 44 is a view showing the memory map of a memory that stores image processing program codes according to the present invention.

When the present invention is applied to the storage medium, the storage medium stores program codes corresponding to the above-mentioned image processing. These program codes will be briefly described below. The storage medium stores modules shown in an example of the memory map in FIG. 44. That is, the storage medium stores program codes of at least a random number generation module, a control module, an addition module, and an n-value conversion module.

The preferred embodiments of the present invention have been described. However, the present invention is not limited to the above-mentioned embodiments, and various modifications may be made within the scope of the appended claims.

What is claimed is:

1. An image processing apparatus for performing gradation conversion of input m-bit image information into n-bit image information (m and n are integers and m>n), and outputting the converted image information, comprising:

random number generation means for generating a random number;

control means for switching a sign of the random number from positive to negative or from negative to positive at a predetermined period and outputting said random number; and conversion means for converting an m-bit input value into n-bit data by quantization method of a density preservation type, on the basis of the signal value output from said control means and the input value of the m-bit image information.

2. The apparatus according to claim 1, wherein said random number generation means generates the random number in correspondence with the input m-bit image information.

3. The apparatus according to claim 1, wherein said random number generation means generates each random number at a period of not less than two pixels, and said control means inverts the sign of the random number from positive to negative or from negative to positive within the period of not less than two pixels and selectively outputs the inverted signal value.

4. The apparatus according to claim 1, further comprising edge detection means for detecting edge information from the input image information, wherein said random number generation means controls a value of a random number to be generated in accordance with the edge information.

5. The apparatus according to claim 1, wherein said conversion means adds the signal value from said control means and the m-bit image information, and converts the resultant sum signal value to n-bit data on the basis of a threshold value.

6. The apparatus according to claim 1, wherein said conversion means corrects a threshold value on the basis of the signal value from said control means, and converts the m-bit image information into the n-bit data on the basis of the corrected threshold value.

7. An image processing apparatus for performing gradation conversion of input m-bit image information into n-bit image information (m and n are integers and m>n), and outputting the converted image information, comprising:

random number generation means for generating a random number at a period of not less than three pixels;

control means for inverting a sign of the random number generated by said random number generation means from positive to negative or from negative to positive within the period of not less than three pixels, and selectively outputting the inverted signal value and a signal value "0"; and conversion means for converting an m-bit input value into n-bit data on the basis of the signal value output from said control means and the input value of the m-bit image information.

8. The apparatus according to claim 7, wherein said random number generation means generates the random number in correspondence with the input m-bit image information.

9. The apparatus according to claim 7, further comprising edge detection means for detecting edge information from the input image information, wherein said random number generation means controls a value of a random number to be generated in accordance with the edge information.

10. The apparatus according to claim 7, wherein said conversion means adds the signal value from said control means and the m-bit image information, and converts the resultant sum signal value to n-bit data on the basis of a threshold value.

11. The apparatus according to claim 7, wherein said conversion means corrects a threshold value on the basis of the signal value from said control means, and converts the m-bit image information into the n-bit data on the basis of the corrected threshold value.

12. The apparatus according to claim 7, wherein said conversion means converts the m-bit input value into n-bit data by quantization method of a density preservation type.

13. An image processing method of performing gradation conversion of input m-bit image information into n-bit image information (m and n are integers and m>n), and outputting the converted image information, comprising the steps of:

generating a random number;

controlling a switching of a sign of the random number from positive to negative or from negative to positive at a predetermined period and outputting said random number; and converting an m-bit input value into n-bit data by quantization method of a density preservation type, on the basis of the signal value output at said control step and the input value of the m-bit image information.

14. The method according to claim 13, wherein said generating step generates the random number in correspondence with the input m-bit image information.

15. The method according to claim 13, wherein said generating step generates each random number at a period of not less than two pixels, and said control step inverts the sign of the random number from positive to negative or from negative to positive within the period of not less than two pixels and selectively outputs the inverted signal value.

16. The method according to claim 13, further comprising a step of detecting edge information from the input image information, wherein said generating step controls a value of a random number to be generated in accordance with the edge information.

17. The method according to claim 13, wherein said converting step adds the signal value output at said controlling step and the m-bit image information, and converts the resultant sum signal value to n-bit data on the basis of a threshold value.

18. The apparatus according to claim 13, wherein said converting step corrects a threshold value on the basis of the signal value output at said controlling step, and converts the m-bit image information into the n-bit data on the basis of the corrected threshold value.

19. An image processing method of performing gradation conversion of input m-bit image information into n-bit image information (m and n are integers and m>n), and outputting the converted image information, comprising the step of:

generating a random number at a period of not less than three pixels;

controlling an inversion of a sign of the random number generated at said generating step from positive to negative or from negative to positive within the period of not less than three pixels, and a selective output of the inverted signal value and a signal value "0"; and converting an m-bit input value into n-bit data on the basis of the signal value output at said controlling step and the input value of the m-bit image information.

20. The method according to claim 19, wherein said generating step generates the random number in correspondence with the input m-bit image information.

21. The method according to claim 19, further comprising a step of detecting edge information from the input image information, wherein said generating step controls a value of a random number to be generated in accordance with the edge information.

22. The method according to claim 19, wherein said converting step adds the signal value output at said controlling step and the m-bit image information, and converts the resultant sum signal value to n-bit data on the basis of a threshold value.

23. The method according to claim 19, wherein said converting step corrects a threshold value on the basis of the signal value output at said controlling step, and converts the m-bit image information into the n-bit data on the basis of the corrected threshold value.

24. The method according to claim 19, wherein said converting step converts the m-bit input value into n-bit data by quantization method of a density preservation type.

25. An image processing apparatus comprising:

image input means for inputting m-bit image information;

random number generation means for generating a random number value;

control means for randomly converting a sign of the random number value generated by said random number generation means to positive or negative and outputting the random number value; and conversion means for converting the m-bit image information into n-bit data on the basis of the random number value output from said control means and the m-bit image information.

26. The apparatus according to claim 25, wherein said random number generation means generates the random number in correspondence with the input m-bit image information.

27. The apparatus according to claim 25, wherein said conversion means converts the m-bit input value into n-bit data by quantization method of a density preservation type.

28. An image processing method comprising the step of:

inputting m-bit image information;

generating a random number value;

controlling randomly a conversion of a sign of the random number value generated at said generating step to positive or negative and an output of the random number value; and converting the m-bit image information into n-bit data on the basis of the random number value output at said controlling step and the m-bit image information.

29. The method according to claim 28, wherein said generating step generates the random number in correspondence with the input m-bit image information.

30. The method according to claim 28, wherein said converting step converts the m-bit input value into n-bit data by quantization method of a density preservation type.

31. An image processing apparatus comprising:

image input means for inputting m-bit image information;

random number generation means for generating positive random number values at every other pixel;

random number sign control means for randomly converting the signs of the random number values generated by said random number generation means to positive or negative;

amplitude control means for changing a ratio of an amplitude of each of the random number values output from said random number sign control means as a function of a signal value input by said image input means;

sign inversion means for generating, at a pixel position where no random number value is generated by said random number generation means, a value which has the same absolute value as but a different sign from a value output from said amplitude control means at an immediately preceding pixel position;

addition means for alternately adding the signal values generated by said amplitude control means and said sign inversion means to signal values input by said image input means; and means for converting the signal values obtained by said addition means into n-values.

32. An image processing apparatus comprising:

image input means for inputting m-bit image information;

random number generation means for generating positive random number values at every other pixel positions;

random number sign control means for randomly converting the signs of the random number values generated by said random number generation means to positive or negative;

sign inversion means for generating, at a pixel position where no random number value is generated by said random number generation means, a value which has the same absolute value as but a different sign from a value output from said random number sign control means at an immediately preceding pixel position;

amplitude control means for alternately changing ratios of amplitudes of the signal values generated by said random number sign control means and said sign inversion means as a function of a signal value input by said image input means;

addition means for adding the signal values generated by said amplitude control means to signal values input by said image input means; and means for converting the signal values obtained by said addition means into n-values.

33. An image processing apparatus comprising:

image input means for inputting m-bit image information;

random number generation means for generating positive or negative random number values at every other pixel positions;

amplitude control means for changing ratios of amplitudes of the random number values generated by said random number generation means as a function of a signal value input by said image input means;

sign inversion means for generating, at a pixel position where no random number value is generated by said random number generation means, a value which has the same absolute value as but a different sign from a value output from said amplitude control means at an immediately preceding pixel position;

addition means for alternately adding the signal values generated by said amplitude control means and said sign inversion means to signal values input by said image input means; and means for converting the signal values obtained by said addition means into n-values.

34. An image processing apparatus comprising:

image input means for inputting m-bit image information;

random number generation means for generating positive or negative random number values at every other pixel positions;

sign inversion means for generating, at a pixel position where no random number value is generated by said random number generation means, a value which has the same absolute value as but a different sign from a value output from said random number generation means at an immediately preceding pixel position;

amplitude control means for alternately changing ratios of amplitudes of the signal values generated by said random number generation means and said sign inversion means as a function of a signal value input by said image input means;

addition means for adding the signal values generated by said amplitude control means to signal values input by said image input means; and means for converting the signal values obtained by said addition means into n-values.

35. An image processing apparatus for converting m-bit input image information into n-bit data (m>n), and outputting the n-bit data, comprising:

random number signal generation means for generating random number signal values, maximum values of which being changed in accordance with the input image information at every "2α+1" pixel positions (α>0);

random number addition means for randomly adding positive and negative or negative and positive pairs of random number signal values generated by said random number signal generation means to the input image information at every a pixel position; and image forming means for converting the image information obtained by said random number addition means into n-bit data.

36. The apparatus according to claim 35, wherein said image forming means comprises:

L-level pseudo halftoning means for respectively setting a quotient and a remainder obtained by dividing an m-bit value of the image information by an arbitrary constant to be upper- and lower-bit signals, binarizing the lower-bit signal by comparing the lower-bit signal with a random number, and adding the binarized lower-bit signal to the upper-bit signal; and error correction means for error-correcting errors generated in error diffusion processing, said processing converting an L-level signal value obtained from the m-bit, M-level input image information by said pseudo halftoning means into the n-bit data, with respect to the m-bit, M-level input image information.

37. The apparatus according to claim 36, wherein said error correction means error-corrects a value obtained by performing a product-sum calculation on the errors generated in error diffusion processing which converts the L-level signal value obtained from the m-bit, M-level input image information by said pseudo halftoning means into the n-bit data, with weighting coefficients whose total sum total yields (M−1)/(L−1), with respect to the m-bit, M-level input image information.

38. The apparatus according to claim 35, wherein said image forming means comprises:

L-level pseudo halftoning means for respectively setting a quotient and a remainder obtained by dividing an m-bit value of the image information by an arbitrary constant to be upper- and lower-bit signals, binarizing the lower-bit signal by comparing the lower-bit signal with a dither signal, and adding the binarized lower-bit signal to the upper-bit signal; and error correction means for error-correcting errors generated in error diffusion processing, said processing converting an L-level signal value obtained from the m-bit, M-level input image information by said pseudo halftoning means into the n-bit data, with respect to the m-bit, M-level input image information.

39. An image processing apparatus comprising:

input means for inputting an image;

detection means for detecting a density gradient amount of the image input by said input means;

pseudo random number generation means for generating a pseudo uniform random number a;

pseudo uniform random number applying means for applying the pseudo uniform random number a generated by said pseudo random number generation means to each pixel in an image region in which the density gradient amount detected by said detection means is larger than a predetermined threshold value, and applying a first positive value, a second negative value, and a third positive value based on the pseudo uniform random number a generated by said pseudo random number generation means, respectively, to each pixel in an image region in which the density gradient amount detected by said detection means is less than the predetermined threshold value; and error diffusion processing means for performing error diffusion processing on the basis of the image to which the random numbers are applied by said pseudo uniform random number applying means.

40. The apparatus according to claim 39, wherein said detection means applies first and second filters for extracting direction features, which respectively correspond to a main scanning direction and a sub-scanning direction, to partial images of the image input by said input means so as to detect the density gradient amount of the image.

41. The apparatus according to claim 39, wherein the image input by said input means is an image obtained by performing predetermined density conversion with respect to an original image.

42. The apparatus according to claim 41, wherein the predetermined density conversion is log conversion.

43. The apparatus according to claim 39, wherein the first positive value, the second negative value, and the third positive value are respectively +a/2, −a, and +a/2.

44. The apparatus according to claim 39, wherein the application is an addition.

45. The apparatus according to claim 39, wherein image formation is performed on the basis of the image obtained by said error diffusion processing means.

* * * * *

UNITED STATES PATENT AND TRADEMARK OFFICE
CERTIFICATE OF CORRECTION

PATENT NO. : 5,805,738

DATED : September 8, 1998

INVENTOR(S) : HIROSHI KABURAGI ET AL.

Page 1 of 2

It is certified that error appears in the above-identified patent and that said Letters Patent is hereby corrected as shown below:

Column 2 line 19, Close up right margin; and
line 20, Close up left margin.

COLUMN 16 line 19, "characterized" should read --characterized to--.

COLUMN 20 line 66, "difference" should read --different--.

COLUMN 23 line 11, "that" should read --that are--.

COLUMN 24 line 16, "cessings" should read --cessings are--; and
line 18, "is" should be deleted.

UNITED STATES PATENT AND TRADEMARK OFFICE
CERTIFICATE OF CORRECTION

PATENT NO. : 5,805,738

DATED : September 8, 1998

INVENTOR(S): HIROSHI KABURAGI ET AL.

It is certified that error appears in the above-identified patent and that said Letters Patent is hereby corrected as shown below:

<u>Column 31</u> line 41, "a" should read --$\alpha$--.

Signed and Sealed this

Sixth Day of April, 1999

Attest:

Q. TODD DICKINSON

*Attesting Officer*    *Acting Commissioner of Patents and Trademarks*